United States Patent [19]

Shimoda

[11] Patent Number: 6,014,493

[45] Date of Patent: Jan. 11, 2000

[54] DIGITAL SIGNAL RECORDING AND PLAYBACK APPARATUS FOR INTER-FRAME AND INTRA-FRAME COMPRESSION DATA

[75] Inventor: Kenji Shimoda, Yokohama, Japan

[73] Assignee: Kabushiki Kaisha Toshiba, Kawasaki, Japan

[21] Appl. No.: 08/893,173

[22] Filed: Jul. 15, 1997

Related U.S. Application Data

[63] Continuation of application No. 08/302,094, Sep. 7, 1994, abandoned, which is a continuation of application No. 07/992,292, Dec. 14, 1992, abandoned.

[30] Foreign Application Priority Data

Dec. 13, 1991 [JP] Japan ................................. 3-330650
Dec. 20, 1991 [JP] Japan ................................. 3-338583
Mar. 25, 1992 [JP] Japan ................................. 4-067610

[51] Int. Cl.$^7$ ............................................. H04N 5/783
[52] U.S. Cl. .............................. 386/68; 386/81; 386/111
[58] Field of Search ............................... 386/6–8, 33, 40, 386/66, 68, 81–82, 109, 111, 112, 124; 348/384, 403–407, 476–479, 420; 360/8, 32; H04N 5/76, 7/12, 9/79, 5/781, 5/782, 5/783, 5/92

[56] References Cited

U.S. PATENT DOCUMENTS

| | | |
|---|---|---|
| 3,745,240 | 7/1973 | Morchand et al. . |
| 4,792,953 | 12/1988 | Pasdera et al. ............................ 371/31 |
| 4,807,033 | 2/1989 | Keesen et al. . |
| 4,914,515 | 4/1990 | Vanluyt . |
| 4,931,879 | 6/1990 | Koga et al. . |
| 4,942,476 | 7/1990 | Koga et al. ............................ 358/135 |
| 5,040,061 | 8/1991 | Yonemitsu . |
| 5,047,872 | 9/1991 | Heitmann . |
| 5,057,918 | 10/1991 | Denoyelle et al. . |
| 5,122,876 | 6/1992 | Aoki ........................................ 358/36 |
| 5,132,792 | 7/1992 | Yonemitsu et al. . |
| 5,140,437 | 8/1992 | Yonemitsu et al. ..................... 358/135 |
| 5,140,621 | 8/1992 | Perron et al. . |
| 5,142,537 | 8/1992 | Kutner et al. . |
| 5,150,210 | 9/1992 | Hoshi et al. ............................ 358/135 |
| 5,164,864 | 11/1992 | Perroud et al. . |
| 5,239,308 | 8/1993 | Keesen . |
| 5,301,070 | 4/1994 | Tanaka . |
| 5,365,380 | 11/1994 | Tanaka . |
| 5,418,623 | 5/1995 | Park ........................................ 358/335 |

FOREIGN PATENT DOCUMENTS

| | | |
|---|---|---|
| 0244002 | 4/1987 | European Pat. Off. . |
| 338899 | 10/1989 | European Pat. Off. . |
| 0424026 | 10/1990 | European Pat. Off. . |
| 413644 | 1/1991 | European Pat. Off. . |
| 470851 | 2/1992 | European Pat. Off. . |

(List continued on next page.)

OTHER PUBLICATIONS

Signal Processing Image Communication, vol. 2, No. 4, Dec. 1990, pp. 397–407.

IEEE Transactions on Consumer Electronics, vol. CE–37, No. 3, Aug. 1991, pp. 261–266.

Patent Abstracts of Japan, vol. 008, No. 229 (E–273) Oct. 1984 re: JP–A–59 108 482.

Kou–Hu Tzou, "An Intrafield DCT–Based HDTV Coding for ATM Networks'," IEEE Transactions on Consumer Electronics vol. 1, No. 2, Jun. 1991, pp. 184–196.

*Primary Examiner*—Thai Tran
*Attorney, Agent, or Firm*—Pillsbury Madison & Sutro LLP

[57] ABSTRACT

An apparatus for recording and playing back digital data with variable length codes encoded from intra-frame compression data and inter-frame compression data. The apparatus includes a data rearranging circuit for rearranging the intra-frame compression data in the variable length encoded data, an address and a data length adding circuit for adding addresses and data length information of the intra-frame compression data which is output from the data rearrangement means.

23 Claims, 39 Drawing Sheets

FOREIGN PATENT DOCUMENTS

| | | |
|---|---|---|
| 1272962 | 7/1968 | Germany . |
| 3805436 | 8/1989 | Germany . |
| 3831277 | 3/1990 | Germany . |
| 1133484 | 5/1989 | Japan ............................. H04N 5/92 |
| 3176869 | 5/1989 | Japan . |
| 3024887 | 6/1989 | Japan . |
| 3-65888 | 3/1991 | Japan . |
| 3-74982 | 3/1991 | Japan . |
| 366272 | 3/1991 | Japan ............................. H04N 5/92 |
| 378380 | 4/1991 | Japan ............................. H04N 5/92 |
| 3106190 | 5/1991 | Japan . |
| 3296974 | 12/1991 | Japan . |
| 4-14973 | 1/1992 | Japan . |
| 8702210 | 4/1987 | WIPO . |
| 9102430 | 8/1990 | WIPO . |

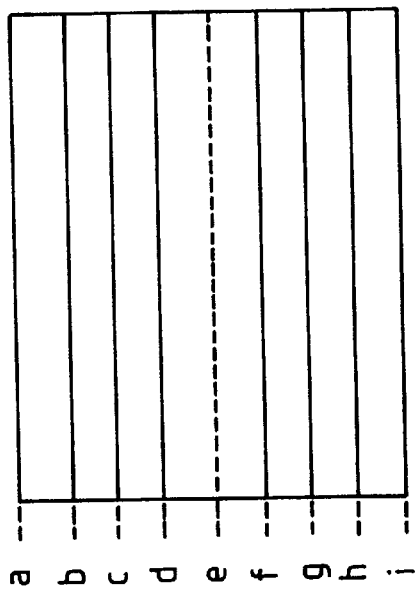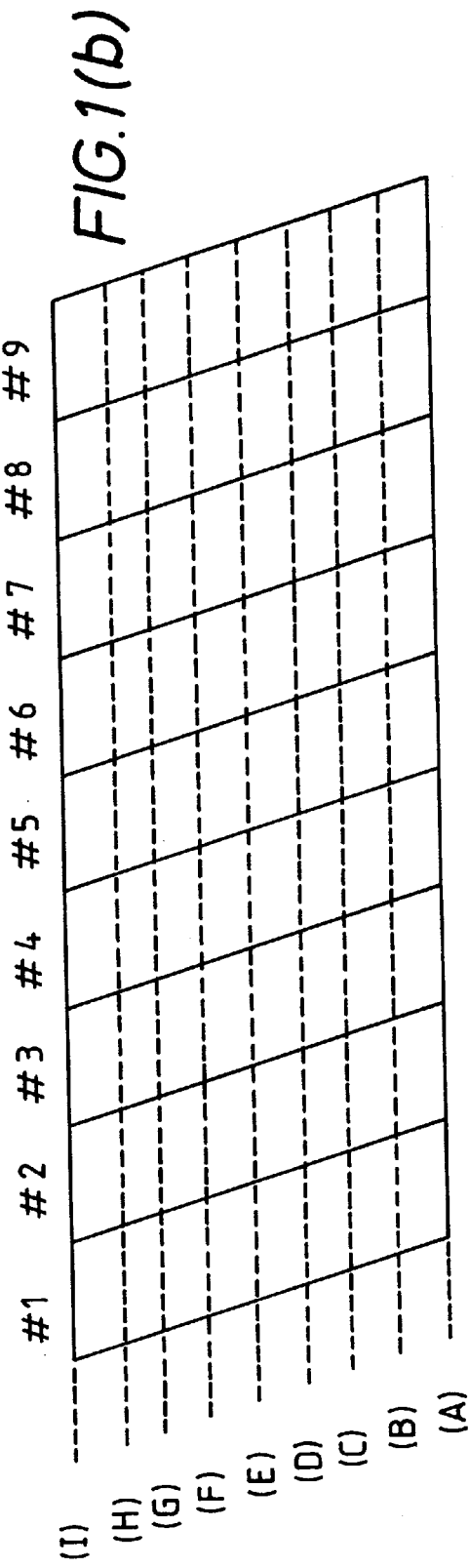

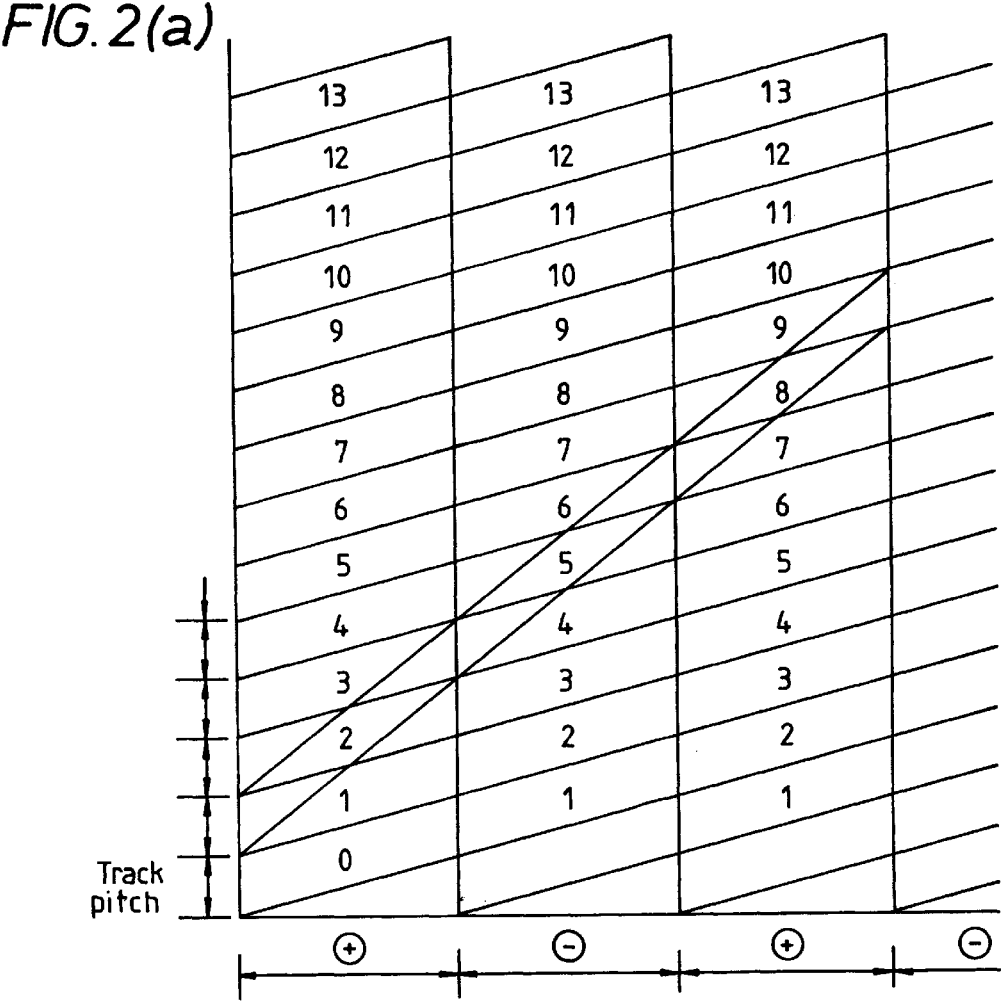
FIG.2(a)
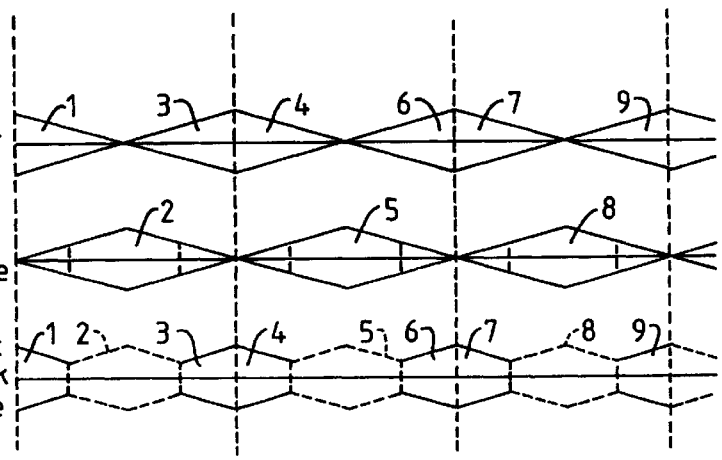
FIG.2(b) Normal head
FIG.2(c) Special purpose head
FIG.2(d) Synthetic playback envelope FIG. 3
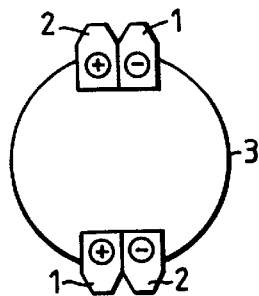
FIG. 4(a)
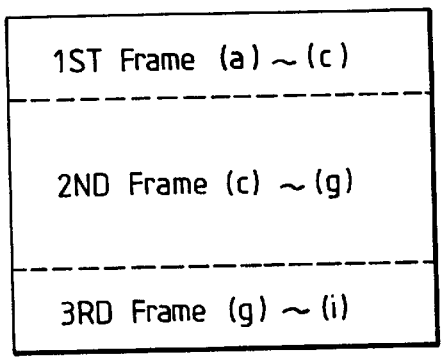
FIG. 4(b)
| 1ST Frame (a) ~ (b) |
| 3RD Frame (b) ~ (d) |
| 2ND Frame (d) ~ (e) |
| 2ND Frame (e) ~ (f) |
| 1ST Frame (f) ~ (h) |
| 3RD Frame (h) ~ (i) |
FIG. 5
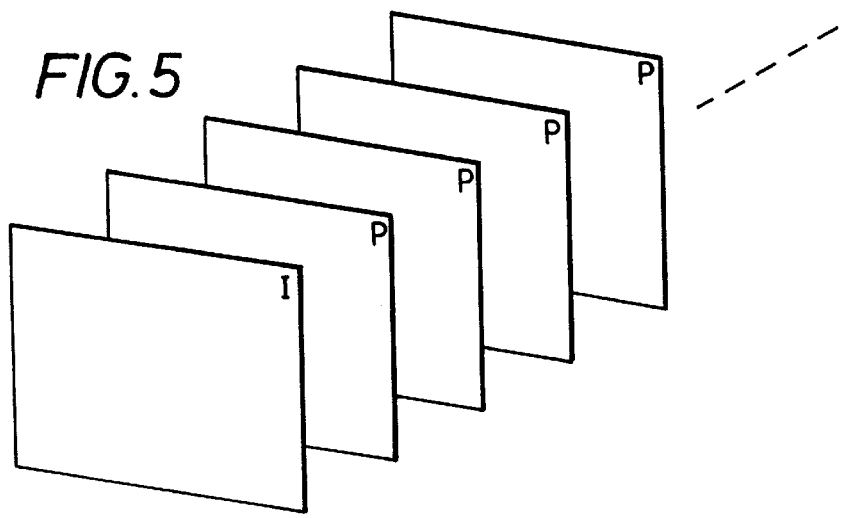

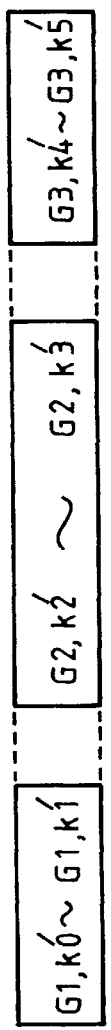
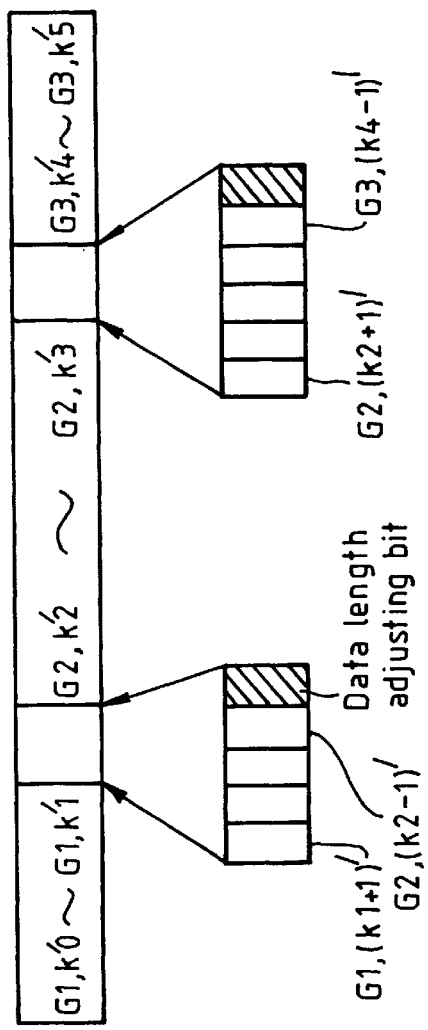
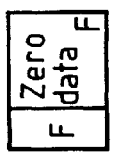
FIG. 35(a)
FIG. 35(b)
FIG. 35(c)
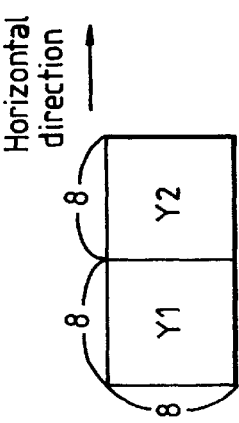
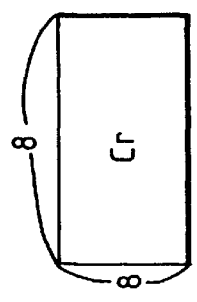
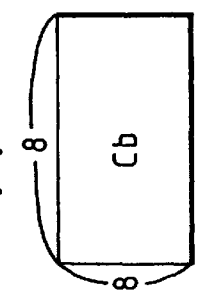
FIG. 7(a) (PRIOR ART)
FIG. 7(b) (PRIOR ART)
FIG. 7(c) (PRIOR ART)

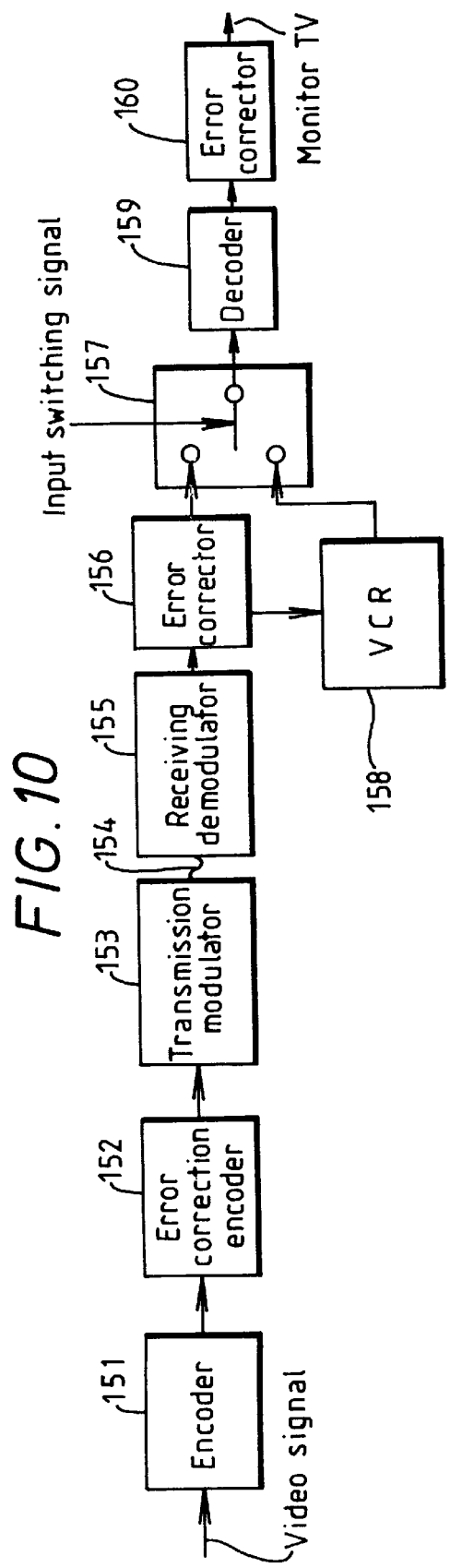
FIG. 10
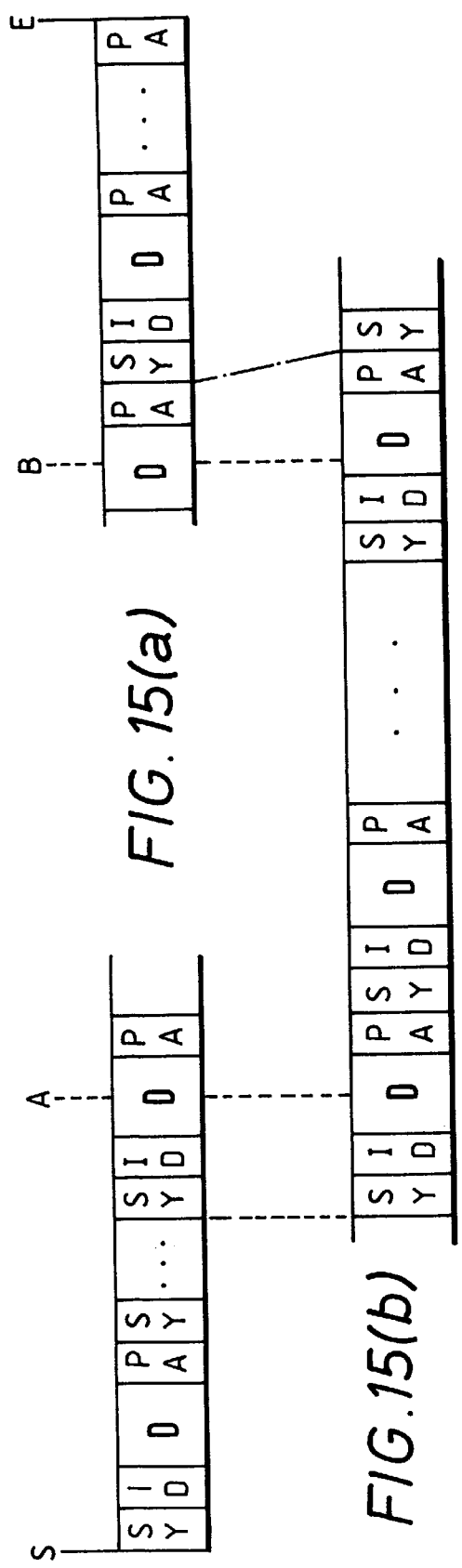
FIG. 15(a)
FIG. 15(b)

Recording data train

Playback data train in normal playback

Playback data train in triple speed playback (1)

(2)

(3)

Playback data in triple speed playback

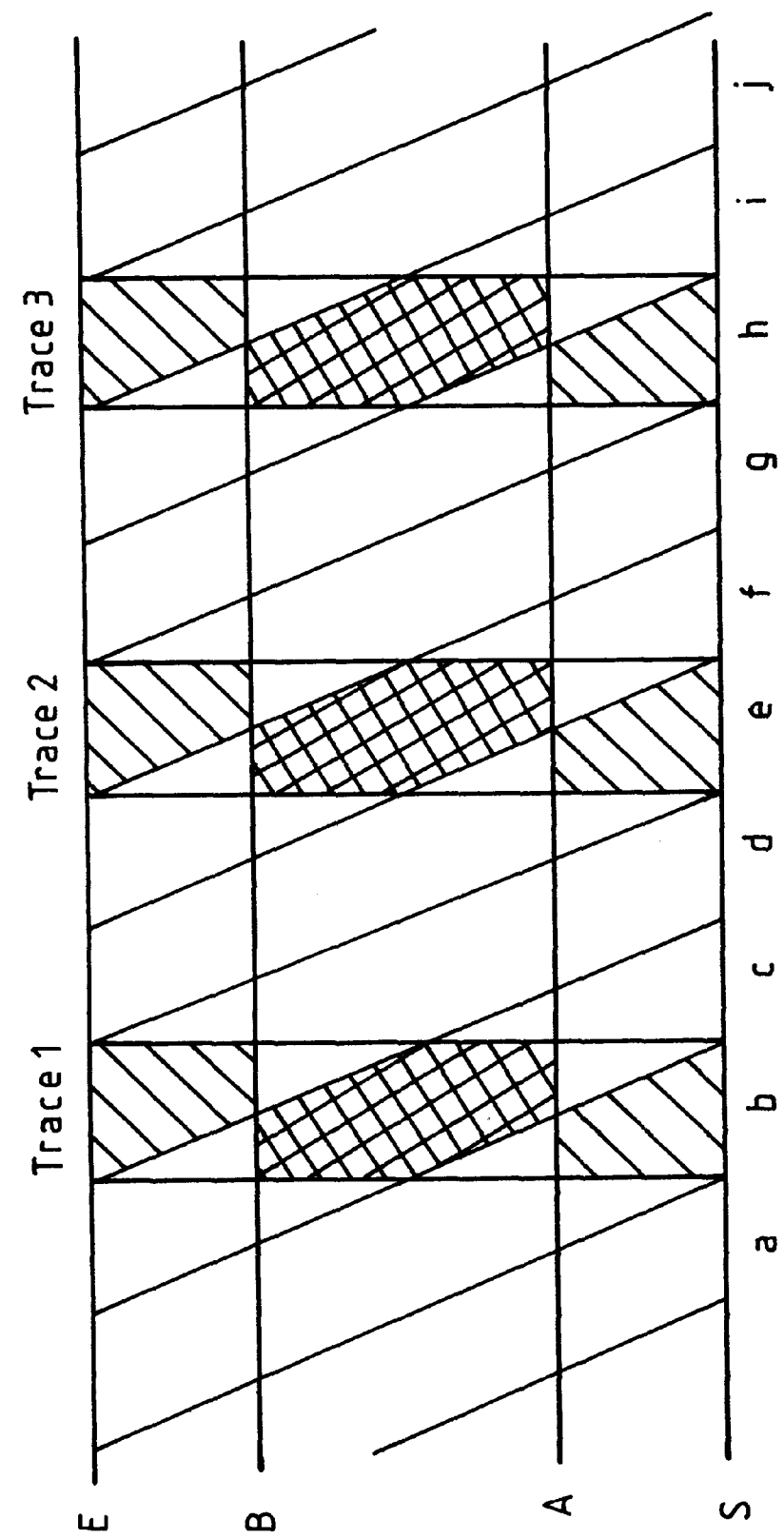

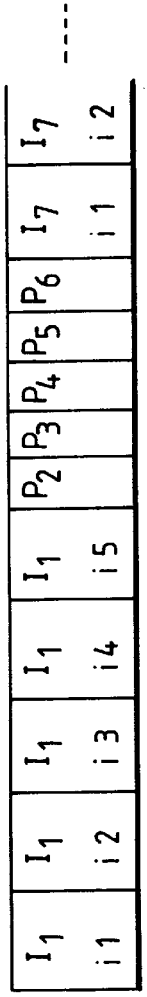
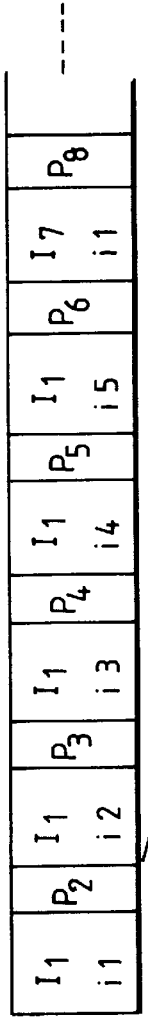
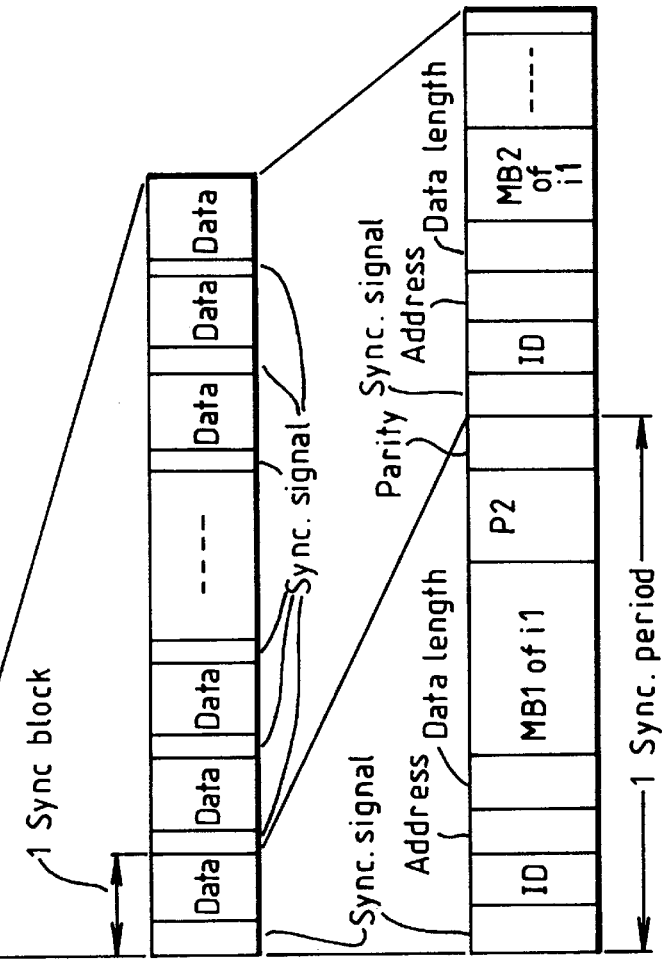
FIG.18(c)
FIG.18(d)
FIG.18(e)
FIG.18(f)

FIG. 20(a)

| $I_1$ | $I_7$ | $I_{13}$ | $I_1$ | $I_7$ |
|---|---|---|---|---|
| $I_{13}$ | $I_1$ | $I_7$ | $I_{13}$ | $I_1$ |
| $I_7$ | $I_{13}$ | $I_1$ | $I_7$ | $I_{13}$ |

FIG. 20(b)

| $I_1'$ | $I_7'$ | $I_{13}'$ | $I_4'$ | $I_{10}'$ |
|---|---|---|---|---|
| $I_{11}'$ | $I_2'$ | $I_8'$ | $I_{14}'$ | $I_5'$ |
| $I_6'$ | $I_{12}'$ | $I_3'$ | $I_9'$ | $I_{15}'$ |

FIG. 20(c)

Center

| $I_1'$ | $I_7'$ | $I_{13}'$ | $I_4'$ | $I_{10}'$ | $I_1'$ | $I_7'$ | $I_{13}'$ | $I_4'$ | $I_{10}'$ |
|---|---|---|---|---|---|---|---|---|---|
| $I_{11}'$ | $I_2'$ | $I_8'$ | $I_{14}'$ | $I_5'$ | $I_{11}'$ | $I_2'$ | $I_8'$ | $I_{14}'$ | $I_5'$ |
| $I_6'$ | $I_{12}'$ | $I_3'$ | $I_9'$ | $I_{15}'$ | $I_6'$ | $I_{12}'$ | $I_3'$ | $I_9'$ | $I_{15}'$ |

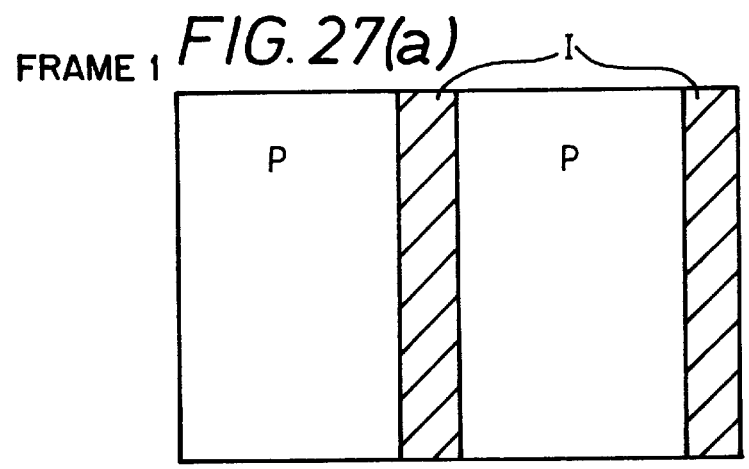
FRAME 1 FIG. 27(a)
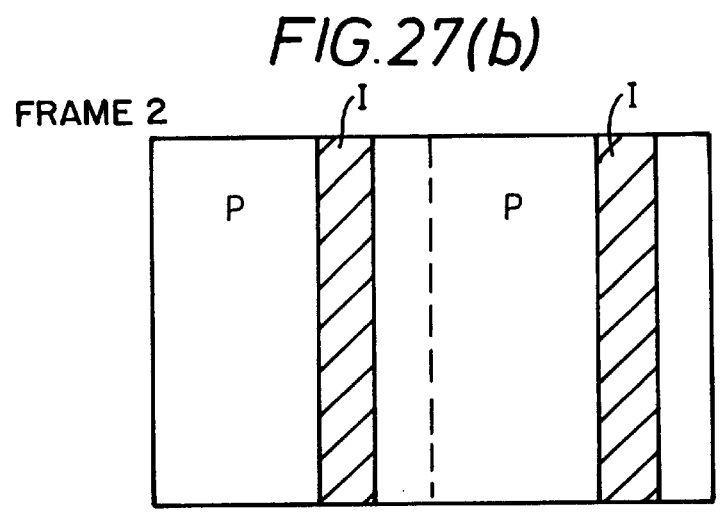
FRAME 2 FIG. 27(b)
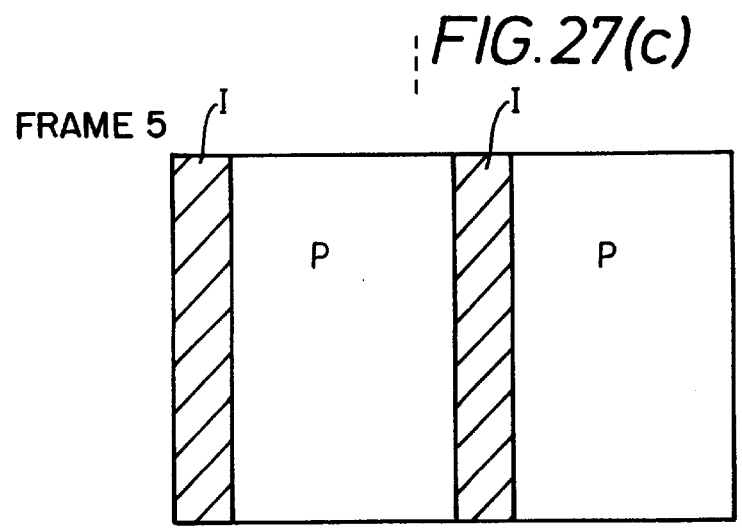
FRAME 5 FIG. 27(c)

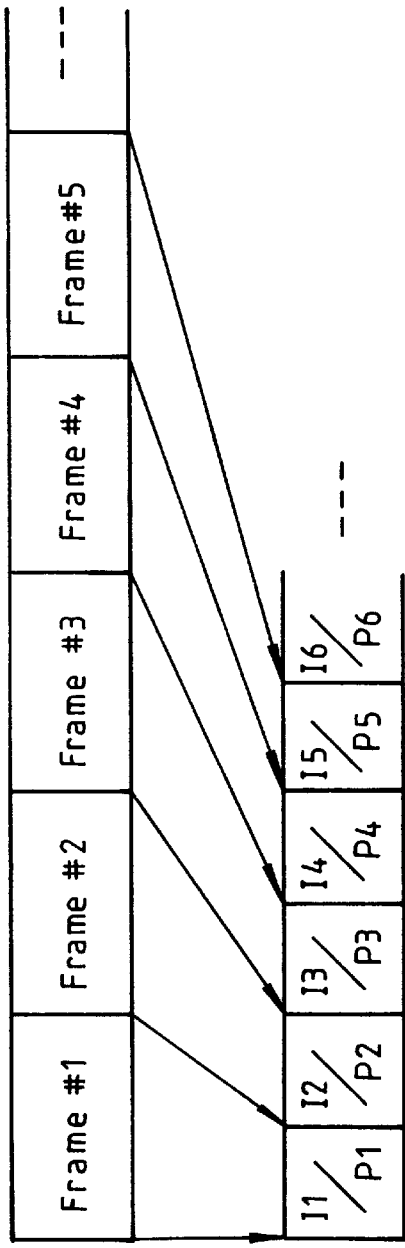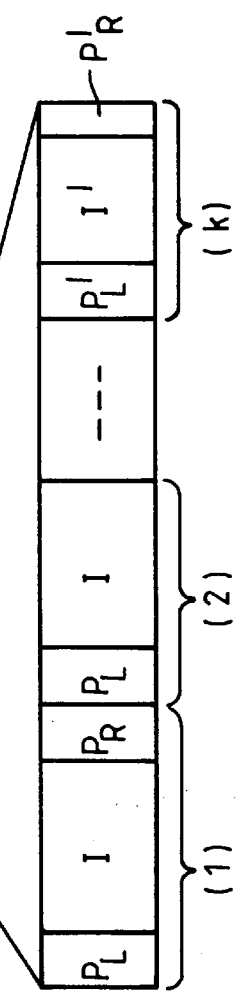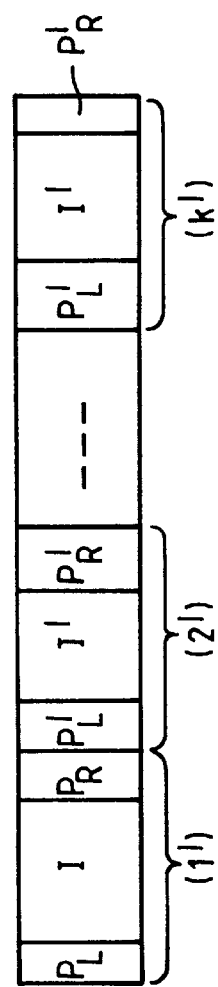
FIG. 28(a)  FIG. 28(b)  FIG. 28(c)  FIG. 28(d)

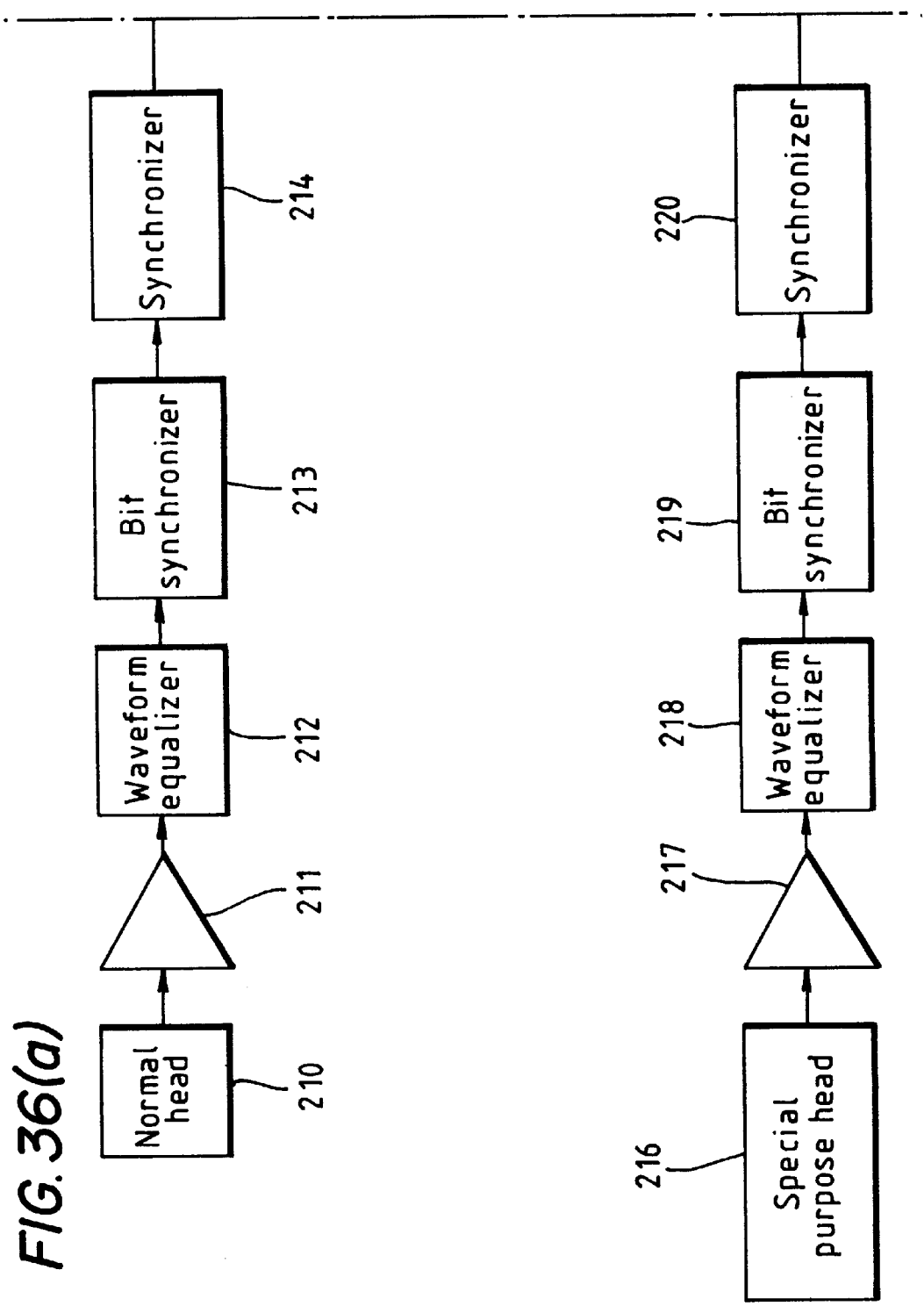

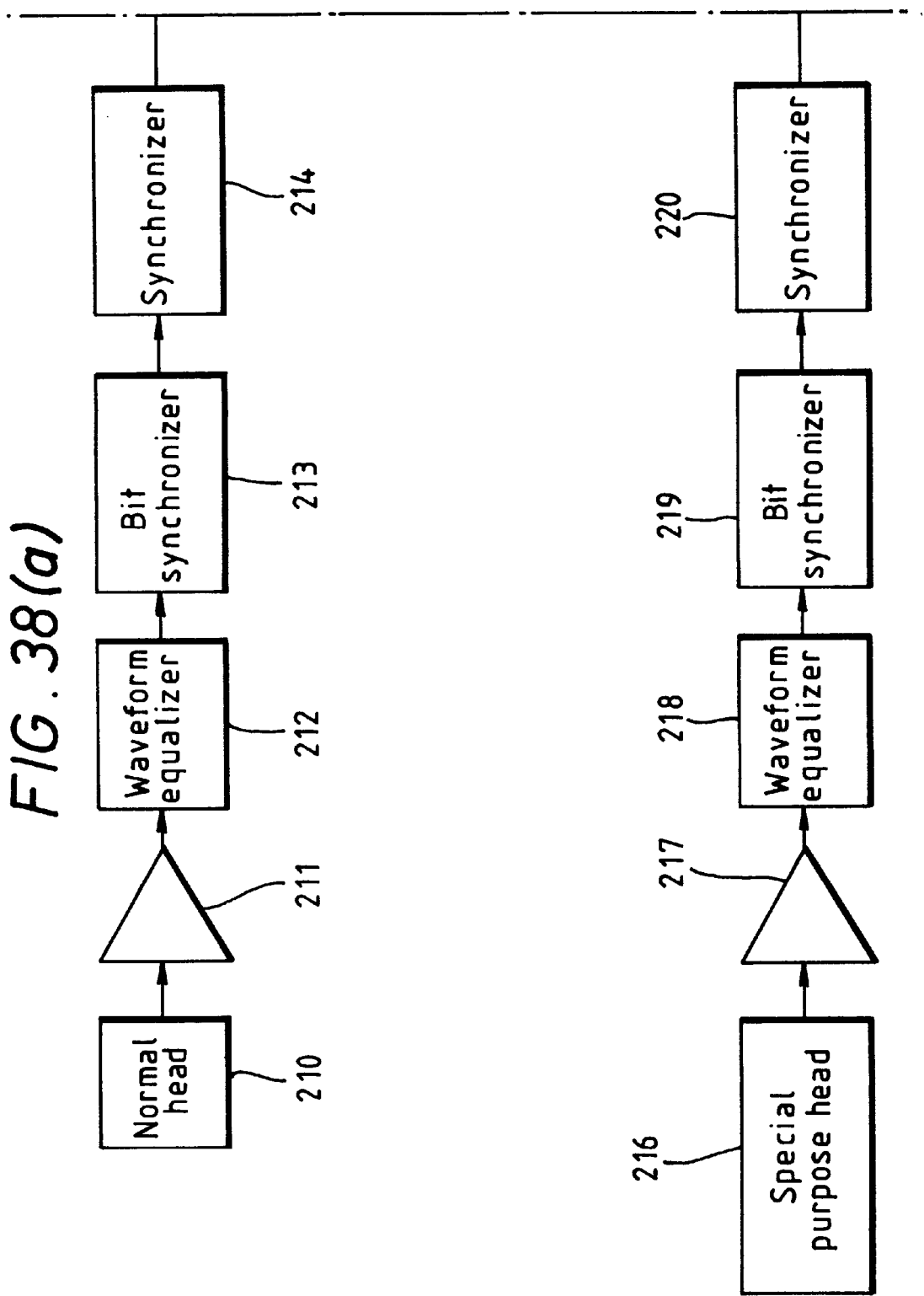

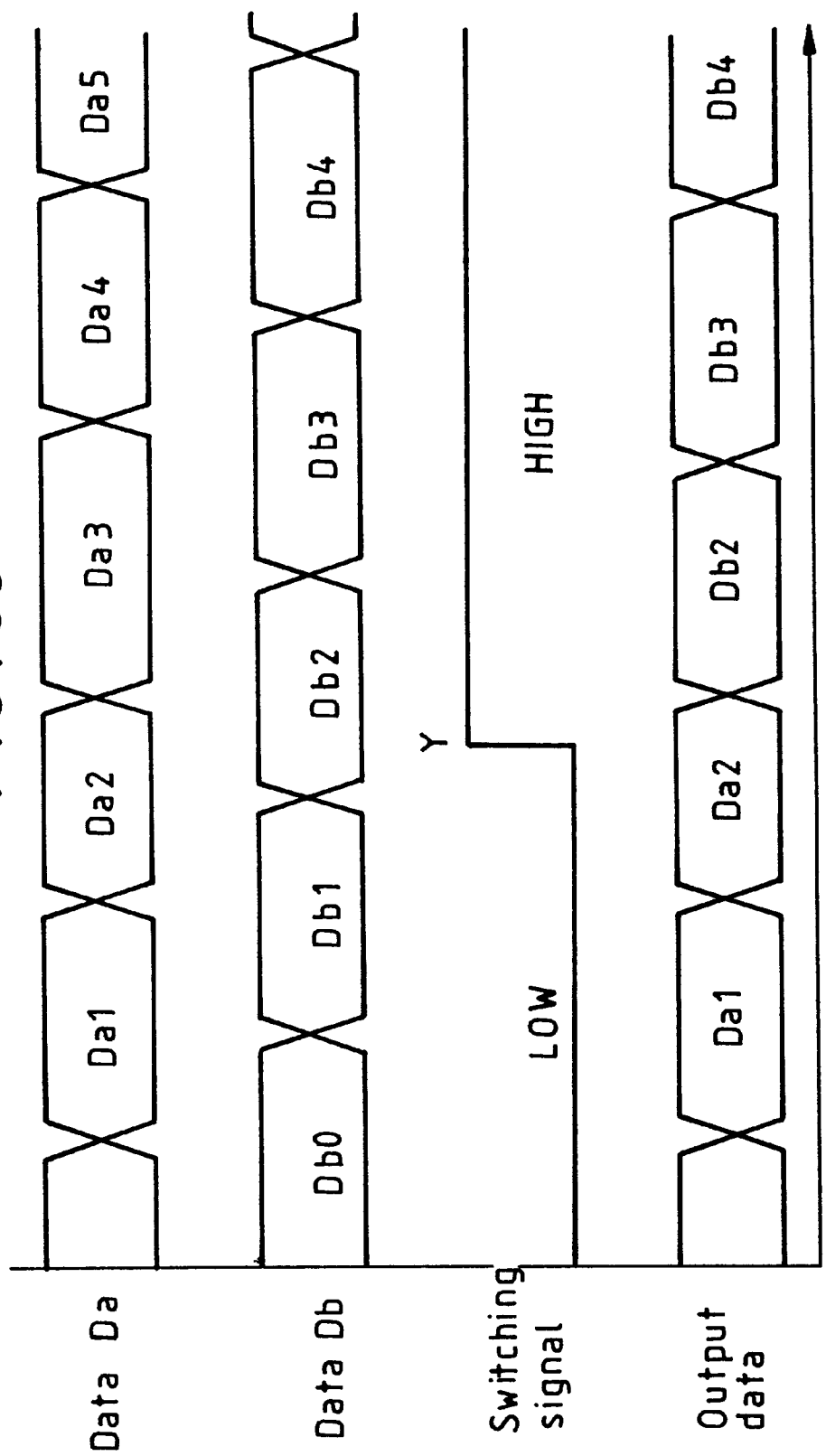

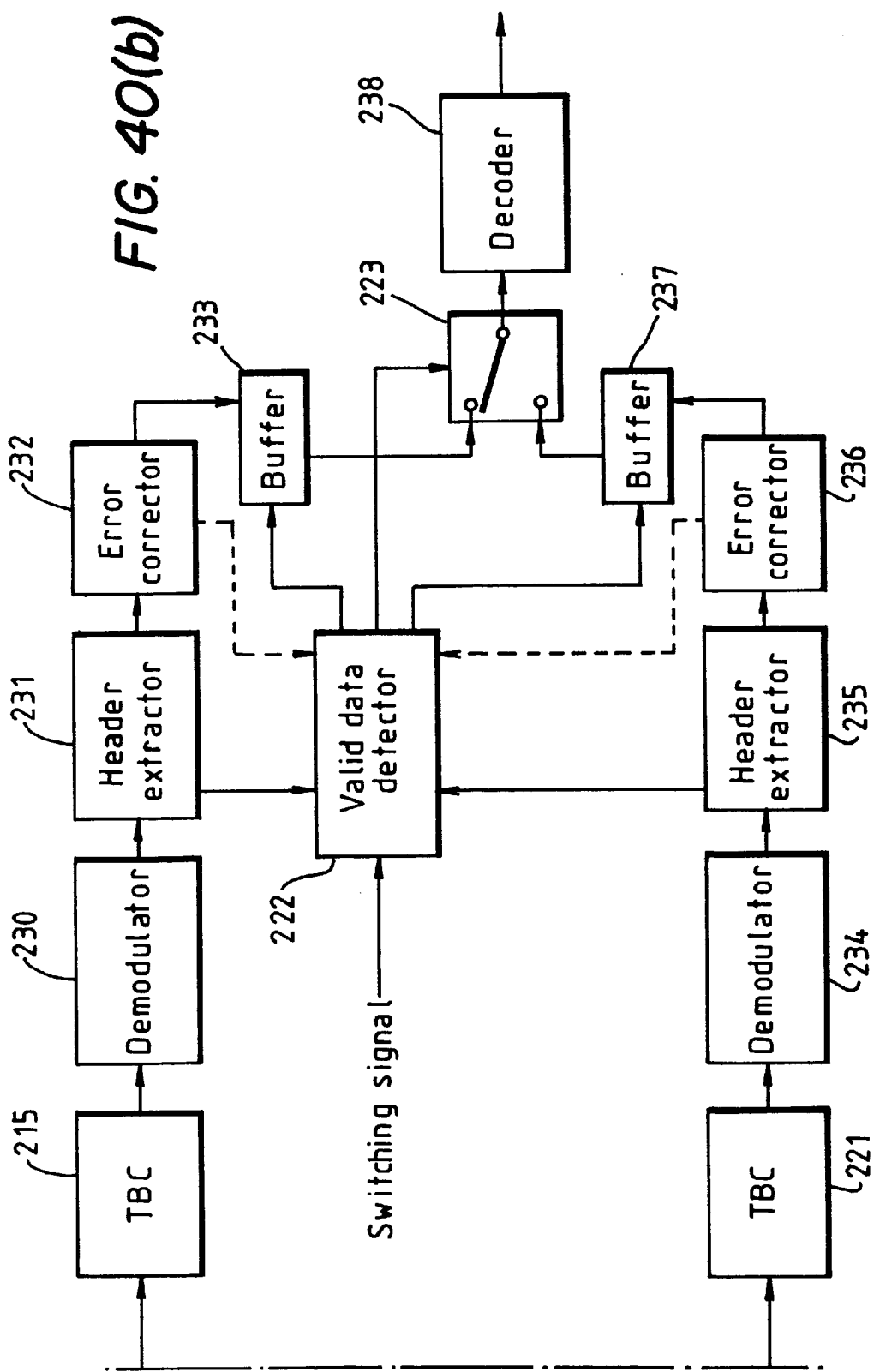

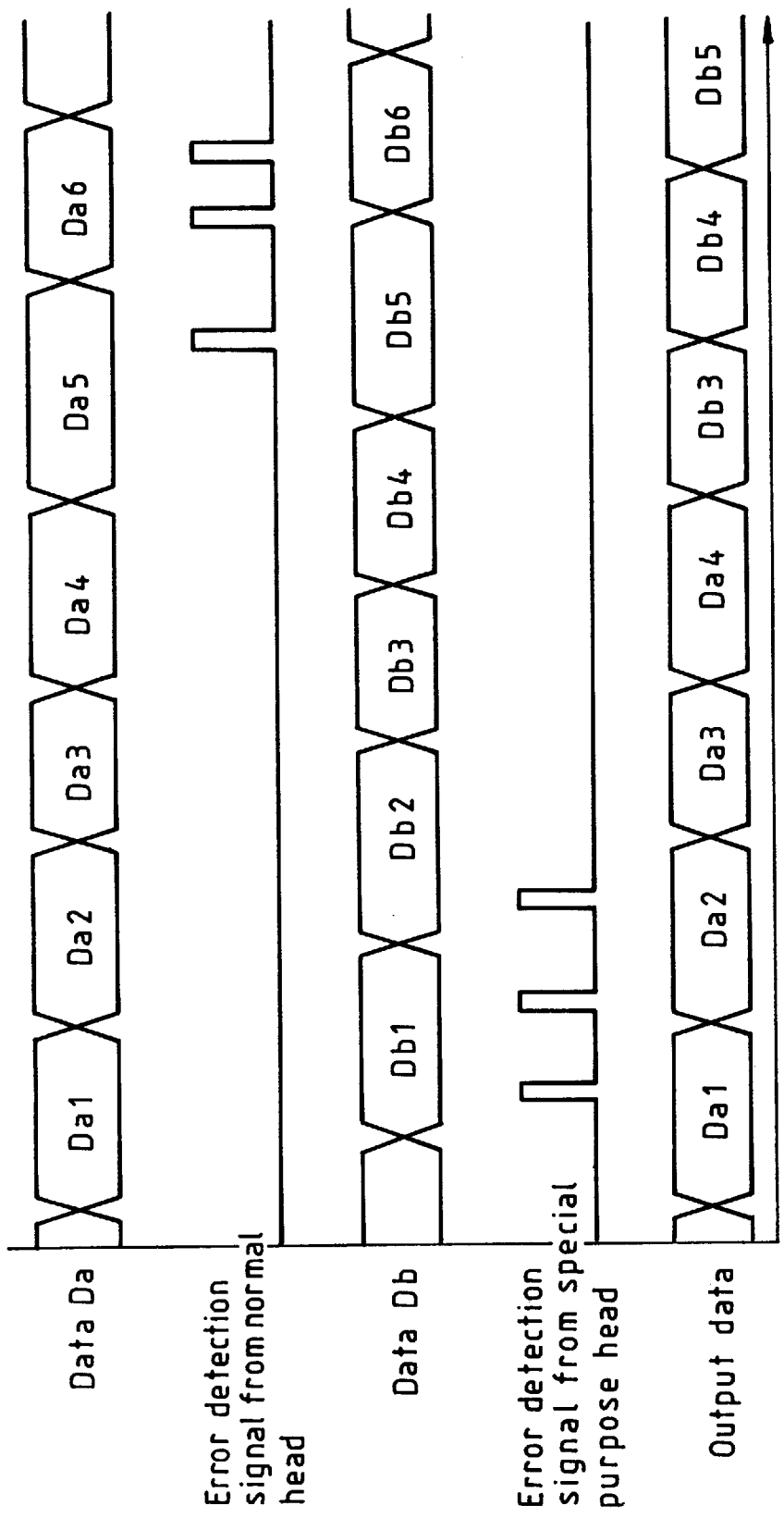

DIGITAL SIGNAL RECORDING AND PLAYBACK APPARATUS FOR INTER-FRAME AND INTRA-FRAME COMPRESSION DATA

This is a continuation of application Ser. No. 08/302,094, filed on Sep. 7, 1994, which was abandoned upon the filing hereof and which is a continuation of application Ser. No. 07/992,292, filed Dec. 14, 1992, abandoned.

BACKGROUND OF THE INVENTION

1. Field of the Invention

The present invention relates generally to a digital signal recording/playback apparatus, and more particularly, to a variable length code recording in the digital signal recording/playback apparatus.

2. Description of Related Art

A digital processing of video data has been developed in recent years. In particular, various systems for recording digital video data using a recording medium such as magnetic video cassette recorders (VCRs) have been developed. FIGS. 1(a) and 1(b) illustrate diagrams for the relations of the positions on a screen and the positions on the recording tracks of a recording medium in VCRs. FIG. 1(a) indicates the positions on the screen and FIG. 1(b) indicates the positions on the recording tracks.

FIG. 1(a) illustrates one frame of picture vertically divided into eight sections. FIG. 1(b) indicates the record positions of the first through ninth tracks similarly divided into eight tracks. Video data is recorded in order on a recording medium starting from the lowest line position A of the first track to its top line position I. For instance, when recording one frame of data on one track, data displayed in a horizontal section defined by lines a and b, FIG. 1(a), on a screen are recorded on a longitudinal section defined by lines A and B on a recording medium, and thereafter, in the similar manner data displayed in horizontal sections defined by lines b through i on the screen are recorded in the order on longitudinal sections defined by lines B through I on the recording medium. When recording one frame of data on two tracks, data in the horizontal section defined by the lines a and e on the screen are recorded on the longitudinal section defined by the lines A and I of the first track #1, while data in the horizontal section defined by the lines e and i on the screen are recorded on the longitudinal section defined by the lines E and I of the second track #2.

FIGS. 2(a) through 2(d) are diagrams for illustrating the relationship between trace patterns and playback signal envelopes of recorded data at triple speed. FIG. 2(a) illustrates trace patterns when playback data at triple speed with a head scanning time shown at the abscissa axis and track pitch or tape traveling distance at the coordinate axis. The signs "+" and "−" in the diagram indicate differentially oriented normal azimuths of the playback head, respectively. Further, numerals in the diagram show track numbers; thus odd number tracks are in the plus azimuth and even number tracks are in the minus azimuth. FIGS. 2(b) through 2(d) indicate the signal envelope played back by the ordinary head, the playback envelope by the special purpose head and the synthetic playback envelope obtained by both heads.

FIG. 3 is a diagram for illustrating the construction of the recording/playback heads. Assume that a rotary cylinder 3, as shown in FIG. 3, is used for the data recording and playback operations. The rotary cylinder 3 is equipped with a pair of regular heads 1, which have differentiated azimuths with each other. Rotary cylinder 3 is also equipped with a pair of special purpose heads 2, which have differentiated azimuths with each other. Furthermore, the azimuths of one regular head 1 and its adjacent special purpose head 2 are differentiated with each other. As shown by the sign "+" in FIG. 2(a), the first track and the third track are traced by the regular head 1 of the plus azimuth in the initial scanning period (tracing period), and the fourth track and the sixth track are traced by the regular head 1 of the minus azimuth in the next scanning period. Thus, the playback signal envelope shown in FIG. 2(b) is obtained by the regular head 1. Further, the second track is traced by the special purpose head 2 in the initial scanning period and the playback signal envelope shown in FIG. 2(c) is obtained in the same manner. By combining the playback output from the regular head 1 with the playback output from the special purpose head 2, synthetic playback envelope shown in FIG. 2(d) obtained.

Table 1 shown below indicates relations among the playback outputs at the triple speed playback operation (FIG. 2(d)), the traces of head and the corresponding positions on the screen.

TABLE 1

| Playback | 1 Frame/1 Track | | 1 Frame/2 Tracks | |
| --- | --- | --- | --- | --- |
| Track | Track | Frame | Track | Frame |
| 1 | #1 | 1st Frame | #1 | 1st Frame |
|   | (A)–(C) | (a)–(c) | (A)–(C) | (a)–(c) |
| 2 | #2 | 2nd Frame | #2 | 1st Frame |
|   | (C)–(G) | (c)–(g) | (C)–(G) | (f)–(h) |
| 3 | #3 | 3rd Frame | #3 | 2nd Frame |
|   | (G)–(I) | (g)–(i) | (G)–(I) | (d)–(e) |
| 4 | #4 | 4th Frame | #4 | 2nd Frame |
|   | (A)–(C) | (a)–(c) | (A)–(C) | (e)–(f) |
| 5 | #5 | 5th Frame | #5 | 3rd Frame |
|   | (C)–(G) | (c)–(g) | (C)–(G) | (b)–(d) |
| 6 | #6 | 6th Frame | #6 | 3rd Frame |
|   | (G)–(I) | (g)–(i) | (G)–(I) | (h)–(j) |
| 7 | #7 | 7th Frame | #7 | 4th Frame |
|   | (A)–(C) | (a)–(c) | (A)–(C) | (a)–(b) |
| 8 | #8 | 8th Frame | #8 | 4th Frame |
|   | (C)–(G) | (c)–(g) | (C)–(G) | (f)–(h) |
| 9 | #9 | 9th Frame | #9 | 5th Frame |
|   | (G)–(I) | (g)–(i) | (G)–(I) | (a)–(b) |

As shown in FIG. 2(d) and Table 1, data A through C on the first track #1 are played back by the regular head 1 in the first quarter (¼) time interval in the initial scanning period, data of C through G on the second track #2 are played back by the special purpose head 2 in the next half (½) time interval, and data of G through I on the third track are played back by the regular head 1 in the next ¼ time interval. Thereafter, data on three tracks are played back in the similar manner in one scanning period.

When one video data frame is recorded on one track, the positions of A through C on the first track #1 correspond to the positions a through c on the first frame of image, the positions C through G on the second track #2 correspond to the positions c through g on the second frame of the frame, and the positions G through 1 on the third track #3 correspond to the positions g through i on the third frame of the image, as shown in Table 1. Therefore, in the playback operation at triple speed, the picture patterns at the positions on the first through the third frames are combined and displayed as a playback picture.

When one video data frame is recorded on two tracks, the positions A through C on the first track #1 correspond to the positions a and b on the first frame, the positions C through G on the second track #2 correspond to the positions f through h on the first frame, and the positions G through I on the third track #3 correspond to the positions d through e on the second frame as shown in Table 1. Further, the positions A through C on the fourth track #4 correspond to the positions e and f on the second frame, the positions C through G on the fifth track #5 correspond to the positions b through d on the third frame, and the positions G through I on the sixth track #6 correspond to the positions h through i on the third frame. In this case, therefore, the picture patterns at the positions on the first through the third frames are presented in mix on the playback picture as shown in FIG. 4(b).

Various proposals have been proposed in recent years for the standardization of high efficient encoding for compressing video data.

The high efficient encoding technique encodes video data at a lower bit rate in order to improve efficiency of digital transmission and recording. For instance, the CCITT (Cometi Consultafif international Telegraphique et Telephonique (International Telegraph and Telephone Consultative Committee)) has issued a recommendation for video-conference/video-telephone standardization H. 261. According to the CCITT recommendation, the encoding of frame I is processed by intra-frame compression and frame P is processed by inter-frame compression (or a predictive frame compression).

FIG. 5 is a diagram for explaining video data compression according to the CCITT recommendation.

Frame I is processed by intra-frame compression and is the only video data frame encoded by DCT (Digital Cosine Transformation) processing. The inter-frame compression processed frame P is video data encoded by a predictive encoding method using the intra-frame compression processed frame I or the inter-frame compression processed frame P. In addition, lowering of bit rate has been achieved by encoding the data in variable lengths. As the intra-frame compression processed frame I was encoded by the intra-frame information only, it is possible to decode it using singly encoded data. However, the inter-frame compression processed frame P was encoded using the correlation with other video data, it cannot be decoded by using only singly encoded data.

FIG. 6 is a block diagram for illustrating the recording section of a conventional apparatus for recording/playback variable length codes using predictive encoding.

A luminance signal Y and color difference signals Cr and Cb are applied to a multiplexer 11, where they are multiplexed in a block of 8 pixels×8 horizontal scanning lines. Sampling rate of the color difference signals Cr and Cb in the horizontal direction is a half (½) of the luminance signal Y. Therefore, in the period when two 8×8 luminance blocks are sampled, one 8×8 block of the color difference signals Cr and Cb is sampled. As shown in FIGS. 7(a) through 7(c), two luminance signal blocks Y1 and Y2 and each of the color difference signal blocks Cr and Cb total four blocks called a macro block. Here, two luminance signal blocks Y1 and Y2 and each of the color difference blocks Cr and Cb represent the same position of the picture frame. The output of the multiplexer 11 is applied to a DCT (Digital Cosine Transformation) circuit 13 through a subtracter 12.

When performing intra-frame compression, a switch 14 is kept OFF and the output of the multiplexer 11 is applied directly to the DCT circuit 13, described later. A signal composed of 8×8 pixels per block is applied to the DCT circuit 13. The DCT circuit 13 converts the input signal into frequency components by the 8×8 two dimensional DCT processing. This makes it possible to reduce the spatial correlative components. That is, the output of the DCT circuit 13 is applied to a quantizer 15 which lowers one block signal redundancy by requantizing the DCT output using a fixed quantization coefficient. Further, block pulses are supplied to the multiplexer 11, the DCT circuit 13, the quantizer 15, etc. which operate in a block unit.

The quantized data from the quantizer 15 is applied to a variable length encoder 16 and is, for instance encoded to the Huffman codes based on the result calculated from the statistical encoding amount of the quantized output. As a result, a short bit is assigned to data having a high appearance probability and a long bit to data having a low appearance probability and thus, transmission amount is further reduced. The output of the variable length encoder 16 is applied to an error correction encoder 17, which provides the output from the variable length encoder 16 with an error correction parity added to a multiplexer 19.

The output of the variable length encoder 16 is also applied to an encoding controller 18. The amount of the output data varies largely depending on input picture. So, the encoding controller 18 monitors the amount of the output data from the variable length encoder 16 and regulates the amount of the output data by controlling the quantization coefficient of the quantizer 15. Further, the encoding controller 18 may restrict the amount of the output data by controlling the variable length encoder 16.

A sync/ID generator 20 generates frame a sync signal and ID signal showing data contents and additional information and provides them to the multiplexer 19. The multiplexer 19 forms one sync block data with a sync signal, ID signal, compressed signal data and parity. The multiplexer 19 provides this data to the recoding/encoder which is not shown. The recording/encoder, after recording/encoding the output from the multiplexer 19 according to characteristic of a recording medium, records the encoded data on a recording medium (not shown).

If the switch 14 is ON, the current frame signal from the multiplexer 11 is subtracted from the motion compensated preceding frame data (which will be described later), in the subtracter 12 and applied to the DCT circuit 13. That is, in this case, inter-frame encoding is carried out to encode differential data using redundancy of inter-frame picture. When a difference between the preceding frame and the current frame is obtained by inter-frame encoding, it will become large if there is any motion in the picture. The differential value is made small by compensating the motion. Compensation is achieved by obtaining a difference at the pixel position corresponding to the motion vector while detecting the motion vector by obtaining the position of the preceding frame corresponding to the fixed position of the current frame. That is, the output of the quantizer 15 is also applied to an inverse quantizer 21. This quantized output is inverse-quantized in the inverse quantizer 21 and inverse DCT processed in an inverse DCT circuit 22 and restored to the original video signal. Further, the original information cannot be played back completely in the DCT processing, requantization, inverse quantization and inverse DCT processing because part of the information is missing. In this case, as the output of the subtracter is a differential information, the output of the inverse DCT circuit 22 is also a differential information. The output of the inverse DCT circuit 22 is applied to an adder 23. This output from the adder 23 is fed back through a variable delay circuit 24 which delays signal by about one frame period and a motion compensator 25, and the adder 23 restores the current frame data by adding differential data to the preceding frame data and provides them to the variable delay circuit 24.

The preceding frame data from the variable delay circuit 24 and the current frame data from the multiplexer 11 are applied to a motion detector 26 where a motion vector is detected. The motion detector 26 obtains a motion vector through a full search motion detection by, for instance, a matching calculation. In the full search motion detection, the current frame is divided into a fixed number of blocks and the search range of, for instance, 15 horizontal pixels×8 vertical pixels are set for each block. In the search range corresponding to a preceding frame, the matching calculation is carried out for each block and an inter-pattern approximation is calculated. Then, by calculating the preceding frame block which provides the minimum distortion in the search range, the vector which is obtained by this block and the current frame block is detected as the motion vector. The motion detector 26 provides the motion vector to the motion compensator 25.

The motion compensator 25 extracts corresponding block data from the variable delay circuit 24, corrects it according to the motion vector and provides it to the subtracter 12 through the switch 14 and also, to the adder 23 after making the time adjustment. Thus, the motion compensated preceding frame data is supplied from the motion compensator 25 to the subtracter 12 through the switch 14. Thus, when the switch 14 is ON, inter-frame compression mode results and if the switch 14 is OFF, intra-frame compression mode results.

The switch 14 is turned ON/OFF based on a motion judging signal. That is, the motion detector 26 generates the motion judging signal depending on whether the motion vector size is in excess of a fixed threshold value and outputs it to a logic circuit 27. The logic circuit 27 controls the ON/OFF of switch 17 by logical judgment using the motion judging signal and a refresh periodic signal.

The refresh periodic signal is a signal showing the intra-frame compression processed frame I illustrated in FIG. 5. If the input of the intra-frame compression processed frame I is indicated by the refresh periodic signal, the logic circuit 27 turns switch 14 OFF irrespective of the motion judging signal. If the motion judging signal indicates that the motion is relatively fast and the distortion calculated by the matching calculation exceeds a minimum threshold value, the logic circuit 27 turns the switch 14 OFF and the intra-frame encoding is carried out for each block even when the inter-frame compression processed frame P data are input. Table 2, shown below, indicates the ON/OFF control of switch 14 by logic circuit 27.

TABLE 2

| Frame I | Intra-Frame Compression Processed Frame | Switch 14 OFF |
| Frame P | Motion Vector Detected Inter-Frame Compression Processed Frame | Switch 14 ON |
|  | Motion Vector Unknown Inter-Frame Compression Processed Frame | Switch 14 OFF |

FIG. 8 is a diagram for illustrating the data stream of record signals which are output from the multiplexer 19.

As shown in FIG. 8, the first and the sixth frames of the input video signal are converted to the intra-frames I1 and I6, respectively and the second through the fifth frames are converted to the inter-frame compression processed frames P1 through P5. The ratio of data amount between the intra-frame compression processed frame I and the inter-frame compression processed frame P is (3–10):1. The amount of data of the intra-frame compression processed frame I is relatively large, while the amount of data of the inter-frame compression processed frame P is extremely reduced. Further, the data of the inter-frame compression processed frame P cannot be decoded unless other frame data is decoded.

FIG. 9 is a block diagram indicating the decoding section (playback section) of a conventional variable length code recorder.

Compressed, encoded data recorded on a recording medium is played back by the playback head which is not shown and applied into an error correction decoder 31. The error correction decoder 31 corrects errors produced in data transmission and recording. The playback data from the error correction decoder 31 are applied to a variable length data decoder 33 through a code buffer memory 32 and decoded to fixed length data. Further, the code buffer memory 32 may be omitted.

The output from the variable length decoder 33 is inverse quantized in an inverse quantizer 34, inverse DCT processed and decoded to the original video signal in an inverse DCT circuit 35, and applied to a terminal of switch 36. The output of the variable length decoder 33 is also applied to a header signal extractor 37. The header signal extractor 37 retrieves a header showing whether the input data is the intra-frame compression data or the inter-frame compression data and provides it to switch 36. When supplied with a header showing intra-frame compression data, switch 36 selects terminal a and outputs decoded data from the inverse DCT circuit 35.

The inter-frame compression data is obtained by adding the output from the inverse DCT circuit 35 and the preceding frame output from the predictive decoder 39 using an adder 38. That is, the output of the variable length decoder 33 is applied to a motion vector extractor 40 and the motion vector is thus obtained. This motion vector is applied to a predictive decoder 39. The decoded output from the switch 36 is delayed for one frame period by a frame memory 41. The predictive decoder 39 compensates the preceding frame decoded data from the frame memory 41 according to the motion vector and provides them to the adder 38. The adder 38 decodes the inter-frame compression data by adding the output from the predictive decoder 39 and the output from the inverse DCT circuit 35 and provides the decoded inter-frame compression data to the terminal b of the switch 36. When the inter-frame compression data is applied, switch 36 selects terminal b based on the header and outputs the decoded data from the adder 38. Thus, the compression and expansion are carried out without delay.

However, intra-frame compression processed frame I and inter-frame compression processed frame P differ in encoded amounts. Thus, if the data stream shown in FIG. 8 is recorded on a recording medium, one frame will not necessarily be able to be played back in a playback operation at a triple speed. Further, the inter-frame compression processed frame P processed inter-frame compression will become unable to playback if any undecoded frame is generated in the playback operation at triple speed because it cannot be decoded for an independent frame.

Thus, the conventional variable length code recorder described above has a problem in that the picture quality played back in the special playback operation deteriorates greatly because each data frame is of variable length and some data frames of a single frame cannot be decoded.

Since data of every frame is in variable length and since there is frame data which cannot be decoded as described above, picture quality deteriorates in special playback operation. However, it is possible on a VCR having a high efficiency encoding process to play back encoded data to some extent while suppressing error propagation by synchronizing the signal, etc. However, if there is data which is not transmitted in circumstances, such as video-conference, video-telephone, etc., where high efficiency encoded signals are applied to, for instance, a TV set, errors are extensively propagated and the quality of displayed images is deteriorated.

This problem will be discussed in reference to FIG. 10, FIG. 11 and FIGS. 12(a) through 12(f). FIG. 10 is a diagram for explaining a broadcasting system adopted for video-conference, video-telephone, etc.

In a broadcasting station, video signals from cameras (not shown) are high-efficiency encoded in an encoder 151 and added with an error correction code in an error correction encoder 152 corresponding to a transmission line 154. A transmission modulator 153 modulates the output from the error correction encoder 152 corresponding to the transmission line 154 prior to placing the output on the transmission line 154. At the receiving section, signals received through the transmission line 154 are demodulated in a receiving demodulator 155. An error corrector 156 corrects errors generated in the transmission line 154 and feeds them to a switch 157 and also to a VCR 158. The VCR 158 records the input signals or plays back the signals and feeds them to the switch 157. The switch 157 is switched by an input switching signal based on user operation. The switch 157 selects either the output of the error corrector 156 or that of the VCR 158 and provides it to a decoder 159. The decoder 159 decodes the high-efficiency encoded signals back to original signals and an error corrector 160 corrects errors remaining in the decoded output and provides them to a monitor TV set (not shown). Thus, the broadcasting signals applied through the transmission line 154 or playback signals from the VCR 158 are displayed on the screen of the monitor TV set.

FIG. 11 is a block diagram for illustrating the construction of a VCR which is capable of high-efficiency encoding and decoding. Further, the VCR shown in FIG. 10 is of the same construction as shown to the right of the broken line in FIG. 11.

Video signals are high-efficiency encoded in an encoder 161 and then applied to an error correction encoder 162. The error correction encoder 162 provides encoded data with an error correction parity code adapted to a VCR added at adder 163. The adder 163 adds a synchronizing signal and ID signal, generated in an ID generator 164, to the output of the error correction encoder 162 and provides the output to a recording/modulator 165. The recording/modulator 165 modulates this output and provides it to a recording amplifier 166. This recording amplifier 166 amplifies the modulated signals and feeds them to a magnetic head 167 for recording on a tape 168.

In a playback operation of recorded signals, the tape 168 is traced by the magnetic head 167 to play back recorded signals and the playback signals are supplied to a playback amplifier 169. The playback signals from the playback amplifier 169 are waveform equalized in a waveform equalizer 170 to reduce inter-code interference and then applied to a synchronizer 171. The synchronizer 171 restores the playback data in units of recorded data and feeds them to a demodulator 172. The demodulator 172 demodulates the playback data and feeds them to an error corrector 173. The error corrector 173 corrects errors in the playback data and provides to a decoder 174. The decoder 174 and an error corrector 175, identical to the decoder 159 and error corrector 160 shown in FIG. 10, decodes the output of the error corrector 173 and after correcting errors, outputs the error corrected output.

It is assumed that the switch 157 shown in FIG. 10 selects the VCR 158. Data transmitted from a broadcasting station via the transmission line 154 are supplied to the VCR 158. Data transmitted from a broadcasting station via the transmission line 154 are supplied to the error corrector 156. Thus, the recording data train shown in FIG. 12(a) is applied to the VCR 158. In FIG. 12(a), the subscript n denotes track number and the subscript m denotes recorded data train number. That is, Gn, m denote the mth data train on the nth track.

If the data train Gn,1 through Gn, m is recorded in the VCR 158 and this data train is played back without error, the reencoded data train will become identical to the playback data train in the normal playback operation as shown in FIG. 12(b). However, data is played back by the magnetic head while crossing the tracks in the playback operation at triple speed, as described above, and therefore, the playback data does not agree with the recorded data. That is, as shown in FIG. 12(c), the k0 data train through the k1 data train are played back on the first track, the k2 through k3 data trains are played back on the second track, and the k4 through k5 data trains are played back on the third track.

The VCR 158 carries out the demodulation, error correction and decoding processes of this playback data. However, data may not be played back correctly at portions where the recording tracks are switched. Furthermore, the playback data trains become discontinuous at switching points of the recording tracks. Thus, data around the track switching points cannot be used for decoding. Further, in the VCR 158, video data is recorded with a synchronizing signal and ID signal added and demodulated in the synchronizer 171 when played back. Therefore, if data is not played back in the middle of a synchronizing block, it is possible to demodulate data from the starting position of the next synchronizing block. Thus, the portion shown by the broken lines in FIG. 12(d) are not output against FIG. 12(c).

However, if header and address are added to data, a monitor TV set is not able to reconstruct images using the data and simply displays images in order of input image data. Transmitted data trains are of variable length. Even when data length of the broken lined part shown in FIG. 12(d) is known, it is not possible to identify the start position of next data train k2's. Accordingly, it is not possible to display playback images using all playback outputs from the VCR 158 on the screen of a monitor TV set because information data is not used effectively when an error flag is added to it. That is, in such a system as video-telephone, which decodes input data trains continuously, if data is interrupted, subsequent data cannot be used efficiently.

So, in order to stop error propagation, decoding may be enabled for a fixed period of the top of a track by specifying the top of the track as the start position of a data train as shown in FIG. 12(e). This will make it possible to decode a data train G1, K0' through G1, K1'. Further, FIG. 12(f) illustrates an example where the data position with a Δ mark was set as the data train start position. In this case, the data train G1, 11 through G1, 12 can be decoded.

As described above, a problem occurs if discontinuous data is transmitted because data available for effective use in playback operation of images decreases.

A playback signal processing method which is capable of special playback operation using the above special playback heads is shown in FIG. 13. In this drawing, a signal played back by a normal head 210 is amplified in an amplifier 211 and supplied to a detector 250 and a switch 223. Similarly, a signal played back by a special purpose head 216 is amplified in an amplifier 217 and supplied to a detector 251 and switch 223. In the detectors 250 and 251, envelop constituents of respective signals are detected and provided to an amplitude comparator 252. In the amplitude comparator 252, amplitudes of these two signals are compared and the result is supplied to a switch 253.

A switching signal is also supplied to the switch 253 and one of these signals is selected by a mode selecting signal and supplied to the switch 223 as a control signal. The switch 223 selects one of the outputs from the amplifiers 211 and 217 according to this control signal and supplies it to a demodulator 224 where the output signal is demodulated. This demodulated signal is restored to the original image signal in a playback processor 254.

The switching signal described above is used to select a preset head output signal. If this signal is selected by the switch 253, the outputs from the amplifiers 211 and 217 are selected alternately. In the amplitude comparator 252, a signal of larger amplitude is normally selected. Therefore, the output of the amplitude comparator 252 is selected by the mode selecting signal in the switch 253 and the output of larger amplitude from the amplifiers 211 and 217 is selected at the switch 223.

FIG. 14 illustrates trace patterns in the playback operation at triple speed. In this drawing, although the tracks are aslant on a tape, the trace of the head is vertical to the traveling direction of a tape because of triple speed. Therefore, the trace of the head extends over the tracks b, c and d. However, because the azimuth angles of the tracks b and c differ from those of the tracks c and d, data on Trace 1 is played back by selecting data played back, for instance, by the playback heads from S to A out of Trace 1, by the special purpose heads from A to B and by the playback heads from B to E.

If analog signals are played back in this way, an image without a noise bar is obtainable on a screen. However, as data is recorded on a tape in block units when digitally processed, the signals may be switched in the middle of a block if signals played back from two heads are switched according to the amplitude or at a preset switching point. In this case, because data of a block makes no sense, invalid data is produced before or after the switching. This state is shown in FIGS. 15(a) and 15(b).

FIG. 15(a) indicates data played back by the playback head and FIG. 15(b) is data played back by the special purpose head. "SY", "ID", "D" and "PA" indicate synchronizing signals, ID signals, data and parity signals, respectively. "SY" through "PA" form one block.

Here, assuming that the switching points are set at the points A and B, signals are switched in the middle of data D. If the switching point is A, signals are synchronized as the positions of both "SY" are in accord with each other, but data is invalid because the tracks are different. So, the portion of A in FIG. 15(a) and the portion of B in FIG. 15(b) become invalid data. If the switching point is B, signals are not synchronized as both of the two "SY"'s are out of position. As described above, if the switching point is preset or set according to the amplitude, invalid data is produced before and after the switching point and in addition, signals can not be synchronized in some cases.

When a recorded video tape is played back in a VCR at triple speed, the trace of the head crosses three tracks on a magnetic tape. To prevent azimuth angles from becoming different or noise bars from being generated on a screen, special playback heads are provided adjacent to ordinary playback heads and recorded data is played back by switching signals played back by the respective playback heads. However, when recorded data is digitally processed, invalid data is produced before or after the switching point if the switching point is preset or set according to signal amplitude. Furthermore, signals can not be synchronized in some cases.

SUMMARY OF THE INVENTION

It is, therefore, an object of the present invention to provide an apparatus for recording and playing back digital data with variable length codes capable of obtaining a stabilized, quality playback picture even when intra-frame compression data and inter-frame compression data are available.

Another object of the present invention is to provide an apparatus for recording and playing back digital data with variable length codes capable of improving the playback image by transmitting encoded data with a virtual signal inserted into designated error portions of the data for an image playback apparatus.

Still another object of the present invention is to provide an apparatus for recording and playing back digital data with variable length codes capable of improving the quality of pictures when they are played back by making the most of seemingly invalid data.

In order to achieve the above object, a digital signal recording and playback apparatus according to one aspect of the present invention includes a data rearranging circuit for rearranging the intra-frame compression data in the variable length encoded data and an address and a data length adding circuit for adding addresses and data length information of the intra-frame compression data output from the data rearrangement circuit.

In a second aspect of the apparatus for recording and playing back digital data with variable length codes encoded from intra-frame compression data and inter-frame compression data according to the first embodiment of the present invention, the data rearranging circuit includes a circuit for rearranging the inter-frame compression data located in variable length encoded data in units of sync blocks located in recorded codes.

A third aspect of the apparatus for recording/playing back digital data with variable length codes encoded from intra-frame compression data and inter-frame compression data according to the first embodiment of the present invention, includes a data rearranging circuit for uniformly rearranging all data by combining the intra-frame compression data and the inter-frame compression data into one frame of data and varying the arrangement of the data within the one frame, and a circuit for adding address information and data length information of the intra-frame compression data included in the data rearranging circuit.

In a fourth aspect of the apparatus for recording playing back digital data with variable length codes encoded from intra-frame compression data and inter-frame compression data according to the first embodiment of the present invention, the data rearranging circuit includes a circuit for dividing one frame of data into a predetermined number of data sections which are comprised of intra-frame compression data and the interframe compression data, and a circuit for uniformly arranging all of the intra-frame compression data by varying the arrangement of the intra-frame compression data in each data section frame unit.

A fifth aspect of the apparatus for recording and playing back digital data with variable length codes encoded from intra-frame compression data and inter-frame compression data according to a second embodiment of the present invention includes an encoder having an address information generator for generating address information for each block of high efficiency encoded data and a multiplexer for multiplexing the address information onto the encoded data.

A sixth aspect of the apparatus for recording and playing back digital data with variable length codes encoded from intra-frame compression data and inter-frame compression data according to the second embodiment of the present invention includes a decoder having an error detecting means for detecting errors in high efficiency encoded data. The high efficiency encoded data comprises address information multiplexed on encoded data for each block, a zero data generator for generating zero data in a block unit with an error flag added, a switch for selectively outputting the encoded data or the output from the zero data generator, a controller for controlling the switch to replace a transmission data error block with an output from the zero data generator by detecting an error block address from the detected result of the error detector, and an invalid data inserting circuit for inserting invalid data between the encoded data and the zero data in order to maintain the output data rate of the switch constant.

A seventh aspect of the apparatus for recording or playing back digital data with variable length codes encoded from intra-frame compression data and inter-frame compression data according to a third aspect of the present invention includes at least two ordinary video heads provided on a rotating drum for ordinary playback operation; at least two special video heads provided adjacent to the ordinary video heads, respectively, for use only in special playback operation; a first playback processor for playing back compression encoded digital signals by the ordinary video heads; a second playback processor for playing back compression encoded digital signals by the special video heads; a generator for generating a control signal by obtaining a switching point where invalid data is least produced through a calculation based on outputs from the first and second playback processors; a selector for selecting either one of the outputs of the first and second playback processors based on the control signal, and a decoder for decoding video signals based on the output from the selector.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1(*a*) and 1(*b*) are diagrams for explaining the contrast of the positions on the frame with the positions on a recording medium in a conventional example;

FIGS. 2(*a*) through 2(*d*) are diagrams for illustrating the relationship between the trace pattern and the playback envelope at triple speed playback;

FIG. 3 is a diagram for illustrating the construction of the recording/playback head;

FIGS. 4(*a*) and 4(*b*) are diagrams for explaining the construction of the playback frame in a conventional example;

FIG. 5 is a diagram for explaining the compression method according to CCITT recommendation;

FIG. 7 is a diagram for explaining a macro block;

FIG. 10 is a block diagram for explaining a problem associated with a conventional example;

FIG. 14 is a diagram for explaining the relation between tracks and trace of the recording/playback head;

FIGS. 15(*a*) and 15(*b*) are diagrams for explaining the construction of compression encoded image data;

FIGS. 20(*a*) through 20(*c*) are diagrams for explaining the principle of this embodiment;

FIGS. 27(*a*) through 27(*c*) are diagrams for explaining the encoding in another embodiment of the present invention;

FIGS. 28(*a*) through 28(*d*) are diagrams for explaining the data stream in the embodiment shown in FIGS. 27(*a*) through 27(*c*);

FIGS. 35(a) through 35(c) are diagrams for explaining the operation of the transmission apparatus according to the embodiment of FIG. 33;

FIGS. 36(a) and 36(b) together form a block diagram for illustrating the construction of the first embodiment of the present invention;

FIGS. 38(a) and 38(b) together form a block diagram for illustrating the construction of the second embodiment of the present invention;

FIG. 39 is a timing chart for explaining the operation of the second embodiment of the present invention;

FIGS. 40(a) and 40(b) together form a block diagram for illustrating the construction of the third embodiment of the present invention; and FIG. 41 is a timing chart for explaining the operation of the third embodiment of the present invention.

DESCRIPTION OF THE PREFERRED EXEMPLARY EMBODIMENTS

Figure 6:
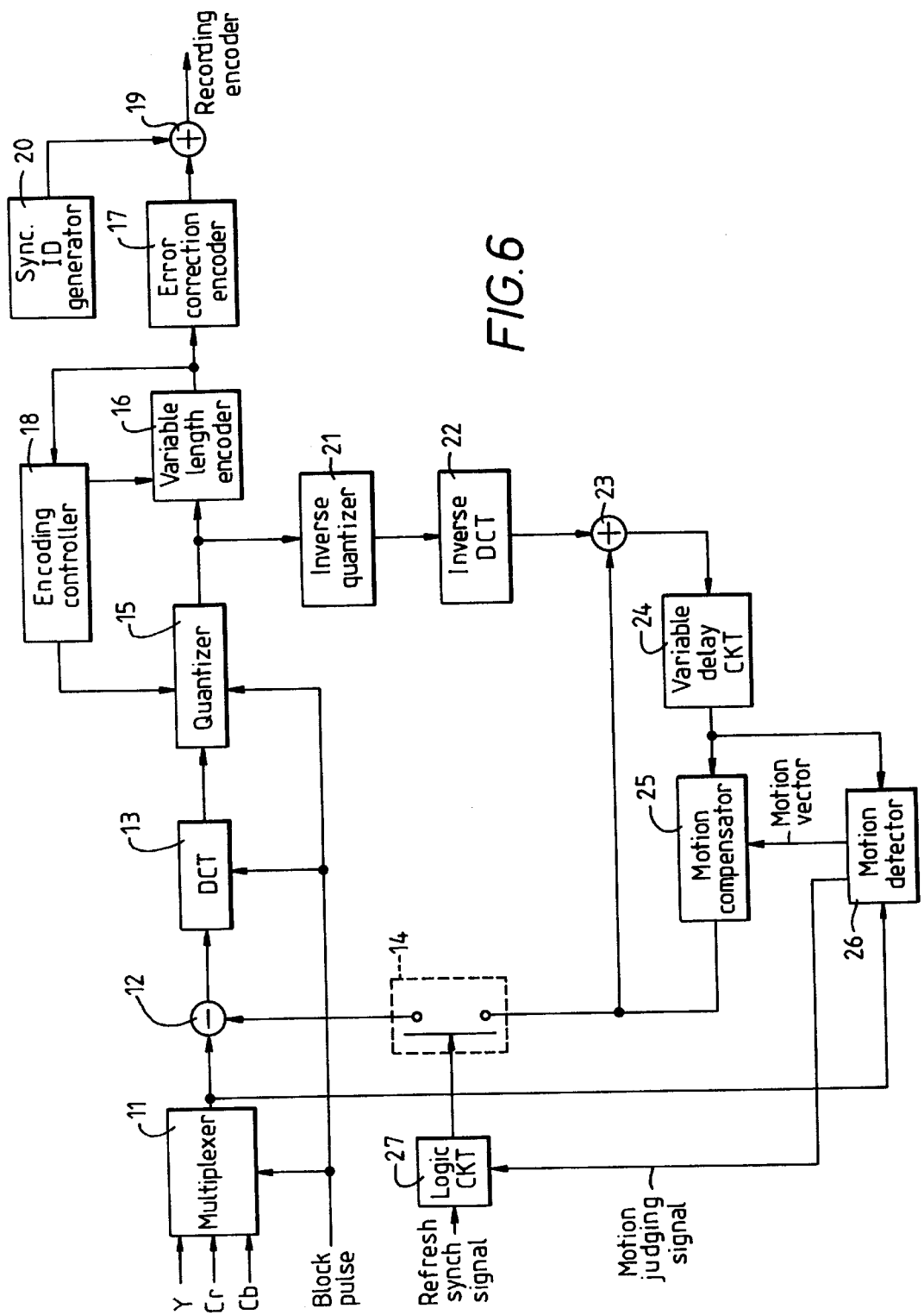
FIG. 6 is a block diagram for illustrating the recording side of a conventional variable length code recorder adopting predictive encoding.
Figure 8:
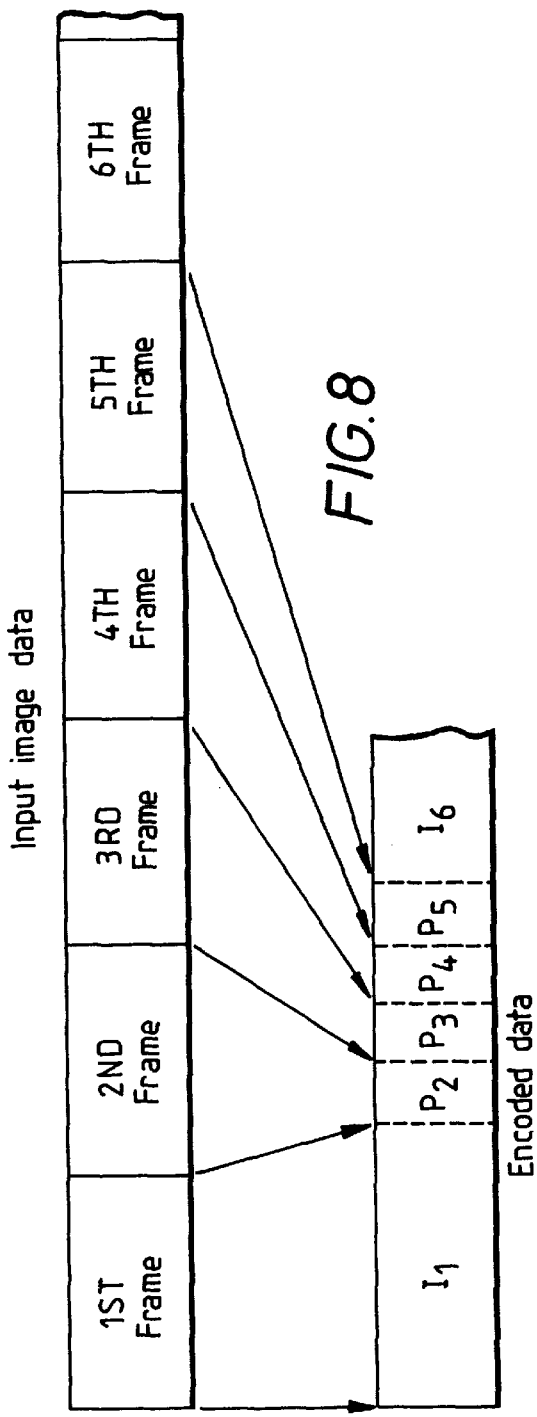
FIG. 8 is a diagram for illustrating a data stream of recorded signals in the recorder shown in FIG. 6.

The present invention will be described in detail with reference to the FIGS. 16 through 41. Throughout the drawings, reference numerals or letters used in FIGS. 1 through 15 will be used to designate like or equivalent elements for simplicity of explanation.

Figure 9:
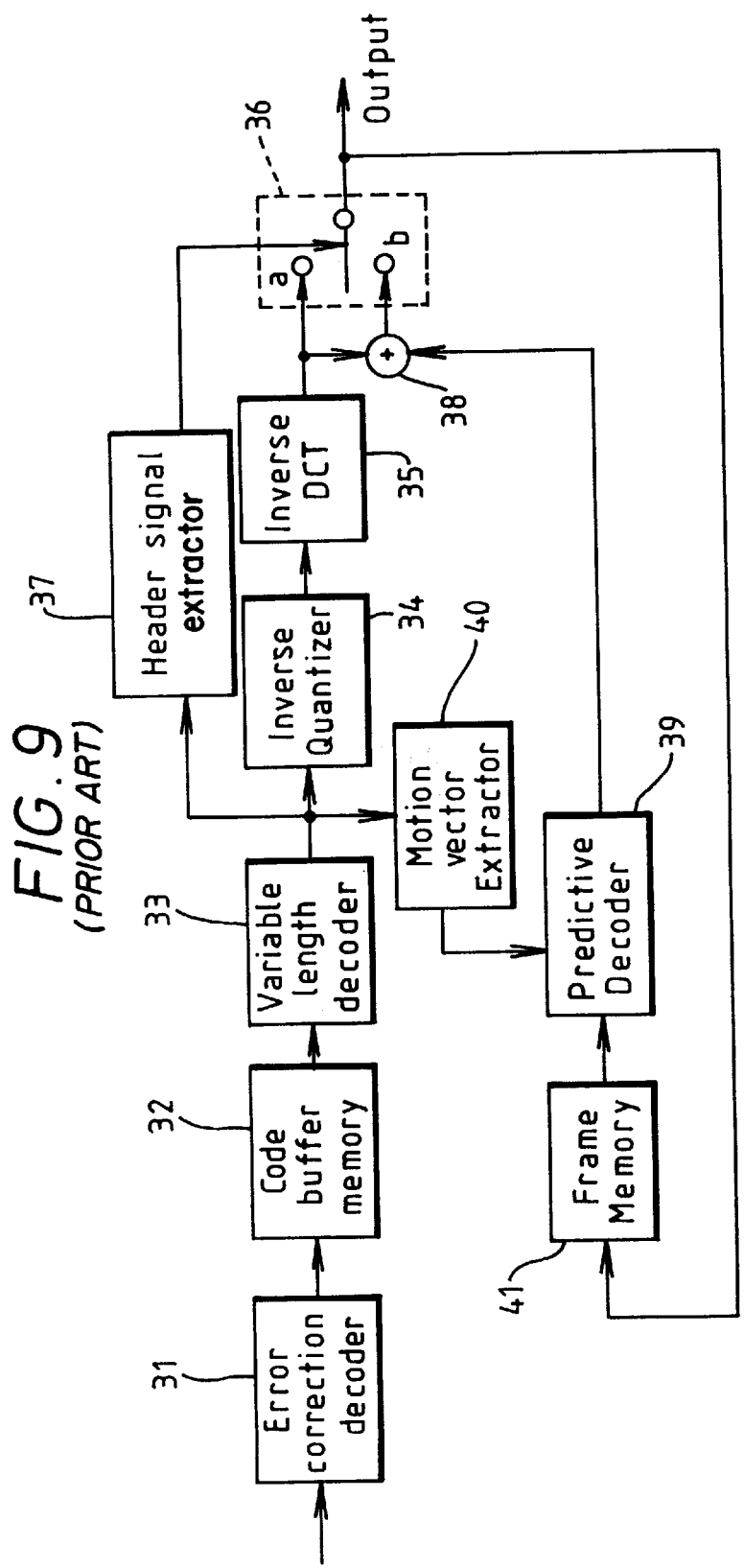
FIG. 9 is a block diagram for illustrating the decoding side (playback side) of a conventional variable length code recorder.
Figure 16:
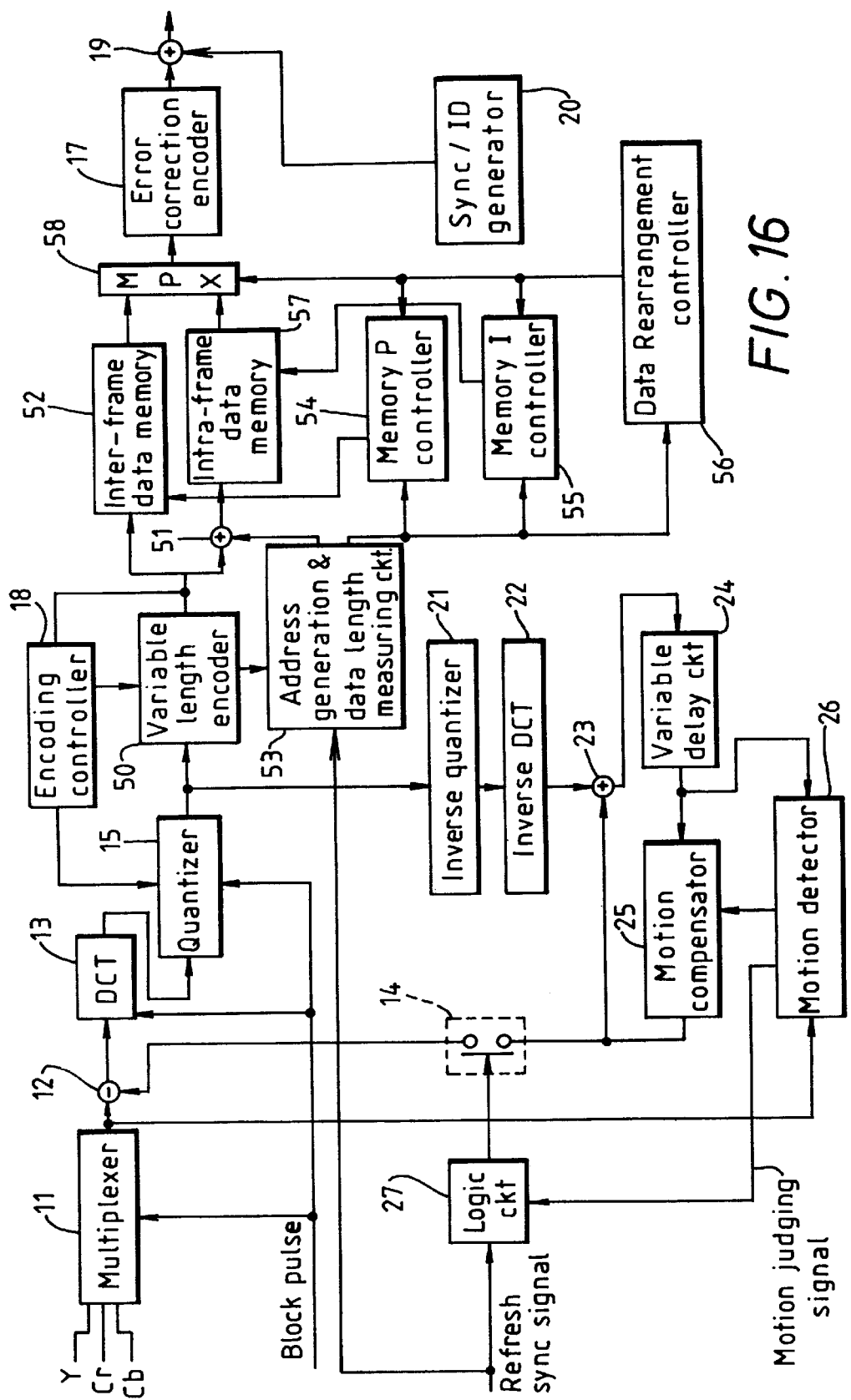
FIG. 16 is a block diagram for illustrating one embodiment of the recording section (encoding section) of the variable length code recorder according to the present invention.
Figure 17:
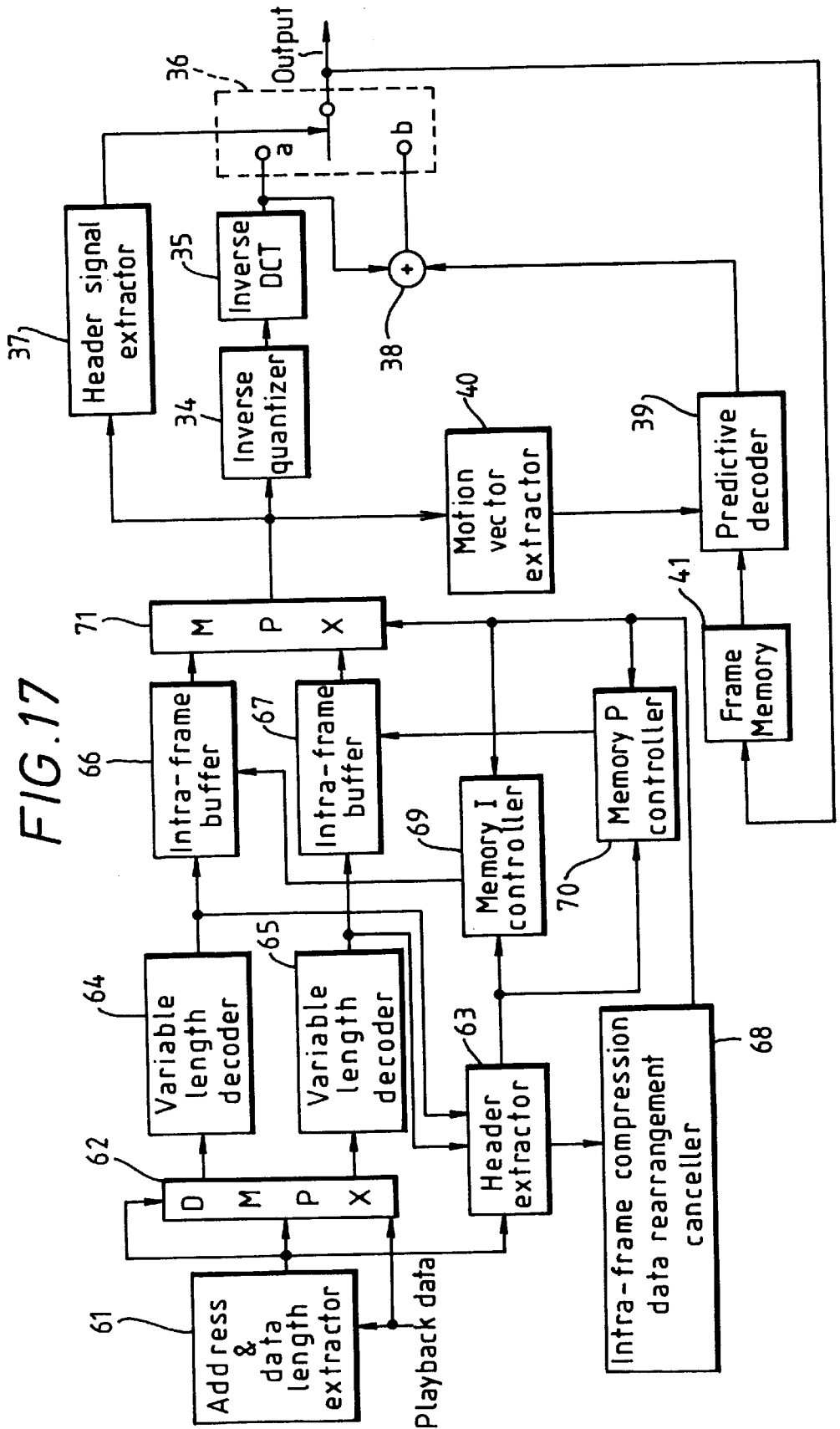
FIG. 17 is a block diagram for illustrating one embodiment of the recording section (encoding section) of the variable length code recorder according to the present invention.

Referring now to FIGS. 16 through 31, a first aspect of the present invention will be explained in detail. FIG. 16 is a block diagram for illustrating an embodiment of the recording section (encoding section) of the variable length code recorder according to the present invention. FIG. 17 is a block diagram for illustrating an embodiment of the playback section (decoding section) of the variable length code recorder of the present invention. In FIGS. 16 and 17, the same component parts as in the FIGS. 6 and 9 are assigned the same reference numerals. This embodiment is applied to a recorder which performs the intra-frame compression for each frame.

Figure 18A:
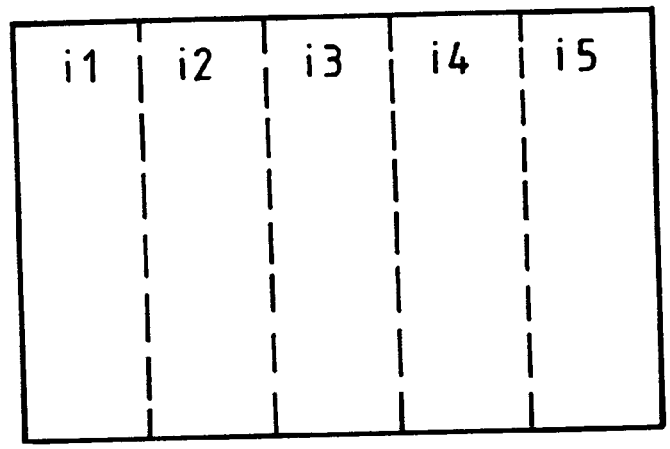
FIGS. 18(*a*) through 18(*f*) are diagrams for explaining the principle of this embodiment.
Figure 18B:
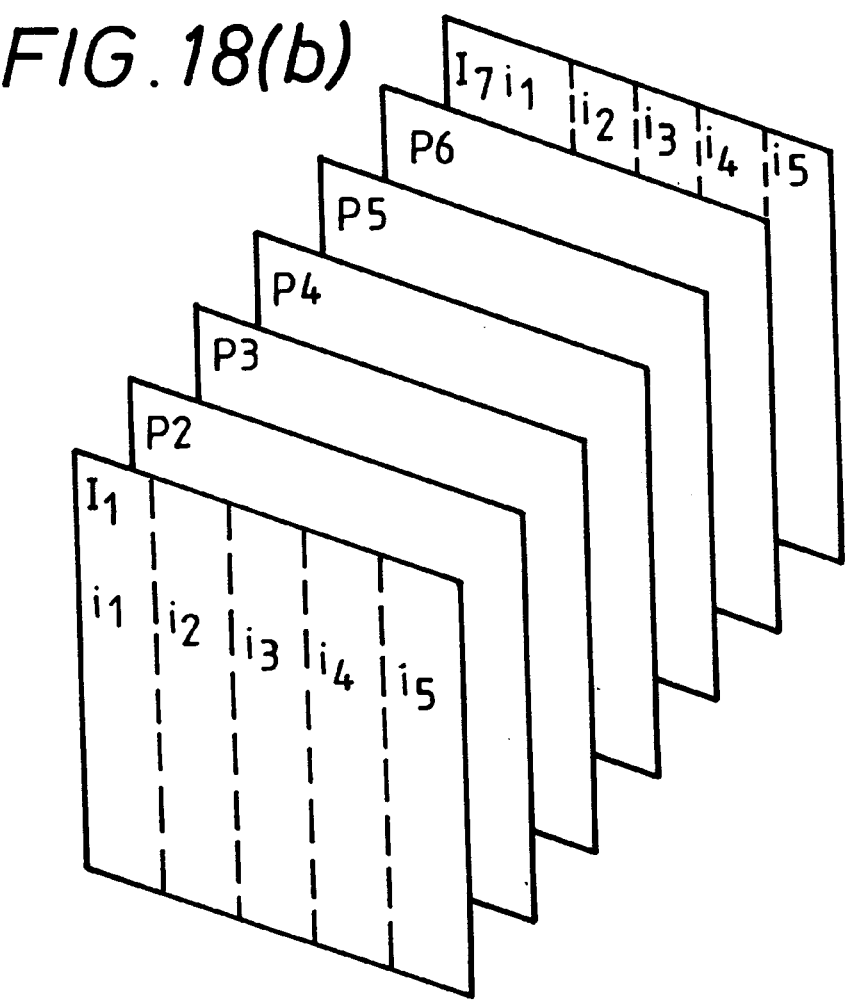

First, the principle of this embodiment is explained in reference to FIGS. 18(a) through 18(f), FIGS. 19(a) through 19(f) and FIGS. 20(a) through 20(c). FIG. 18(a) indicates the division of the intra-frame area, FIG. 18(b) indicates the arrangement of the intra-frame compression processed frame and the inter-frame compression processed frame, and FIGS. 18(c) through 18(f) indicate the data format of a recording signal.

In this exemplary embodiment, as shown in FIG. 18(a), the intra-frame compression processed frame I is divided into five parts horizontally or vertically and the divided parts are referred to as i1, i2, i3, i4 and i5, respectively. The intra-frame compression processed frame I is constructed every six frames. That is, the frames are arranged in order of the intra-frame compression processed frame I1, inter-frame compression processed frames P1 through P5, intra-frame compression processed frame I7, . . . and so on. The intra-frame compression processed frame I is divided into five parts and five P frames are between the intra-frames I. Further, it is desirable that the number of divided parts of the intra-frame compression processed frame I and the number of the inter-frame compression processed frames P are at a fixed ratio.

When a series of frame data is processed by an intra-frame or inter-frame compression process, the data stream after the compression is arranged in order of I1 (i1) (data corresponding to the part i1 of the intra-frame compression processed frame I), I1 (i2), . . . (I1 (i5), P2, P3), . . . and so on as shown in FIG. 18(c). Further, the time division of the data streams I1 (i1 through I) (i5) by processing in a time sequence may not be possible.

In this embodiment, the data stream shown in FIG. 18(c) is converted into the arrangement shown in FIG. 18(d). That is, it is arranged in such combinations as Data I1 (i1) and Data P2, Data I1(i2) and Data P3, Data I1 (i3) and Data P4, Data I1 (i4) and Data P5, Data I1 (i5) and Data P6, . . . and so on. In this case, the data combination is so set that the data rate becomes almost constant.

The set of data consisting of the data of Part i of the intra-frame compression processed frame I and the data of the inter-frame compression processed frame P is composed of the plural number of sync blocks as shown in FIG. 18(e). Further, the data of Part i of the intra-frame compression processed frame I is composed of m2 macro blocks. That is, one frame is composed of (5×m2) pieces of macro block. In this embodiment, the number of sync block m1 that is recorded on one track of a recording medium is set to satisfy the following expression (1).

$$m1 = k \times m2 \tag{1}$$

where k is a positive integer or a positive fraction.

For instance, in case of k=1, a sync block corresponds to a macro block at 1:1 and in case of k=2, one sync block corresponds to two macro blocks. Further, in case of k=½, a macro block is divided into two to correspond to one sync block. For instance, a macro block may be divided to a set of the luminance signals Y1, Y2 and a set of the color difference signals Cb, Cr to correspond to a sync block. Further, a macro block may be divided to a set of the luminance signal Y1 and the color difference signal Cb and a set of the luminance signal Y2 and the color difference signal Cr to correspond to a sync block. Each macro block corresponds to a fixed sync block in this way.

The macro block which is processed by the intra-frame compression process is added with such information as ID showing its number and address to compare its macro block with the frame position and macro block data length as shown in FIG. 18(f). If these data do not satisfy one sync block length, a sync block is composed with the inter-frame compression processed frame P data added in order and an error correction parity added lastly.

If data of macro blocks can be arranged in one sync block, there is no problem. If a macro block length is too long to arrange one macro block fully in one sync block, it is necessary to process excess data. The required process is, for instance, a method to add excess data to next macro block information, a method to delete excess data or a method to arrange the excess data in next macro block, slide subsequent macro blocks in order and absorb the excess data within the number of sync blocks provided excessively in advance.

As shown in FIGS. 18(d) through 18(f), the data of sections i1 through i5 of the intra-frame compression processed frame I1 is uniformly arranged at regular intervals and following the data of I1, the data of the sections i1 through i5 of the intra-frame compression processed frame I7 is uniformly arranged. Thus, the data of the sections i1 through i5 of the intra-frame compression processed frames I1 and I7 is arranged at regular intervals in units of macro block. Further, each of the macro blocks are combined with its address and data length to facilitate identifying a sync block corresponding to a fixed macro block.

When the data in this format is recorded on a magnetic tape, the intra-frame compression data is uniformly arranged on the recording track. FIGS. 19(a) through 19(f) are diagrams for explaining the tracing of the intra-frame compression processed frames in the playback operation at triple speed. FIGS. 19(a) through 19(f) show the reproducing positions of the first to the sixth tracings by the oblique lines, respectively. In FIGS. 19(a) through 19(f), one frame of data is recorded on one track, that is, it is assumed that the amount of data of one frame is equivalent to the amount of data of one track on the average. Further, similar to FIG. 2(d), for instance, the played back synthetic playback envelope of the tracks #1, #2 and #3 is obtained in the first tracing.

As described above, the inter-frame compression data is for a differential picture and cannot be output even when it is decoded by performing the inverse quantization process and the inverse DCT process unless the preceding frame data is played back. However, the intra-frame compression data can be used by decoding it. If the intra-frame compression data is uniformly arranged on the recording tracks and error rates of the playback section are above a predetermined tolerance, it is still possible to playback the section such that the resulting playback picture is predictable once the playback position is decided. If the tracing position is definite, a picture capable of playback can be grasped with certainty.

Figure 19A:
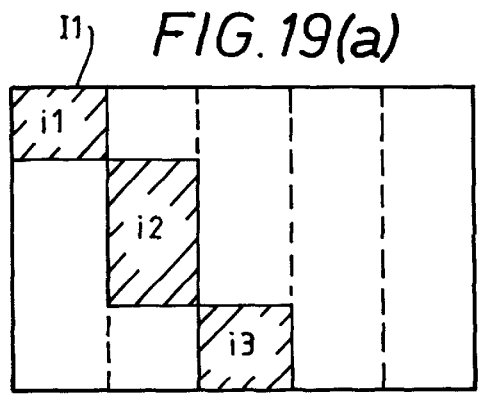
FIGS. 19(*a*) through 19(*f*) are diagrams for explaining the principle of this embodiment.
Figure 19D:
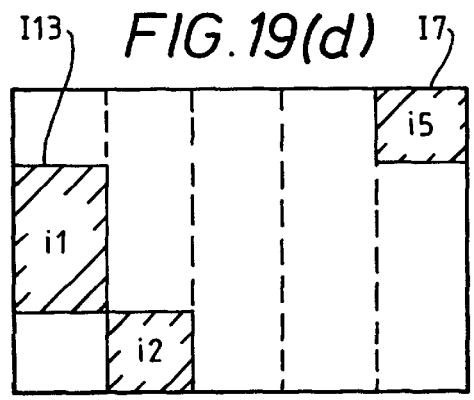
Figure 19B:
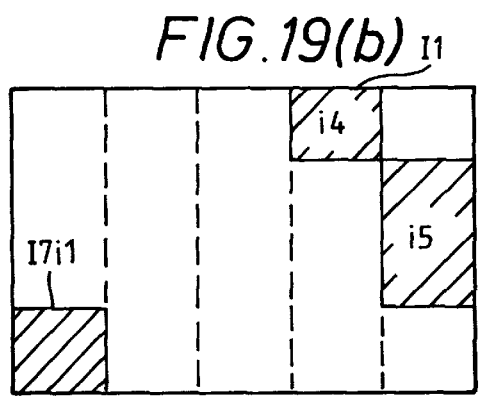
Figure 19E:
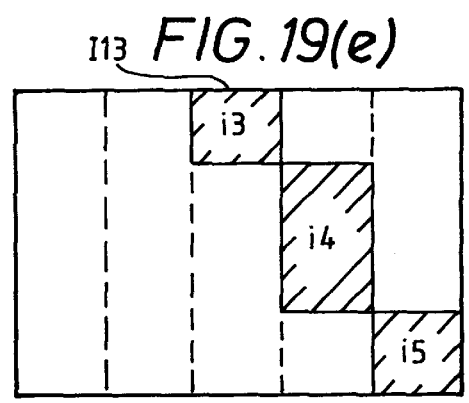
Figure 19C:
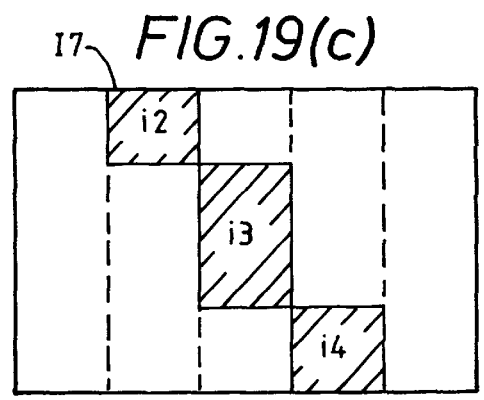
Figure 19F:
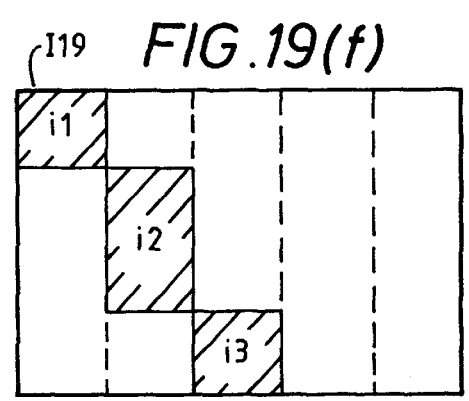

As shown in FIG. 19(a), the tracks #1, #2 and #3 are traced in the first tracing and the data of the section i1 through i3 of the intra-frame compression processed frame I1 is played back. In the second tracing, the tracks #4, #5 and #6 are traced and the data of the section i4 and is of the intra-frame compression processed frame I1 and those of the section i5 of the intra-frame compression processed frame I7 is played back as shown in FIG. 19(b). In the third tracing, the tracks #7, #8 and #9 are traced and the data of the sections i2 through i4 of the intra-frame compression processed frame I7 is played back as shown in FIG. 19(c). In the fourth tracing, the tracks #10, #11 and #12 are traced and the data of the section i5 of the intra-frame compression processed frame I7 and the data of the sections i1 and i2 of the intra-frame compression processed frame I13 is played back as shown in FIG. 19(d). In the fifth tracing, the tracks #13, #14 and #15 are traced and the data of the sections i3 through i5 of the frame I13 is played back as shown in FIG. 19(e). In the sixth tracing, the same parts as in the first tracing are traced, that is, the data of sections i1 through i3 of the intra-frame compression processed frame I19 is played back as shown in FIG. 19(f). From the least common multiple 15 of the number of division [5] of the intra-frame compression processed frame and the playback speed [3], it is seen that all data is played back by the tracing of 15 tracks.

FIGS. 20(a) through 20(c) are diagrams for illustrating the composition of a playback picture. FIG. 20(a) shows the composition according to the tracing method shown in FIGS. 19(a) through 19(f) and FIGS. 20(b) and 20(c) shows the composition according to the tracing method shown in another embodiment described later.

As shown in FIG. 20(a), when the tracing method shown in FIGS. 19(a) through 19(f) is used, all sections of one frame picture are played back by the first through the fifth tracings and a picture is composed by the playback data of the sections of the intra-frame compression processed frames I1, I7 and I13.

FIGS. 21(a) through 21(k) are diagrams for explaining the tracing of the intra-frame compression processed frame for recording one frame picture by dividing it to two tracks in triple speed playback operation. FIGS. 21(a) through 21(k) illustrate the first through eleventh tracings, respectively. Further, FIGS. 22(a) through 22(e) are diagrams for illustrating an output frame picture.

Figure 21A:
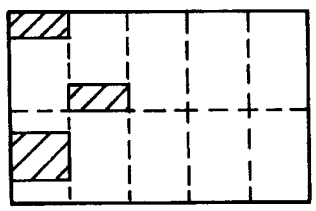
FIGS. 21(*a*) through 21(*k*) are diagrams for explaining the principle of this embodiment.
Figure 21E:
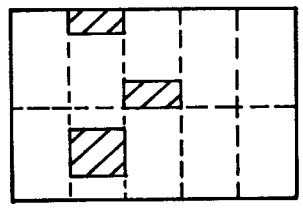
Figure 21I:
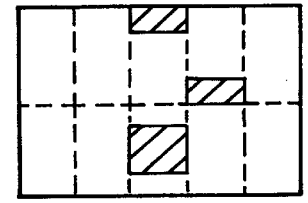
Figure 21B:
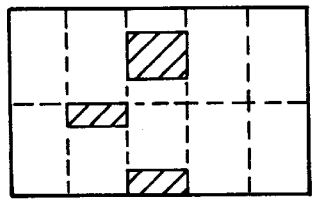
Figure 21F:
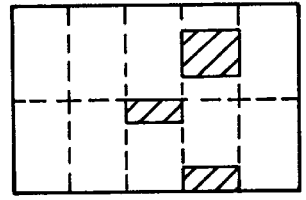
Figure 21J:
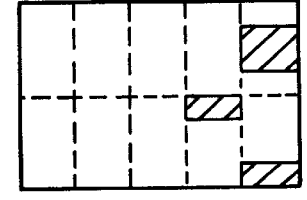
Figure 21C:
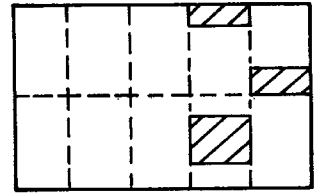
Figure 21G:
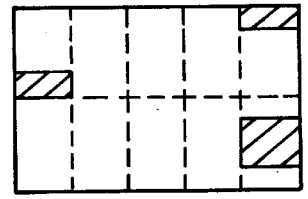
Figure 21K:
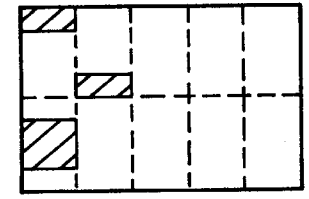
Figure 21D:
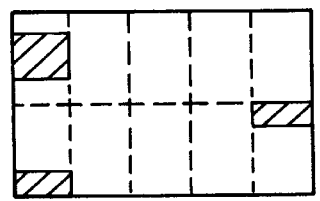
Figure 21H:
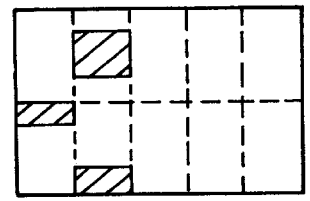
Figure 22A:
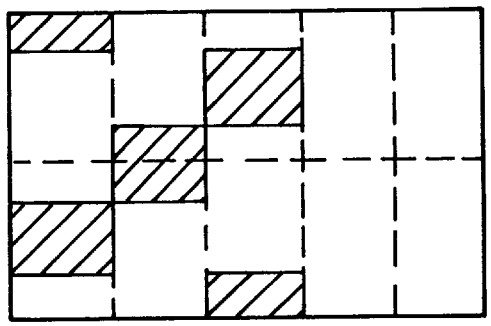
FIGS. 22(*a*) through 22(*e*) are diagrams for illustrating the output frame in an embodiment of the present invention.
Figure 22D:
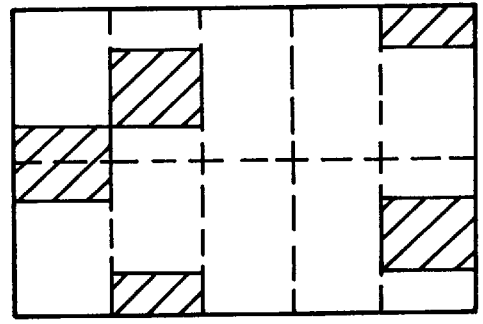
Figure 22B:
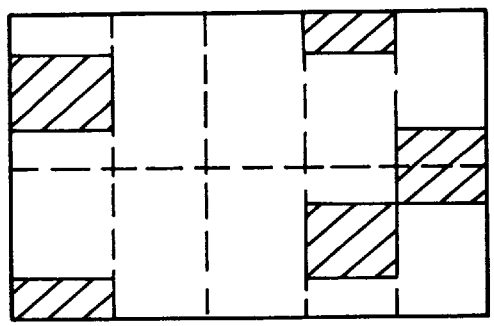
Figure 22E:
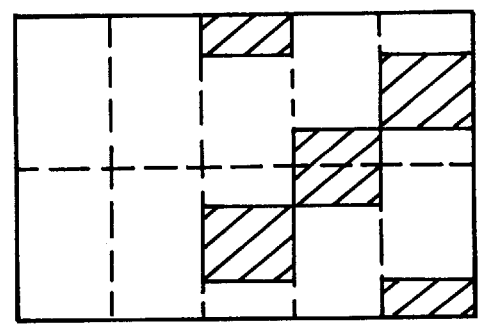
Figure 22C:
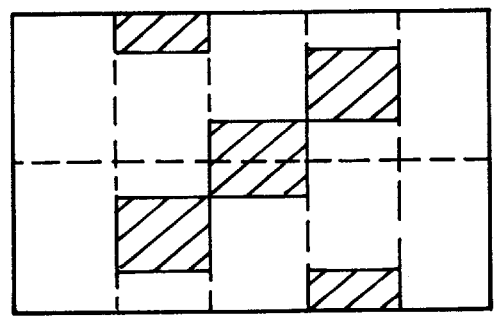

In this recording method, it may be considered that all sections of the intra-frame compression processed frame are divided into two upper and lower parts and recorded vertically in order from the left end. That is, in the first tracing the upper ¼ part at the upper portion of section i1, the central ½ part at the lower portion of the section i1, and the lower ¼ parts at the upper portion of the section i2 are played back as shown in FIG. 21(a). In the second tracing, the upper ¼ parts at the lower portion of the section I2, the central ½ part at the upper portion of the section i3, and the lower ¼ part at the lower portion of the section i3 are played back as shown in FIG. 21(b). Thereafter, the tracings are repeated in the same manner and in the eleventh tracing, the same section as in the first tracing is played back as shown in FIG. 21(k).

As one data frame is divided to be recorded on two tracks, one frame passes in two tracings. That is, the section to be updated for each frame in the playback operation is for two tracings and the section to be updated for five frames are as shown in FIGS. 22(a) through 22(e). As shown in FIGS. 21(a) through 21(k) and FIGS. 22(a) through 22(e), all sections of one frame, are played back in 10 times tracings.

Next, the construction of the recorder to realize the principle described in the above is explained.

In FIG. 16, a luminance signal Y and color difference signals Cr and Cb are applied to a multiplexer 11. The multiplexer 11 multiplexes the input signals in units of eight (8) pixels×eight (8) horizontal scanning lines per block and also, multiplexes them in units of macro blocks consisting of two luminance signal blocks Y1 and Y2 and color difference signal blocks Cr and Cb. The multiplexer 11 provides the macro blocks to a subtracter 12. The subtracter 12 is supplied with the proceeding frame data through a switch 14, and subtracts the preceding frame data from the multiplexer 11 output and provides the result to a DCT circuit 13.

The DCT circuit 13 processes the output of the subtracter 12 through the 8×8 two-dimensional DCT process and provides the result to a quantizer 15. The quantizing coefficient of the quantizer 15 is controlled by an encoding controller 18, which lowers the bit rate by quantizing the output of the DCT circuit 14 using the quantizing coefficient and provides it to a variable length encoder 50.

The variable length encoder 50, under the control of the encoding controller 18, further lowers the bit rate by converting the input data to variable length codes and provides the codes to a multiplexer 51 and an inter-frame compression data memory 52. Further, the variable length encoder 50 generates an MH signal for each macro block and provides it to an address generation and data length measuring circuit 53. The encoding controller 18 changes the quantizing coefficient based on the output from the variable length encoder 50 and, at the same time, it limits the total amount of codes by limiting the number of bits of the output of the variable length encoder 50. Further, block pulses are supplied to the multiplexer 11, the DCT circuit 13, the quantizer 15, etc. which perform processing in block units.

The output of the quantizer 15 is applied to an inverse quantizer 21. This inverse quantizer 21 provides the quantized output after inverse quantizing to an inverse DCT circuit 22. The inverse DCT circuit 22 restores the output of the inverse quantizer 21 to the original data before DCT processing and provides the result to an adder 23. The output of the adder 23 is fed back through a variable delay circuit 24 which delays for one frame period and then is applied to a motion compensator 25. The adder 23 restores the original data before the processing of differential data by the subtracter 12 by adding the differential data of the current frame with the proceeding frame data. The subtracter 12 provides the restored data to the variable delay circuit 24. The output of the variable delay circuit 24 is also applied to a motion detector 26.

The motion detector 26 is also supplied with the output from the multiplexer 11 and obtains a motion vector via a matching calculation by, for instance, a full search motion vector detection. The motion detector 26 provides the motion vector to the motion compensator 25 and, at the same time, provides a motion judging signal, which is based on whether a distortion value by the matching calculation is in excess of a fixed threshold value, to a motion logic circuit 27. The motion compensator 25 corrects the output of the variable delay circuit 24 based on the motion vector and provides the motion corrected preceding frame data to the subtracter 12 through the switch 14. The motion logic circuit 27 controls the ON/OFF of the switch 14 based on the motion judging signal and a refresh periodic signal indicating the intra-frame compression processed frame.

In this embodiment, the refresh periodic signal is also applied to the address generation and data length measuring circuit 53. Supplied with the refresh periodic signal indicating the intra-frame compression processed frame I and the MB signal, the address generation and data length measuring circuit 53 generates an address for every macro block signal in the intra-frame compression processed frame I and measures data length between MB signals. The macroblock address and data length contained in the data of the sections i1 through i5 of the frame I1, I7 and I13 obtained by the address generation and data length measuring circuit 53 are applied to the multiplexer 51.

The multiplexer 51 multiplexes the macro block address and data length to the intra-frame compression data from the variable length encoder 50 and provides the result to the intra-frame compression data memory 57; The intra-frame compression data memory 57 stores the intra-frame compression data from the multiplexer 51. The intra-frame compression data memory 52 stores the inter-frame compression data from the variable length encoder 50 and provides them to the multiplexer (hereinafter referred to as the MPX) 58. The memory P controller 54 and the memory I controller 55 control the write to the inter-frame compression data memory 52 and to the intra-frame compression data memory 57 based on the data from the address generation and data length measuring circuit 53. The output of the address generation and data length measuring circuit 53 is also applied to the data rearrangement controller 56 which rearranges the data stream shown in FIG. 18(c) by controlling the memory P controller 54, the memory I controller 55 and the MPX 58. That is, the MPX 58, under the control of the data rearrangement controller 56, multiplexes the macro block address, data length (as shown in FIGS. 18(d) through 18(f)), and the intra-frame compression data for each sync block, and multiplexed inter-frame compression data from the inter-frame compression data memory 52 to the remaining range of one sync block. The MPX 58 provides the result to the error correction encoder 17. The error correction encoder 17 provides the sync block with an error correction parity added to the multiplexer 19. The sync/ID generator 20 generates a sync signal and ID signal and provides them to the multiplexer 19. The multiplexer 19 multiplexes the sync signals and ID signals by adding them to the output of the MPX 58. The output of the multiplexer 19 is recorded on a recording medium through the recording head which is not shown.

Next, the circuits in the decoding section will be explained in reference to FIG. 17.

The data played back from a recording medium by the playback head which is not shown is applied to a demultiplexer (hereinafter referred to as the DMPX) 62 and an address and data length extractor 61 after advancing through the error correction in the error corrector circuit (not shown). The address and data length extractor 61 extracts macro block address and data length for each sync block entering the DMPX 62 and the header extractor 63. The DMPX 62 is controlled based on the macro block data length and separates intra-frame compression data from inter-frame compression data and provides both to variable length decoders 64 and 65, respectively. The variable length decoders 64 and 65 decode the intra-frame compression data and inter-frame compression data, respectively and provides the decoded outputs to the header extractor 63, the intra-frame buffer 66 and an inter-frame buffer 67.

The header extractor 63 receives the decoded intra-frame compression data, the decoded inter-frame compression data, address and data length of a macro block, and provides an indicating signal to restore the time sequence of the decoded data to an intra-frame compression data rearrangement canceller 68, a memory I controller 69 and a memory P controller 70. The memory I controller 69 and the memory P controller 70 control the read/write of the intra-frame buffer 66 and the inter-frame buffer 67 based on the indicating signal and the outputs from the intra-frame compression data rearrangement canceller 68. The outputs from the intra-frame buffer 66 and the inter-frame buffer 67 are applied to an MPX 71, which in turn restores the input data to the original data stream shown in FIG. 18(c) and provides the restored data to the inverse quantizer 34 and the motion vector extractor 40.

The recorder portion is composed of the inverse quantizer 34 which inversely quantizes input signals; the inverse DCT circuit 35, which processes the inverse-DCT on the output of the inverse quantizer 34; the header signal extractor 37, which extracts the header signal; the motion vector extractor 40, which extracts motion vector; the frame memory 41, which delays the output signal for one frame period; the predictive decoder 39, which compensates the output of the frame memory 41 for motion; the adder 38, which decodes the inter-frame compression data by adding the output from the inverse DCT circuit 35 with the output from the predictive decoder 39; and the switch 36 which switches and provides the decoded intra-frame compression data and the decoded inter-frame compression data is the same as described earlier.

Next, another operation of the embodiment constructed as described above is explained.

The processes up to the variable length encoder 50 at the recording section (see FIG. 16) are the same as described earlier. That is, the luminance signal Y and the color difference signals Cr and Cb are multiplexed in units of 8 pixels×8 horizontal scanning lines per block and further, multiplexed in units of macro blocks consisting of four blocks: two luminance signal blocks Y and one each of color difference signal blocks Cr and Cb. The output of the multiplexer 11 is applied to the subtracter 12. When preparing intra-frame compression data, the switch 14 is turned OFF, the output from the multiplexer 11 is DCT processed in the DCT circuit 13, quantized in the quantizer 15 where the bit rate is lowered. The quantized output is applied to the variable length encoder 50 where it is encoded in variable length and is applied to the multiplexer 51.

The output of the quantizer 15 is fed back to the subtracter 12 after traveling through the inverse quantizer 21, the inverse DCT circuit 22, the variable delay circuit 24, the motion compensator 25 and the switch 14. Traveling from the quantizer 15 to the subtracter 12 delays the quantizer output by one frame period. When preparing inter-frame compression data, the subtracter 12 subtracts the preceding frame data from the output of the multiplexer 11 and provides the difference to the DCT circuit 13. The data rate of this differential data is lowered by the DCT circuit 13 and the quantizer 15, then converted into variable length codes and applied to the inter-frame compression data memory 52.

In this embodiment, the variable length encoder 50 generates an MB signal for each macro block and provides the MB signal to the address generation and data length measuring circuit 53. The address generation and data length measuring circuit 53 is supplied with a refresh period signal indicating the intra-frame compression processed frame I, generates an address for every MH signal (for every macro block) in the intra-frame compression processed frame I and measures data length between MB signals (a data length of a macro block).

The multiplexer 51 is supplied with addresses and data lengths from the address generation and data length measuring circuit 53 and provides the macro blocks composing the sections i1 through i5 of the intra-frame compression processed frame with the addresses and data lengths (see FIG. 18(*f*)) to the intra-frame compression data memory 57. The address generation and data length measuring circuit 53 controls the memory P controller 54, the memory I controller 55 and the data rearrangement controller 56. The memory F controller 54 and the memory I controller 55 are further controlled by the data rearrangement controller 56. As a result, the inter-frame compression data memory 52 and the intra-frame compression data memory 57 are controlled by the memory P controller 54 and the memory I controller 55, respectively for data read/write, and both provide the stored data to the MPX 58. The data rearrangement controller 56 also controls the MPX 58 which rearranges the data stream illustrated in FIG. 18(*c*). The output of MPX 58 is illustrated in FIG. 18(*d*).

The output of the MPX 58 is added with a parity for error correction by the error correction encoder 17, added with a sync signal and ID in the multiplexer 19 and is converted to the data train as shown in the FIGS. 18(*d*) through 18(*f*). The output from the multiplexer 19 is recorded in a recording medium through the recording head which is not shown.

In this embodiment, wherein the intra-frame compression data is divided into five sections, each section makes a set with inter-frame compression data and is uniformly arranged in the unit of a sync block. Intra-frame compression data is uniformly recorded on a recording medium.

At the decoding section, the playback output from a recording medium, which is not shown, is applied to the address and data length extractor 61 and the DMPX 62 illustrated in FIG. 17 after correcting errors, if any. As the intra-frame compression data was uniformly recorded on a recording medium, it is possible to play back all parts of the intra-frame compression data by restoring the number of frames based on the number of fractions of the intra-frame compression processed frame, the playback speed, and the number of tracks, on which one frame picture is recorded even when a special playback operation was carried out.

The address and data length extractor 61 extracts the macro block address and data length added to each sync block. The DMPX 62 is controlled based on a data length supplied from the address and data length extractor 61. The DMPX 62 separates the intra-frame compression data and the inter-frame compression data and provides them to the variable length decoders 64 and 65, respectively. The variable length decoders 64 and 65 decode the input data to fixed length data and provides them to the intra-frame buffer 66 and the inter-frame buffer 67, respectively.

The decoded data from the variable length decoders 64 and 65 is also applied to the header extractor 63. The header extractor 63 is also supplied with the output from the address and data length extractor 61 and prepares an indicating signal to restore a time sequence to the original data. The header extractor 63 provides the indicating signal to the memory I controller 69, the memory P controller 70 and the intra-frame compression data rearrangement canceller 68. The intra-data rearrangement canceller 68 controls the memory I controller 69, the memory P controller 70 and the MPX 71 based on the indicating signal and header information. As a result, the memory I controller 69 and the memory P controller 70 control read/write of the intra-frame buffer 66 and the inter-frame buffer 67, respectively. The MPX 71 is controlled by the intra-data rearrangement canceller 68 and outputs a data array illustrated in FIG. 18(*c*), that is, a data array in which five frames of inter-frame compression data are continued between the intra-frame compression data is output.

The subsequent operations are the same as before. That is, the decoded intra-frame compression data is applied to the terminal a of the switch 36 by the inverse quantizer 34 and the inverse DCT circuit 35, and the decoded inter-frame compression data is applied to the terminal b of the switch 36 from the adder 38 which adds the decoded preceding frame data from the predictive decoder 39 with the output from the inverse DCT circuit 35. The switch 36 switches the terminals a and b under the control of the header signal extractor 37 and outputs the decoding output.

Figure 23:
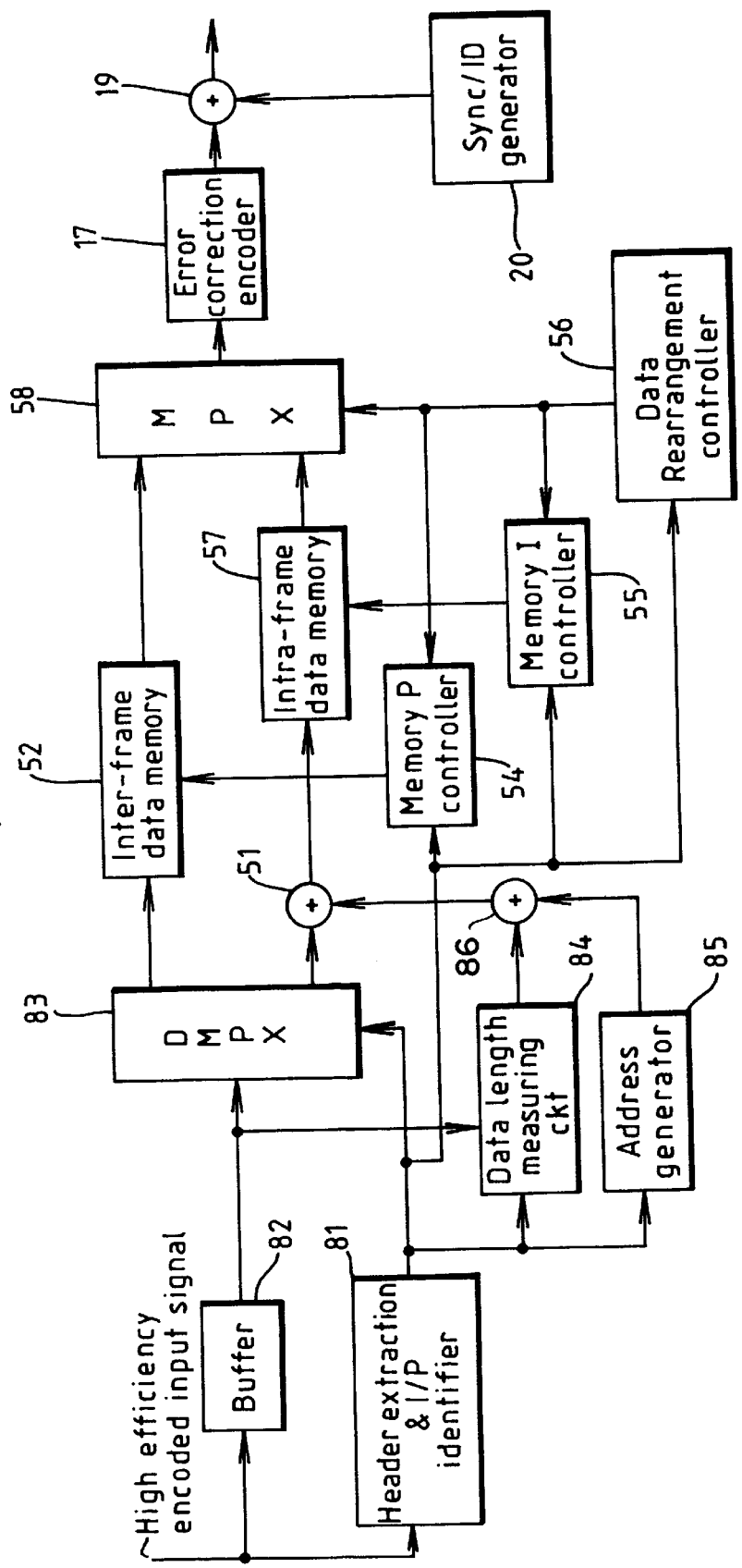
FIG. 23 is a block diagram for illustrating another embodiment of the present invention.

FIG. 23 is a block diagram showing another embodiment of the present invention. In FIG. 23, the same component parts as FIG. 16 are assigned with the same signs and the explanation will be omitted. This embodiment is applied to the system which extracts intra-frame compression data and inter-frame compression data from high efficiency encoded data and rearranges the intra-frame compression data extracted to within each sync block.

The high efficiency encoded input signal is applied to the DMPX 83 through buffer 82 and also, to the header extraction and I/P identifier 81. The header and I/P identifier 81 identifies whether the input data is intra-frame compression data or inter-frame compression data and extracts its address. The buffer 82 provides the input signal to the DMPX 83 and the data length measuring circuit 84 after delaying it for the processing time interval of the header extraction and I/P identifier 81. The DMPX 83 is controlled by the header extraction and I/P identifier 81. The DMPX 81 separates intra-frame compression data and inter-frame compression data and provides them to the multiplexer 51 and the inter-frame compression data memory 52, respectively. Further, depending upon the header information adding method, the header extraction and I/P identifier 81 may construct a decoder.

The data length measuring circuit 84 measures data lengths of macro blocks and provides the measurement to the multiplexer 86, the address generator 85 generates addresses for macro blocks and provides them to the multiplexer 86. The multiplexer 86 multiplexes addresses and data lengths of macro blocks and provides the results to the multiplexer 51. Further, the output of the header extraction and I/P identifier 81 is also applied to the memory P controller 54, the memory I controller 55 and the data rearrangement controller 56. Other constructions are the same as those in FIG. 16.

In this embodiment, already high efficiency encoded data is input. The header extraction and I/P identifier 81 identify whether the input data is intra-frame compression data or inter-frame compression data, and the DMPX 83, under the control of the header extraction and I/P identifier 81, provides the inter-frame compression data to the inter-frame compression data memory 52 and the intra-frame compression data to the multiplexer 51.

The data length measuring circuit 54, under the control by the header extraction and I/P identification 81, measures data lengths of macro blocks from the output of the buffer 82. The address generator 85 generates addresses for every macro block from the output of the header extraction and I/P identifier 81. Addresses and data lengths of macro blocks are multiplexed in the multiplexer 86 and are applied to the multiplexer 51. The subsequent operations are the same as those in the embodiment shown in FIG. 16.

Figure 24:
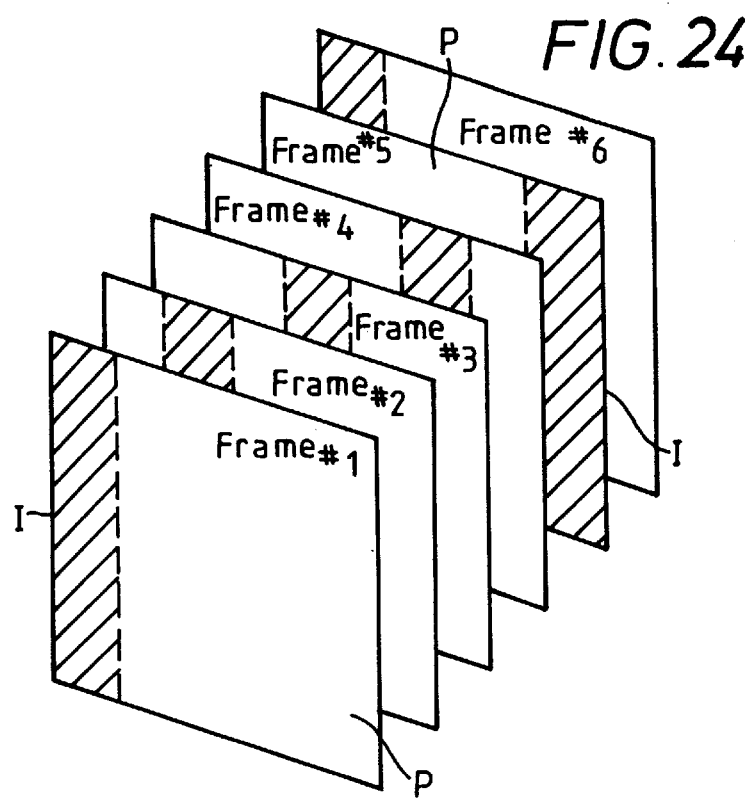
FIG. 24 is a diagram for explaining the encoding in another embodiment of the present invention.

FIG. 24 is a diagram for illustrating the encoding in another aspect of the embodiment according to the present invention. FIGS. 25(a) through 25(e) are diagrams for illustrating the operation of FIG. 24 by separating every frame.

In this embodiment, as illustrated by the oblique lines in FIG. 24 and FIGS. 25(a) through 25(e), the intra-frame compression processed frame I is divided into five sections and these divided sections I1 through I5 are arranged in the fixed area of the inter-frame compression processed frame P. That is, the frame #1 is composed of the data of the section I1 of the intra-frame compression processed frame and the data of the section PIR of the inter-frame compression processed frame, and in the frame #2, the data of the section I2 of the intra-frame compression process frame is arranged between the inter-frame compression processed frames P2L and P2R. Similarly, in the frames #3 and #4, the intra-frame compression processed frames I3 and I4 are arranged between the inter-frame compression processed frames P3L and P3R and the inter-frame compression processed frames P4L and P4R, respectively. In frame #5, the inter-frame compression processed frame P5L and the intra-frame compression processed frame I5 are arranged. Thus, all areas of the intra-frame compression processed frame can be encoded by five frames.

Figure 26A:
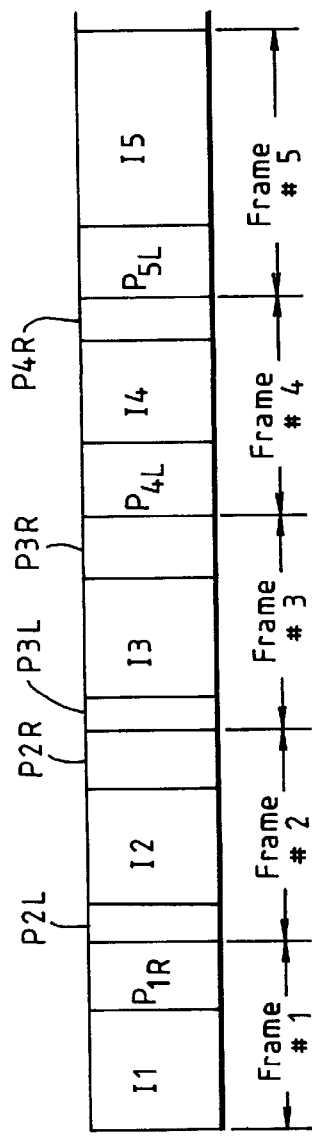
FIGS. 26(*a*) through 26(*c*) are diagrams for explaining the data stream in the embodiment shown in FIG. 24.
Figure 26B:
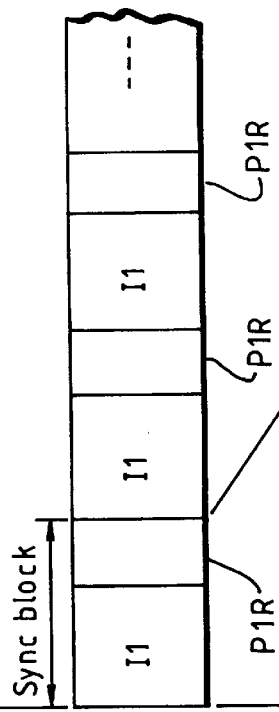
Figure 26C:
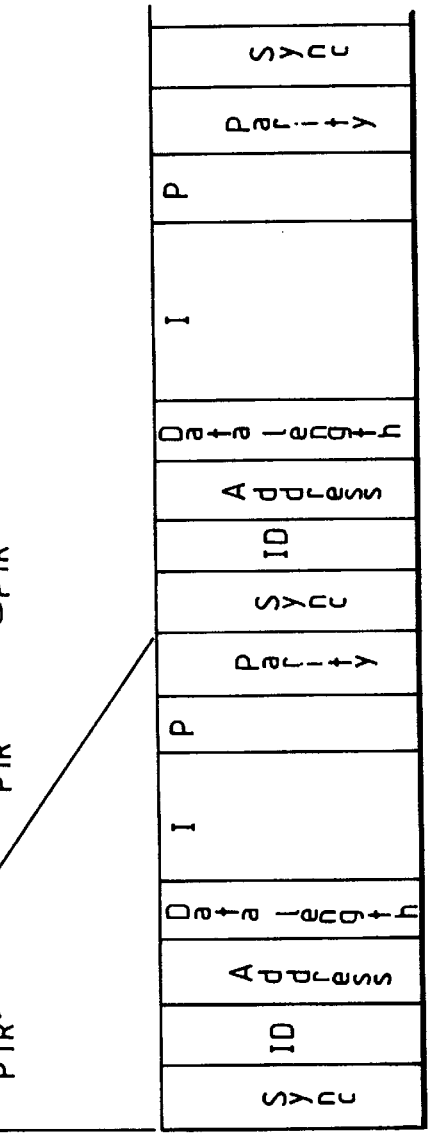

FIGS. 26(a) through 26(c) are diagrams for illustrating the data stream in the above embodiment.

As shown in FIGS. 26(a) through 26(c), the data of each frame is composed of the plural number of sync blocks. Each sync block is composed of the data of the intra-frame section and the data of inter-frame section. Further, similar to the embodiment shown in FIG. 16, in each sync block, intra-frame compression data is arranged with a sync signal, ID, address and data length and parity added.

Further, the frame construction in this embodiment is as illustrated in FIG. 20(b). That is, in the frame #1, the leftmost and top intra-frame section I1, the center frame section I2 which is the second section from the left and the lowest section I3 which is the third section from the left of the five divided sections are played back successively, and in the frame #2, the intra-frame compression processed frame I4 on the top of the second column from right which is the second frame from the right, the intra-frame compression processed frame I5 on the center of the most right column and the intra-frame compression processed frame I6 on the bottom of most left column are played back successively. Thereafter, all the sections are played back in the same manner and one complete frame is composed of 115 sections.

The circuit construction in this embodiment is the same as that shown in FIGS. 16, 17 and FIGS. 18(a) through 18(f), but there is such a merit in which the buffer memory capacity is reducible.

FIGS. 27(a) through 27(c) are diagrams for illustrating the encoding in another aspect of the embodiment according to the present invention. FIGS. 27(a) and 27(b) shows the frames #1 and #2, respectively and FIG. 27 (5) shows the frame #5.

In this embodiment, one frame picture is divided into m (2 in this embodiment) parts and each of m divided parts is further divided into five sections. The data arranging method is the same as that shown in FIGS. 25(a) through 25(e). For instance, in the frame #1 the intra-frame compression data I is arranged at each end of the left and right inter-frame compression data P as illustrated in FIG. 27(a).

Figure 29:
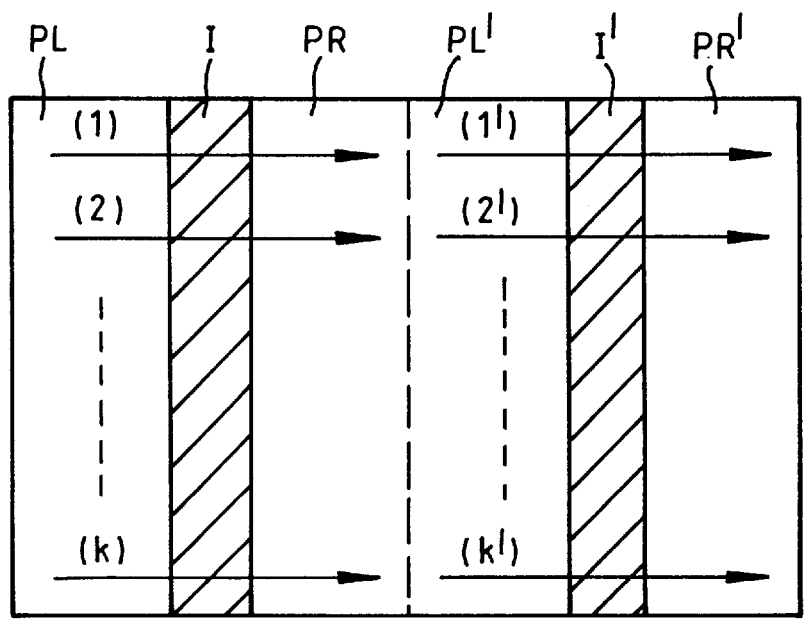
FIG. 29 is a diagram for illustrating a contrast of FIGS. 28(*a*) through 28(*d*) with the frame picture.
Figure 25A:
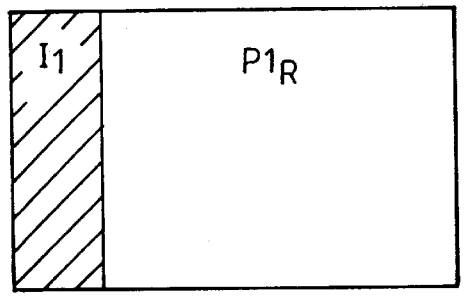
FIGS. 25(*a*) through 25(*e*) are diagrams for illustrating FIG. 24 by separating every one frame.
Figure 25B:
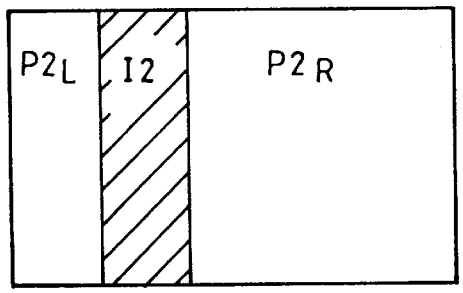
Figure 25C:
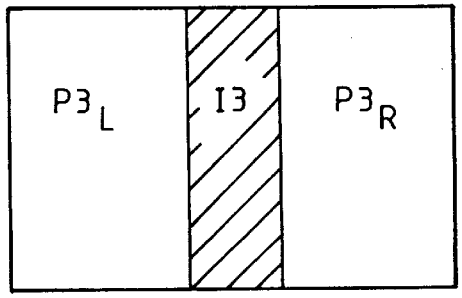
Figure 25D:
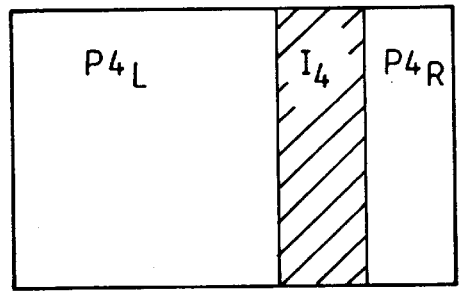
Figure 25E:
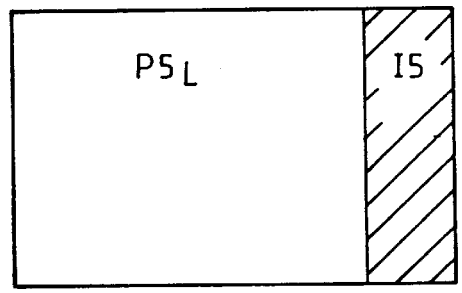

FIGS. 28(a) through 28(d) are diagrams for illustrating the data stream in the above embodiment. FIG. 29 is a diagram to show the contrast of the frame picture with the data stream illustrated in FIGS. 28(a) through 28(d).

Similar to the embodiment in FIG. 24, each frame is composed of the intra-frame compression data zI and the inter-frame compression data P. For instance, in the frame #3 the intra-frame compression data I, I' are arranged between the inter-frame compression data PL, PR and the inter-frame compression data PL7 and PR7 as illustrated in FIG. 29. The data shown by the signs (1) through (k) and 2') through (k') are arranged as illustrated in FIGS. 28(c) and 28(d).

Further, the frame construction in this embodiment is as shown in FIG. 20(c). That is, the frame is composed of two parts in the same construction as in FIG. 20(b).

In this embodiment, the frame construction is also the same as the embodiment shown in FIGS. 16, 17 and FIGS. 18(a) through 18(f). Only difference is the processing method which makes reduction of memories and paralleling of processing systems possible.

FIGS. 30(a) through 30(c) and FIGS. 31(a) through 31(c) are diagrams for illustrating the data format in another aspect of the embodiment according to the present invention. In FIGS. 30(a) through 30(c) and FIGS. 31(a) through 31(c), the intra-frame compression data is shown by the oblique line.

In the above embodiments of FIGS. 16 through 29, the examples of rearrangement of intra-frame compression data in the unit of sync block are presented. However, if a little deterioration of the picture quality is allowed, the rearrangement of intra-frame compression data in the unit of sync block is not necessarily required.

Figure 30A:
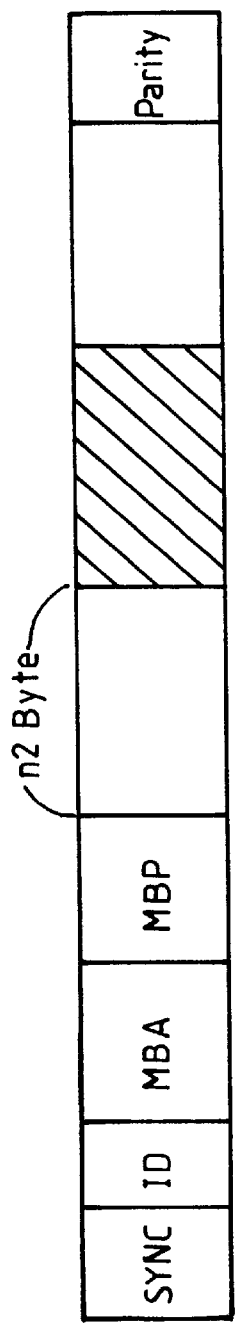
FIGS. 30(*a*) through 30(*c*) are diagrams for explaining the data format of another embodiment.
Figure 30B:
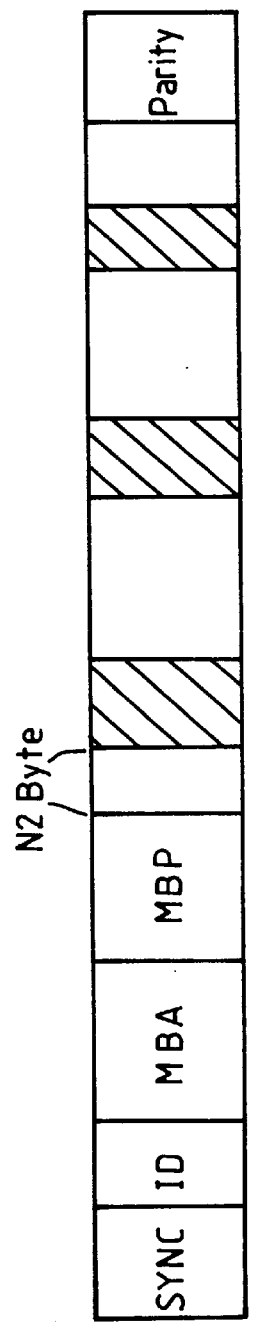
Figure 30C:
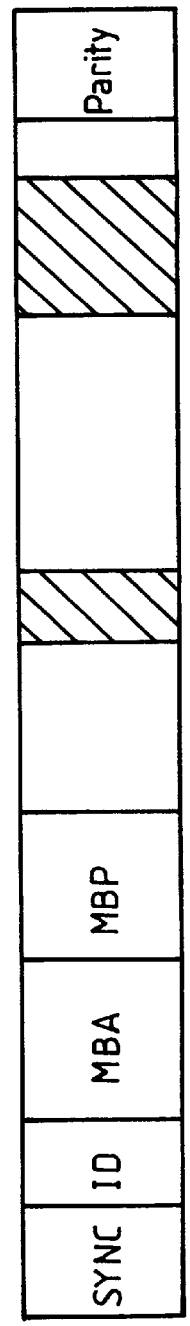

When rearranging intra-frame compression data without limiting it to each sync block unit, the format illustrated in FIGS. 30(a) through 30(C) is adopted to prevent propagation of error. That is, a macro block address (MBA) and a macro block pointer (MBP) are applied to each sync block.

The MBA indicates whether a macro block is data which is positioned on the frame, that is, it shows a sequence in one frame or one field. In FIGS. 30(a) through 30(c), MBP is added following this MBA. The MBP indicates the start position of intra-frame compression data. In FIG. 30(a), the n1 bit from the end of the MBP is illustrated and in FIG. 30(b), n2 bit from the end of the NBP is illustrated.

As the intra-frame compression processed frames and the inter-frame compression processed frames are composed at the same ratio, the intra-frame compression processed frames ar almost uniformly arranged as shown in FIG. 30(b). Therefore, all of the intra-frame compression processed frames are not necessarily able to be restored, but the fixed intra-frame compression data can be played back. Further, as the MBA and MBP are added to each sync block, no error is propagated to the next sync block.

Figure 31A:
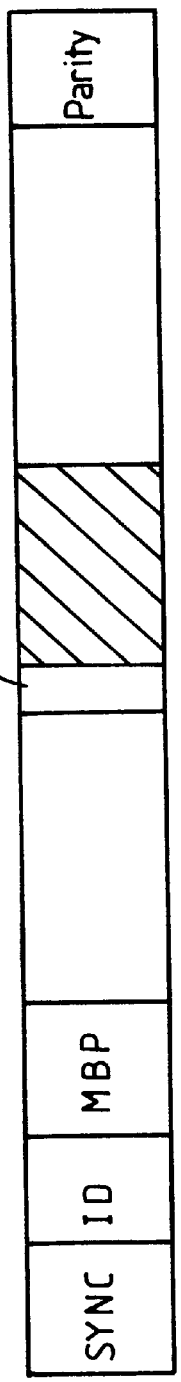
FIGS. 31(*a*) through 31(*c*) are diagrams for explaining the data format of another embodiment.
Figure 31B:
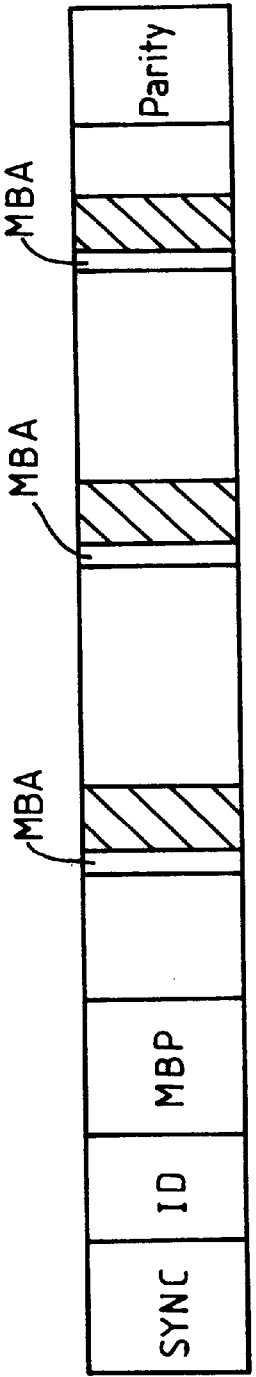
Figure 31C:
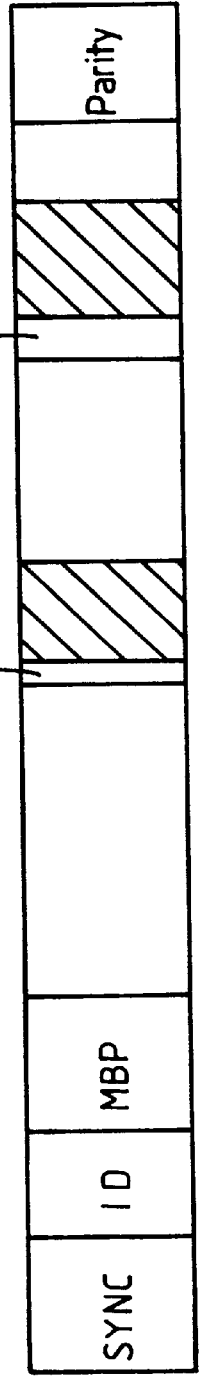

FIGS. 31(a) through 31(c) show an example of the MBA arranged immediately before intra-frame compression data. The MBA may be added to only the top of each sync block.

A second embodiment of the present invention will be described hereinafter in reference to FIGS. 32 through 35.

Figure 32:
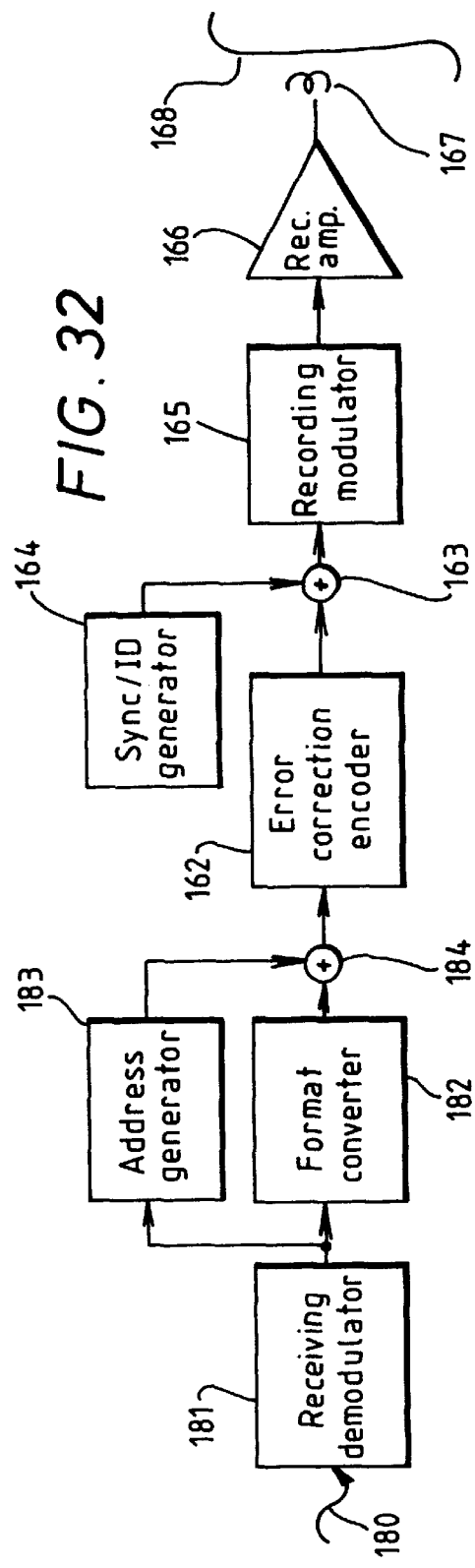
FIG. 32 is a block diagram for illustrating an embodiment of the encoding section of the transmission apparatus of the present invention.
Figure 11:
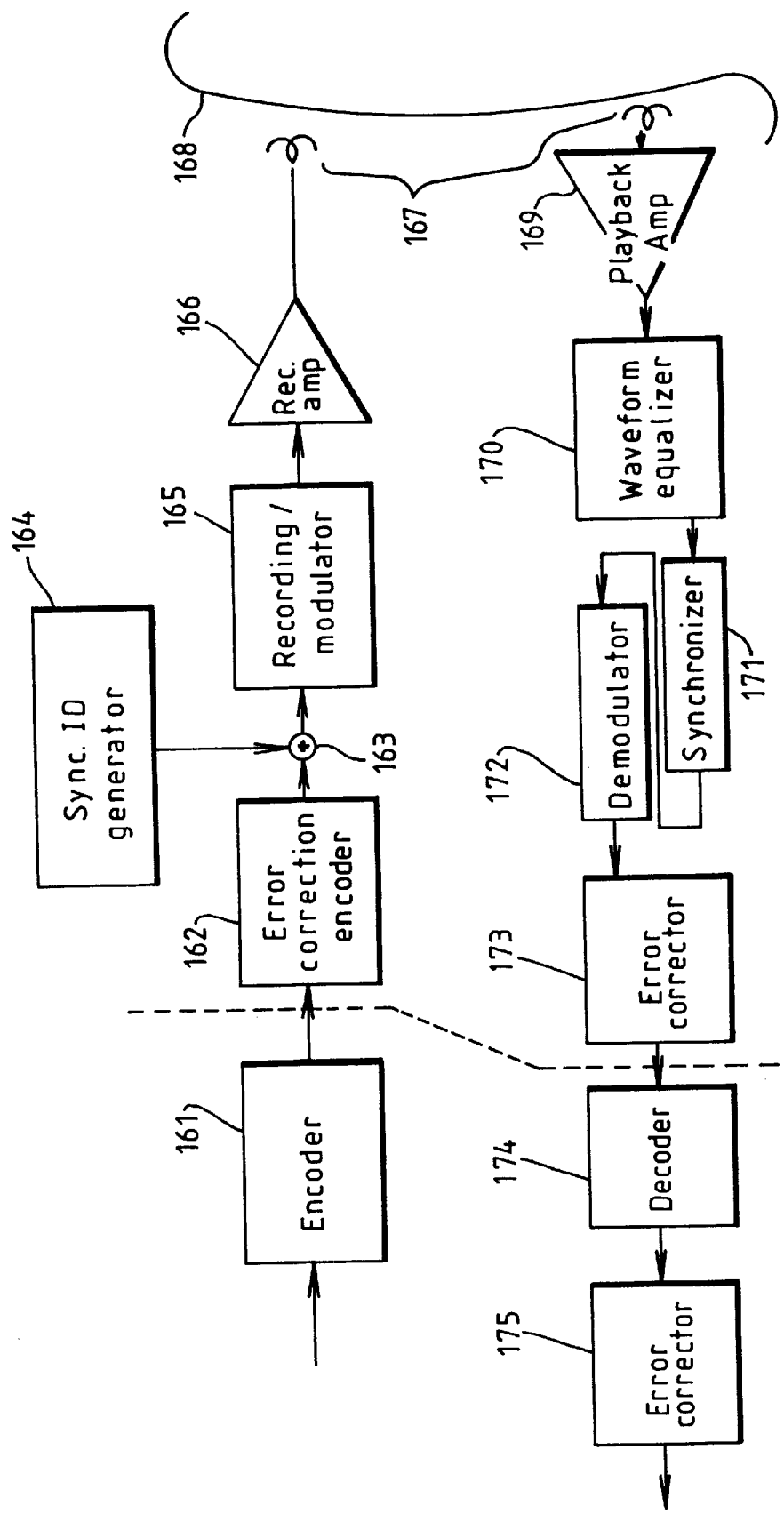
FIG. 11 is a block diagram for explaining a problem associated with a conventional example.
Figure 12A:
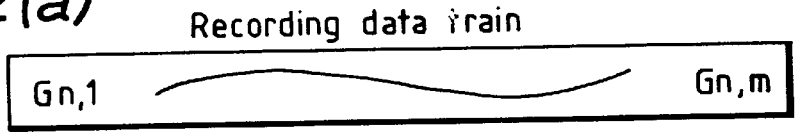
FIGS. 12(*a*) through 12(*f*) are diagrams for explaining a problem associated with a conventional example.
Figure 12B:
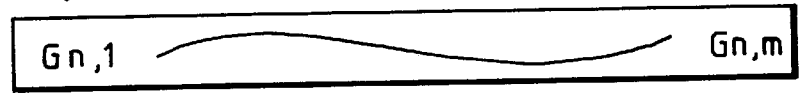
Figure 12C:
Figure 12D:
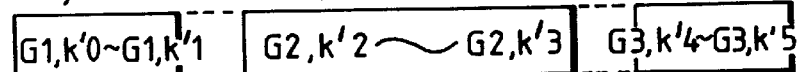
Figure 12E:
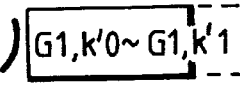
Figure 12F:
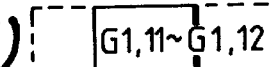
Figure 13:
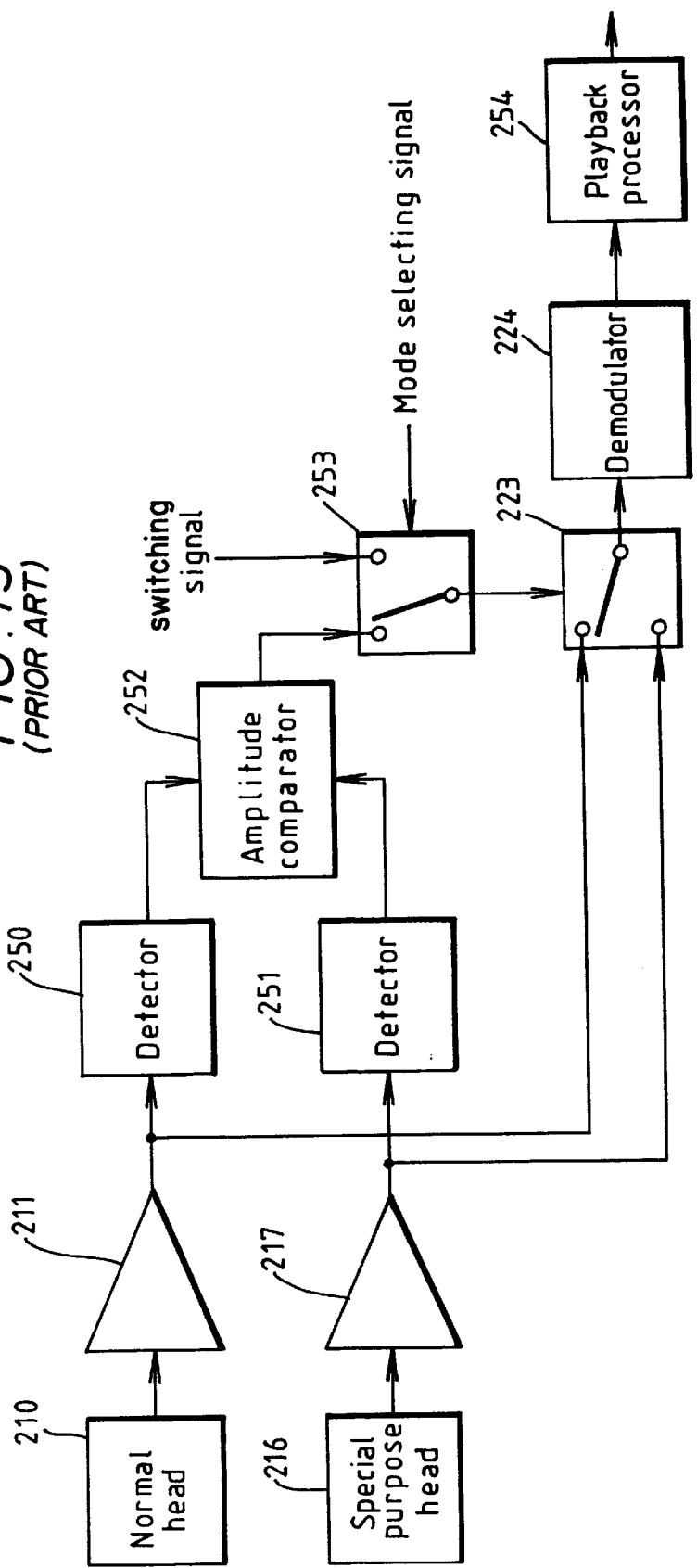
FIG. 13 is a block diagram for illustrating the conventional construction.
Figure 33:
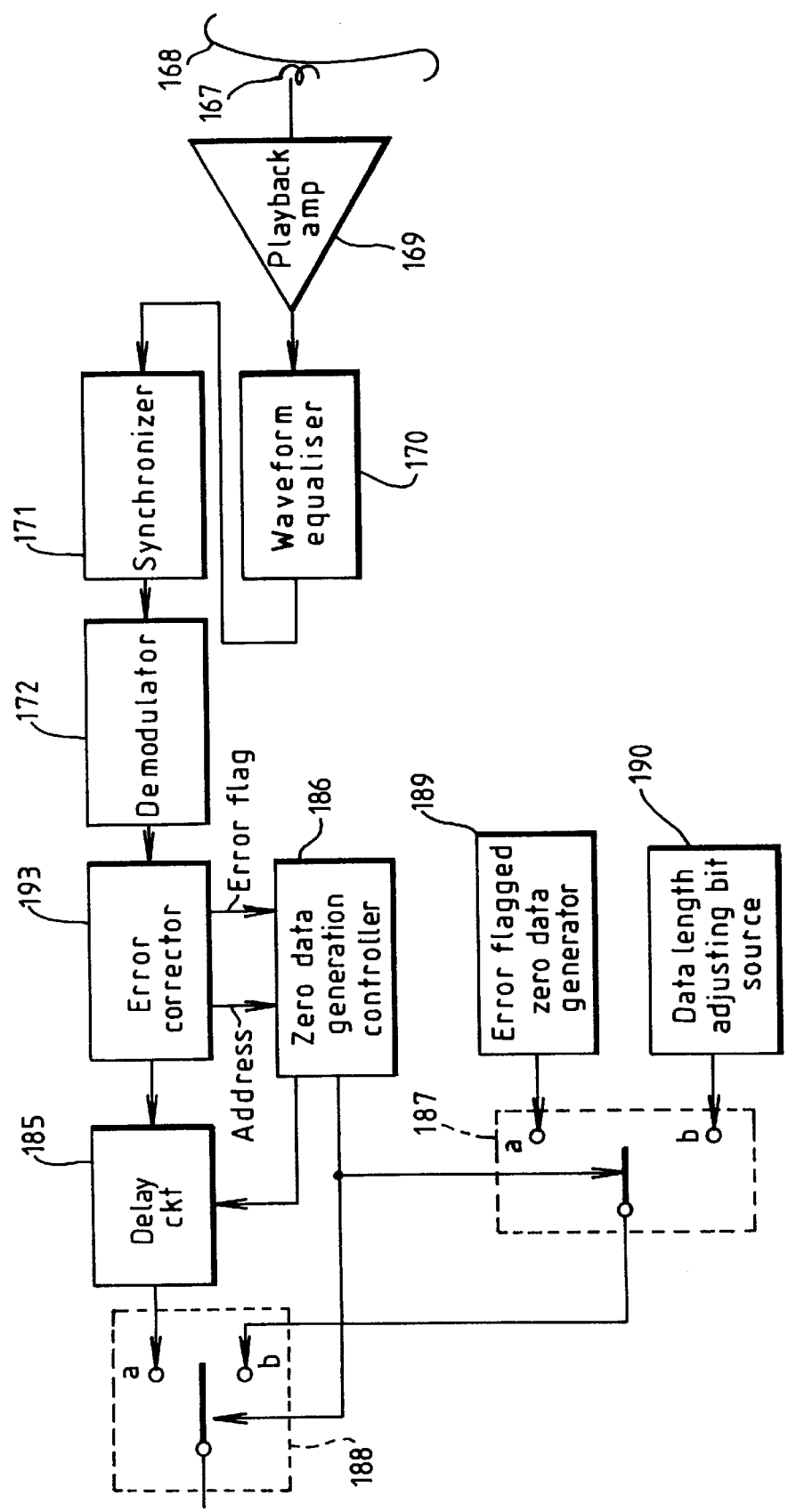
FIG. 33 is a block diagram for illustrating an embodiment of the decoding section of the transmission apparatus of the present invention.

FIG. 32 is a block diagram showing one aspect of the second embodiment at the encoding section of the transmission apparatus according to the present invention. Further, FIG. 33 is a block diagram showing another aspect of the second embodiment at the decoding section of the present invention. In FIGS. 32 and 33, the component parts identical to those in FIG. 11 are assigned with the same letters or symbols. These aspects of the embodiment are applied to a recording/playback apparatus.

In FIG. 32, receiving video signals input through, the transmission line 180 are input to the receiving demodulator 181. The receiving video signals are transmitted sequentially in the units of frame. Each frame is divided into small blocks having 8 pixels in the horizontal direction×8 pixels in the vertical direction and a top flag is added to the top or the frame. Further, each block of data is encoded by DCT process, etc. The receiving demodulator 181 demodulates received video signals and provides them to the format converter 182 and the address generator 183. The multiplexer 184 multiplexes the output of the address generator 183 with the output of the format converter 182.

Figures 34A, 34B, 34C:
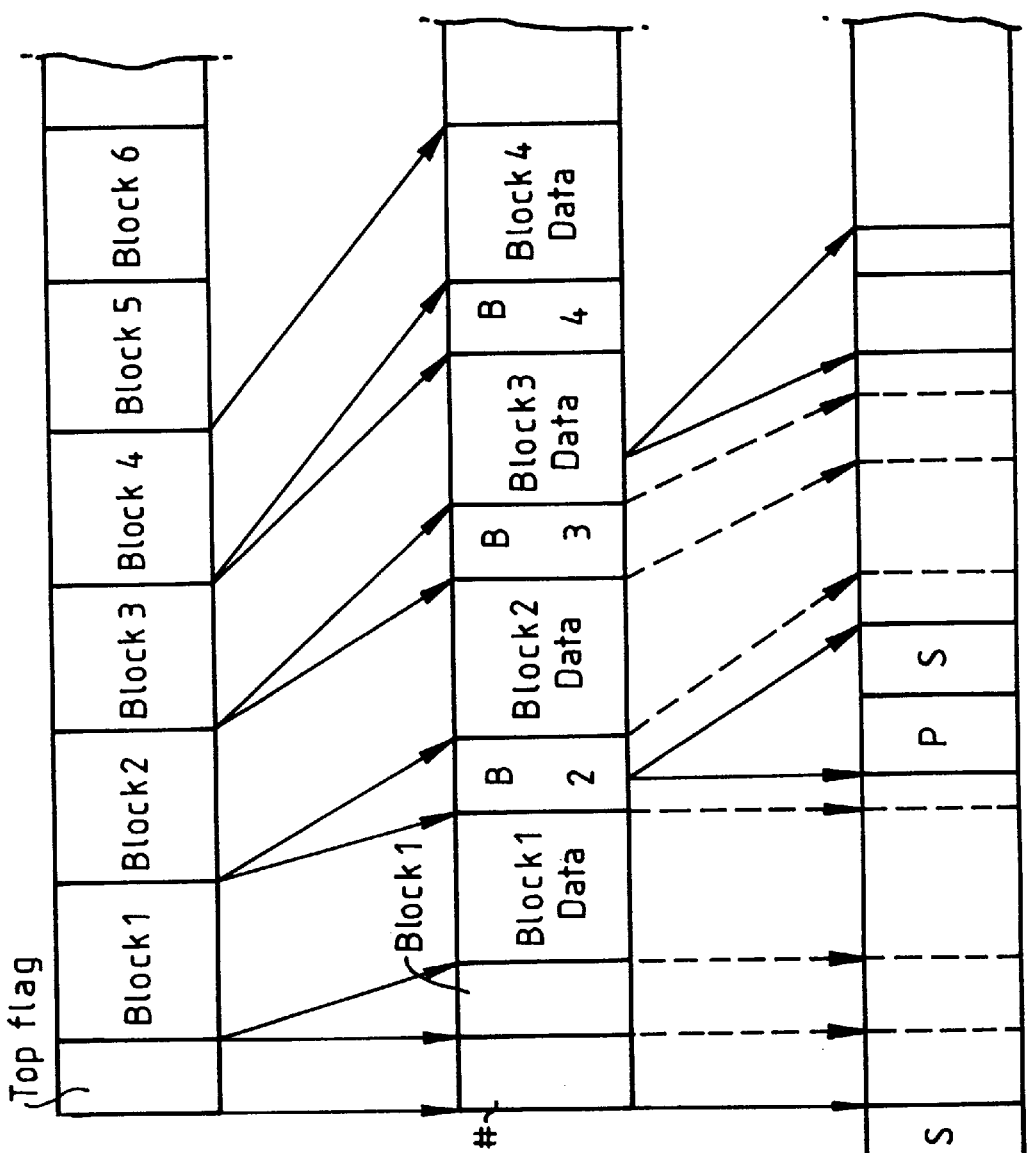
FIGS. 34(a) through 34(c) are diagrams for explaining the embodiment of FIG. 32.

FIGS. 34(a) through 34(c) are diagrams for illustrating the format converter 182, the address generator 183, the multiplexer 184 and the error correction encoder 162.

Image data for one frame from the transmission line 180 is affixed with a top flag showing the top of the frame as illustrated in FIG. 34(a) and thereafter, the image data consists of multiple block data of block 1, 2, . . . . The address generator 183 assigns a series of frame numbers or header to the top flag and generating such address data as Block (B) 1, 2, . . . to each block 1, 2, . . . , then provides them to the multiplexer 184. The format converter 182 converts the receiving image data format so that address data is arranged at the top of each data block and provides it to the multiplexer 184. The multiplexer 184 adds address data to the top of each block data and provides a data stream illustrated in FIG. 34(b) to the error correction encoder. Further, to improve data playback efficiency, the format converter 182 may change playback data sequence.

The error correction encoder 162 adds a parity signal P fitted for recording to the output from the multiplexer 184 and provides it to the adder 163. The synchronization/ID generator 164 generates a synchronizing signal and an ID signal and provides them to the adder 163. The adder 163 outputs the output of the error correction encoder 162 with a synchronizing a signal S added. After all, from the adder 163, a data stream with the synchronizing signal S added to the top of frame number and the parity signal P and the synchronizing signal S added to the middle of the data stream as shown in FIG. 34(c) is output.

The output of the adder 163 is fed to the recording/ modulator 165. The recording/modulator 165 modulates the output of the adder 163 to fit for recording and provides it to the recording amplifier 166. The recording amplifier 166 amplifies the modulated signal from the recording/ modulator 165 and feeds it to the magnetic head 167 for recording on the magnetic tape 168.

At the decoding section, the data recorded on the magnetic tape 168 is played back by the magnetic head 167 as shown in FIG. 33. The playback signals from the magnetic head 167 are supplied to the playback amplifier 169. The playback amplifier 169 amplifies the playback signals and feeds them to the waveform equalizer 170. The waveform equalizer 170 equalizes the waveforms of the playback signals to remove inter-code interference enabling data identification and provides the equalized waveforms to the synchronizer 171. The synchronizer 171 extracts signals and ID signals and gives playback data in the unit of synchronizing signal to the demodulator 172. The demodulator 172 demodulates playback data and feeds them to the error corrector 193.

The error corrector 193 corrects errors of playback data and provides the playback data to the delay circuit 185. At the same time, the error corrector 193 adds an error flag to data which could not be corrected. Further, the error corrector 193 generates an error flag and address data of the decoded data and sends them to the zero data reparation controller 186. The zero data generation controller 186 generates block address data having errors (error block) from the error flag and address data and provides this data to the switches 187 and 188 and, at the same time, controls the delay circuit 185. Further, if an address data error is indicated by an error flag, the zero data generation controller 186 generates address data by estimating the address from address data before and after the address data.

The output of the error flagged zero data generator 189 is supplied to the terminal "a" of the switch 187. The data length adjusting bit source 190 is supplied to the terminal "b". The error flagged zero data generator 189 generates and provides zero data with a flag (F) added to show that there is no redundant bit or data ignored in the course of decoding a block unit. The data length adjusting bit source 190 is an adjusting bit to make a block having an error and a block having no error continuous. The switch 187 selects the terminal "a" or "b" under the control of the output from the zero data generation controller 186 and supplies this output to the terminal "b" of the switch 188.

The output of the delay circuit 185 is supplied to the terminal "a" of the switch 188. The delay circuit 185 adjusts timing with the output of the switch 187 by delaying the output of the error corrector 193 under the control of the zero generation controller 186. The switch 188 selects terminal "a" or "b" under the control of the zero data generator 186 and directly outputs the output of the delay circuit 185 for a block having no error, or outputs the output of the switch 187 in place of the output of the delay circuit 185 for a block having error.

Next, the operation of the apparatus according to this embodiment is described referring to the diagrams in FIGS. 35(a) through 85(c). FIG. 35(a) shows composite data for one scanning of the head in the playback operation at triple speed, FIG. 35(b) shows the output of the switch 188, and FIG. 35(c) shows the output of the error flagged zero data generator 189. In this drawing, the portion between G1, k1' and G2, k2' and the portion between G2, k3' and G3, k4' shown by the broken line, show non-restorable data. The data is unusable because of many errors or because no synchronizing signal is played back.

At the recording section, the receiving demodulator 181 demodulates data input through the transmission line 180 and provides the demodulated data to the format converter 182 and the address generator 183. Received data is added with a frame number at the top of frame data by the format converter 182. The address generator 183 and the multiplexer 184 and is also added with address data for each block and supplied to the error correction encoder 162. The received data is added with a parity signal P by the error correction encoder 162, then added with a synchronizing signal a and ID signal by the adder 163 and supplied to the recording/modulator 165. The recording/modulator 165 modulates the output from the adder 163 to fit for recording and feeds it to the magnetic head 167 through the recording amplifier 166 for recording on the magnetic tape 168.

At the playback section, playback data illustrated in FIG. 35(a) is obtained from the magnetic head 167 when played back at triple speed. This playback data is supplied to the waveform equalizer 170 for waveform equalization through the playback amplifier 169. Synchronizing signals are detected by the synchronizer 171 and demodulated in units of the synchronizing signal in the demodulator 172. The demodulated output is supplied to the delay circuit 185 after error correction in the error corrector 193.

The error corrector 193 adds an error flag to the portion shown by the broken line in FIG. 35(a), the block G1, (k1+1)' through G2, (k2+1)' and the block G2, (k3+1)' through G3, (k4+1)', and provides the address data to the zero data generation controller 186. The zero data generation controller 186 determines the delay amount for the delay circuit 185 based on inputs of the error flag and address data. At the same time, the zero data generation controller 186 controls the switches 187 and 188. The switch 187 provides zero data for each block (FIG. 35(c)) from the error flagged zero data generator 189 to the terminal "b" of the switch 188 at a timing of an error block. Then, a data length adjusting bit is provided to the terminal "b" of the switch 188 for making the zero data and the block have no continuous error.

The output of the delay circuit 185 is supplied to the terminal "a" of the switch 188. Switch 188 selects terminal "a" or "b" under the control of the zero data generation controller 186. Thus, the switch 188 selects the delay circuit 185 for the period corresponding to the blocks G1, K0' through G2, K1' illustrated in FIG. 35(a) and outputs the demodulated output of playback data directly, while selecting the output of the switch 187 for the period corresponding to blocks G1, k1' through G2, k2' and outputs the error flagged zero data blocks Ge, (K1+1) through G2, (k2-1)'. The switch 188 outputs a data length adjusting bit (oblique lined section) for adjusting recording data by making this zero data block and block G2, K2' continuous. Then, switch 188 selects the output of the delay circuit 185 for the period corresponding to the blocks G2, K2' through G2, k3'. Then switch 188 selects terminal "b", it outputs the zero data blocks G2, (K3+1)' through G3, (K4-1)" and a data length adjusting bit shown by the oblique line. Switch 188 then selects the output of the delay circuit 185 for the period corresponding to the next blocks G3, K4' through G4, K5'. Thus, error flagged zero data is inserted into the unplayed back portions shown by the broken line in FIG. 35(a) and continuous sequential data are output from the switch 188.

As described above, in this second embodiment, at the encoding section of this transmission apparatus, data is added to an address. At the decoding section, an error flag and its address data is generated by the error corrector 193. Even when data becomes discontinuous because of a lack of data, the error block is replaced with an error flagged zero data based on the error block address data and sequential data with continuous addresses added are output. Therefore, if the output of the switch 188 is supplied to an apparatus which plays back images sequentially in order of input image data, the zero data portion corresponding to the error block is not only played back, but it is possible to play back all the other data and minimize error propagation. This will result in improved quality of playback images.

A third embodiment of the present invention will be described hereinafter in detail in reference to FIGS. 36 though 41. In the drawings, the same letters or symbols are assigned to the same component parts.

Figure 36B:
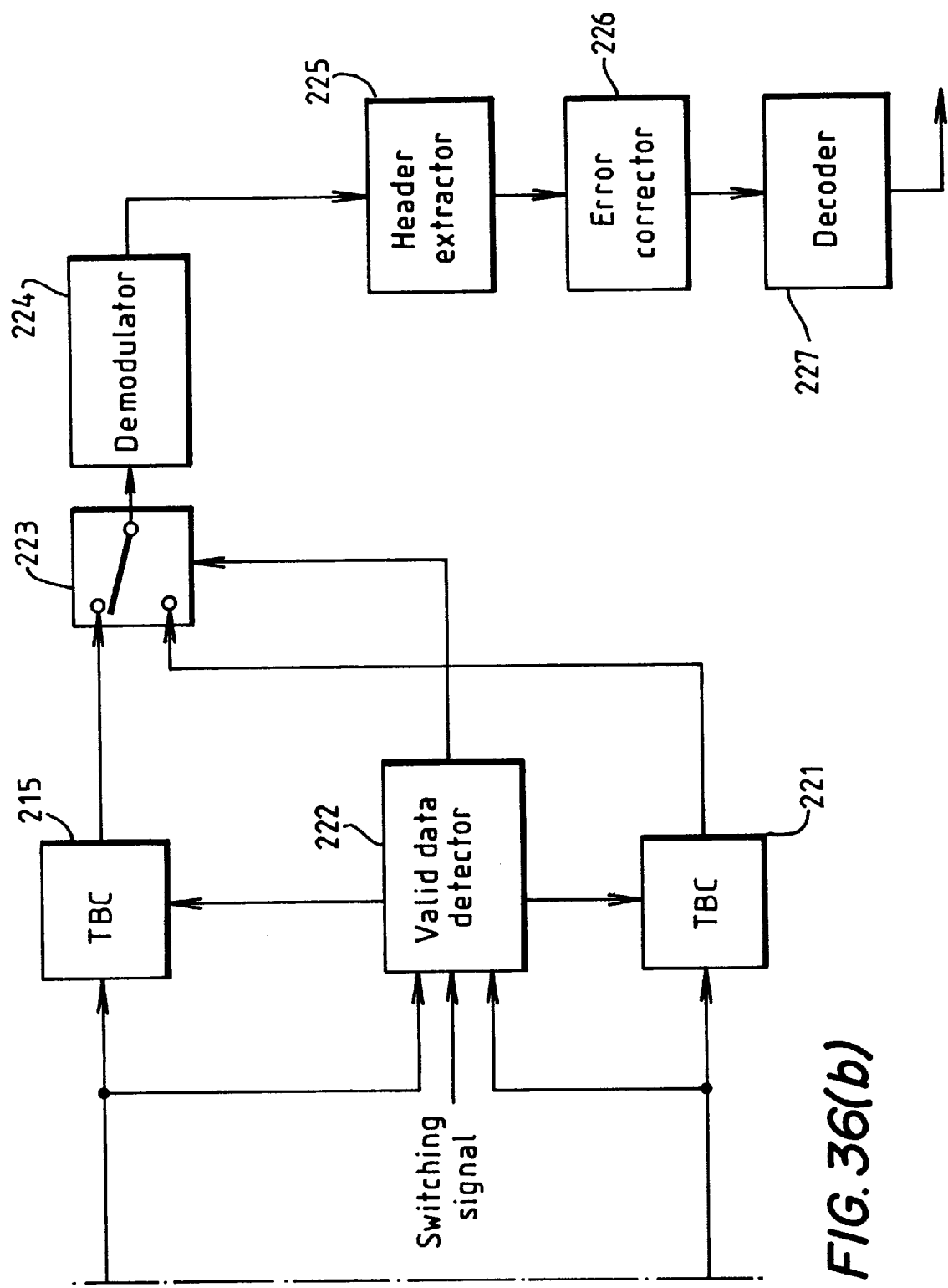

FIGS. 36(a) and 36(b) together represent a diagram showing the construction of a first aspect of the third embodiment according to the present invention. In this drawing, signals played back by a playback head 210 are, after being amplified in an amplifier 211, subject to waveform equalization in a waveform equalizer 212 and are then supplied to a bit synchronizer 213. In this bit synchronizer 213, the supplied signals are converted into digital data and after detection of synchronizing signal of each block in a synchronizer 214, the converted digital data is processed for time base correction in a TBC (Time Base Correction) circuit 215 and supplied to a switch 223.

Signals played back by a special purpose head 216 are, after being amplified in an amplifier 217, processed for waveform equalization in a waveform equalizer 218 and supplied to a bit synchronizer 219. In the bit synchronizer 219, the supplied signals are converted into digital data. After detection of synchronizing signal of each block in a synchronizer 220, the converted digital data is processed for time base correction in a TBC circuit 221 and supplied to the switch 223.

The digital data described above is variable length compression encoded data, wherein each block of the data consists of a synchronizing signal, an ID signal, a data and a parity signal; that is, valid data is in a block unit.

Outputs from the synchronizers 214 and 220 are also supplied to a valid data detector 222. In addition to these outputs, a switching signal is supplied to the valid data detector 222. This valid data detector 222 generates a control signal based on the switching signal and the outputs from the synchronizers 214 and 220, which sets a signal switching point and controls the switch 223 when the apparatus is in a special playback mode such as triple speed playback mode. Furthermore, the valid data detector 222 generates a time base correction signal to the TBC circuits 215 and 221. Based on this signal, the TBC circuits 215 and 221 synchronize signals. Further, the data selected by the switch 223 is demodulated in the demodulator 224 and header information is extracted in a header extractor 225. Thereafter, error correction is executed in an error corrector 226 and the data is decoded to a video signal in a demodulator 227.

Figure 37:
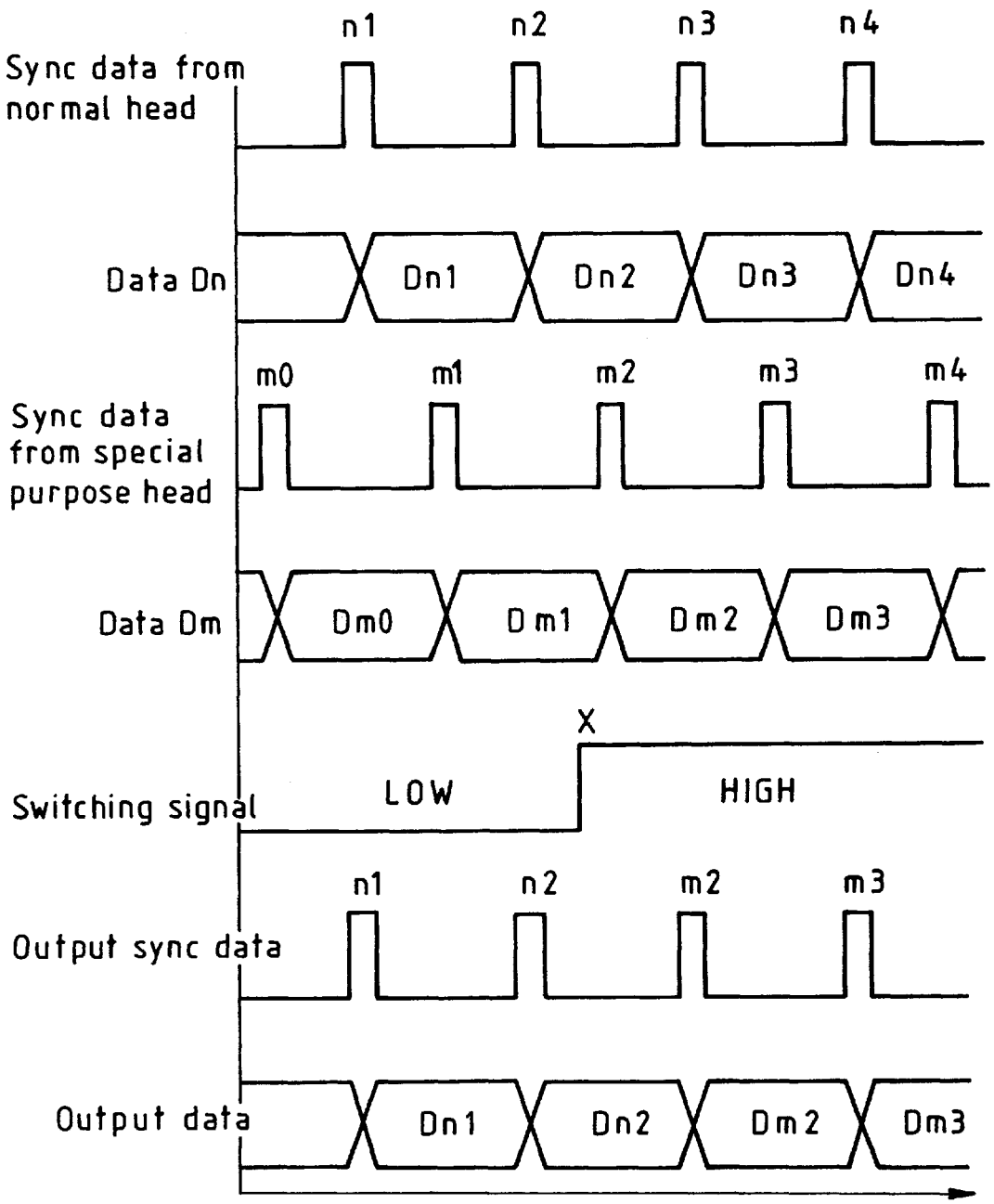
FIG. 37 is a timing chart for explaining the operation of the first embodiment of the present invention.

FIG. 37 is a timing chart for illustrating the operation of the above embodiment. In this drawing, the synchronizing data (n1, n2, n3, . . . ) of the signals played back by the playback heads 210 are not synchronized with the synchronizing data (m0, m1, m2, . . . ) of the signals played back by the special purpose heads 216. If the switching signal is at "HIGH" level, synchronizing data and data Dm at the special purpose head 216 are selected. If the switching signal is at "LOW" level, the synchronizing data and data Dn at the playback head 210 are selected. It is now assumed that the switching signal is switched from a "LOW" to a "HIGH" level at the X point under this condition. The switching signal is a signal obtained from the result of comparing signal amplitudes like a conventional apparatus. In this case, the synchronizing data at the playback head 210 is valid up to the X point, while the synchronizing data at the special purpose head 216 is valid from data coming after the X point. So, output synchronizing data will be n1, n2, m2, m3, . . . . Similarly, output data will be Dn1, Dn2, Dm2, Dm3, . . . and data Dn2 which was invalid remains valid.

Figure 38B:
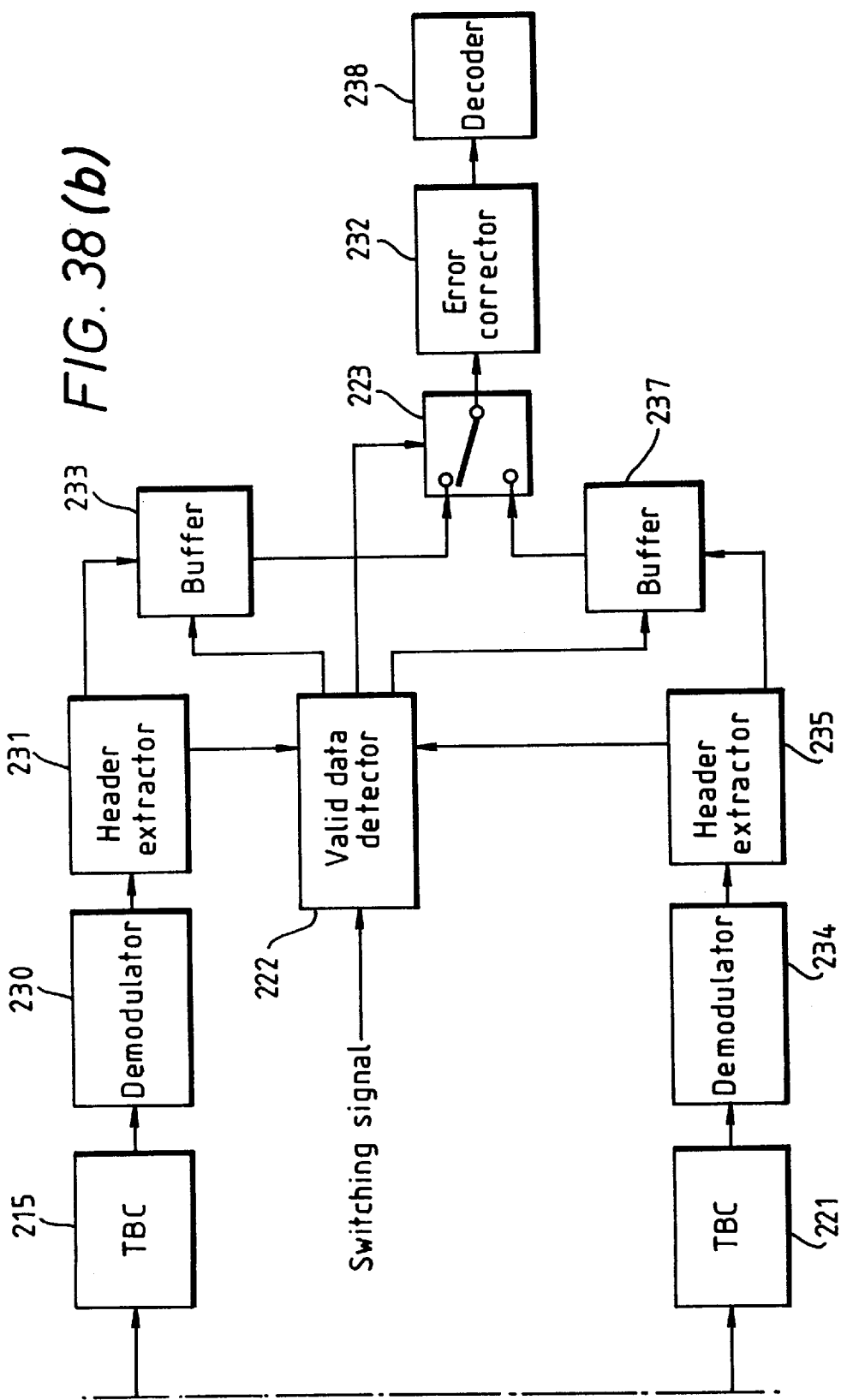

Next, a second aspect of the third embodiment according to the present invention will be described in reference to FIGS. 38(a) and 38(b). In this drawing, a playback head 210 through a TBC Circuit 221 and a special purpose head 216 through a TBC circuit 221 are identical to those in the first embodiment and therefore, the explanation is omitted.

The output signal of the TBC circuit 215 is demodulated in a demodulator 230 and is supplied to a header extractor 231. In the header extractor 231, header information, such as data address length is extracted and is supplied to a valid data detector 222. Likewise, the output signal of the TBC circuit 221 is demodulated in a demodulator 234 and supplied to a header extractor 235. The header information extracted in the header extractor 235 is supplied to the valid data detector 222. Further, the output data of the header extractors 231 and 235 are supplied to buffers 233 and 237, respectively.

The switching signal is also supplied to the valid data detector 222, where a logic decision is executed setting a switching point based on the supplied signal to this detector 222. The valid data detector 222 sends a control signal to control switch 223 and the buffers 233 and 237.

In the buffers 233 and 237, playback operation of data is controlled by the control signal. Both playback data originating at the playback head 210 and the special purpose head 216 are supplied to the switch 223. In the switch 223, one of the two originating playback data is selected by the control signal described above and is supplied to an error corrector 232. Then, error corrected data is supplied to a decoder 228, where original image data is played back by decoding variable length data.

FIG. 39 is a timing chart for illustrating the operation of the above aspect of the embodiment. In this aspect of the embodiment, data is delimited by the unit of encoded data length not by a synchronizing signal.

In FIG. 39, the data supplied from the playback head 210 to the buffer 233 is assumed to be Dai (i is an integer) and the data to be supplied from the special purpose head to the buffer 237 is assumed to be Dbi. Further, if it is assumed that the switching signal was switched at the Y point, output data will contain data Da2 and Db2 at the Y point. That is, the output data will be Da1, Da2, Db2, Db3 . . . Thus, data at the switching point is prevented from becoming invalid.

Figure 40A:
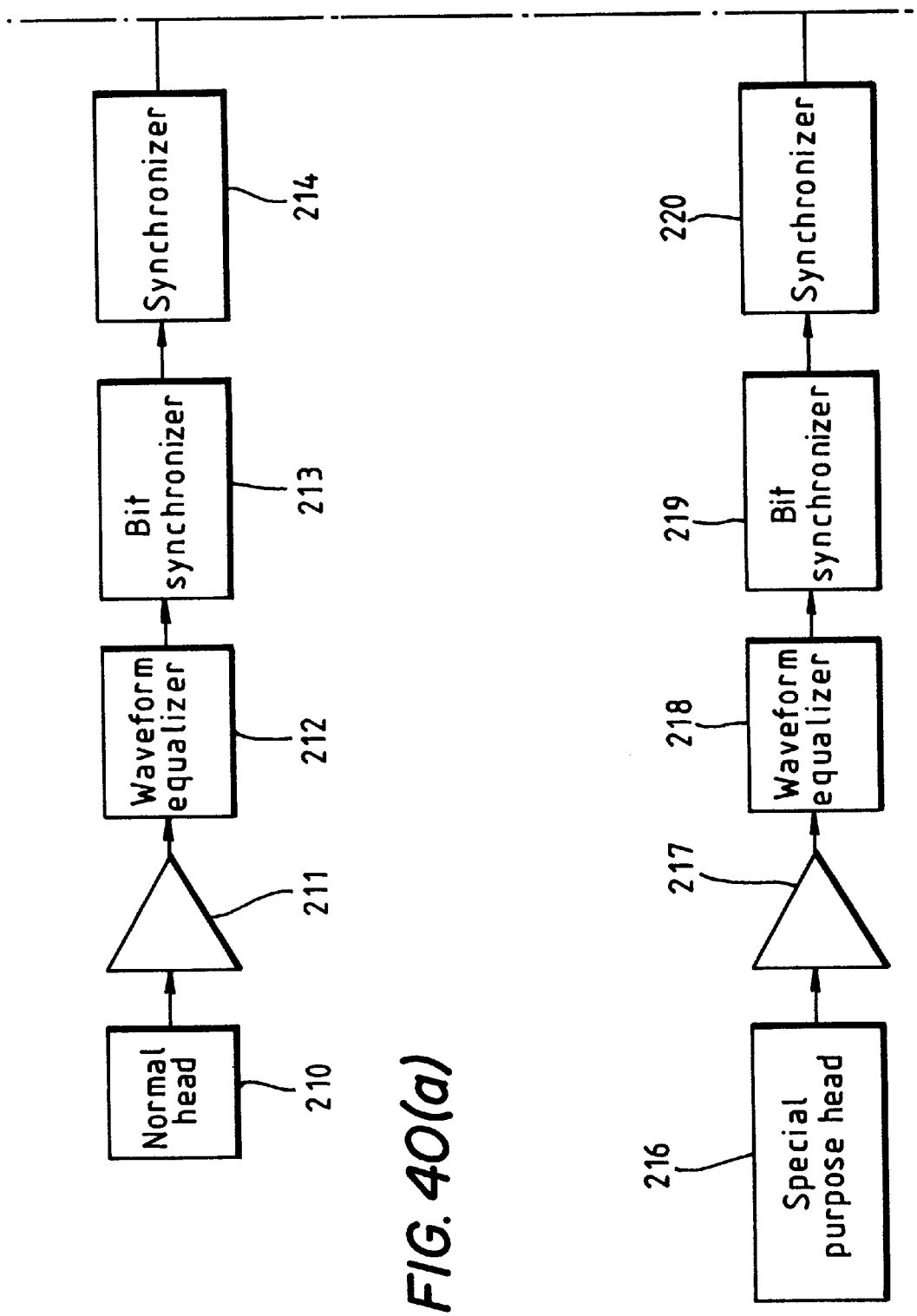

Next, a third aspect of the third embodiment according to the present invention will be described in reference to FIGS. 40(a) and 40(b). In this drawing, the construction up to the header extractors 231 and 235 are identical to that in the second aspect of the embodiment and therefore, the explanation thereof will be omitted.

The outputs from the header extractors 231 and 235 are supplied to error correctors 232 and 236, respectively and the error correction is executed if possible. An error detection flag is added if the error correction is not possible. The outputs are supplied to the buffers 233 and 237. This error detection flag is also supplied to the valid data detector 222. The buffers 233 and 237 are controlled by the control signal which is the output of the valid data detector 222 and their outputs are both supplied to the switch 223. In the switch 223, one of the two supplied signals is selected by the control signal, which is the output of the valid data detector 222 and is supplied to the decoder 228. In this decoder 228, original image data is obtained by decoding variable length data.

FIG. 41 is a timing chart for illustrating the operation in the third embodiment. In this embodiment, the data switching is carried out according to the presence of an error in the encoded data length unit. The switching signal and synchronizing signal are not especially concerned with the data switching.

In FIG. 41, the data Da5 and Da6 out of the data Da from the playback head 210 have certain errors which could not be corrected. In this case, as the error detection flag is added, the error detection signal will become "HIGH" level. Likewise, the data Db1 and Db2 out of the data Db from the special purpose head have certain errors which could not be corrected. Therefore, output data consists of connected data, the good data and eliminating the portions in which errors could not be corrected. To be concrete, they are Da1, Da2, Da3, Da4, Db3, Db5 . . . . Thus, all of valid data is played back.

As described above, switching signals between the playback heads 210 and those from the special purpose heads 216 in the playback operation at triple speed using a drum equipped with playback heads and special purpose heads, it is possible to eliminate data which may become invalid based on a synchronizing data unit, an encoded data length unit, an error detection signal and a switching signal or by delaying one portion of data and connecting it to other data.

The present invention is not limited to the above embodiments, and for instance, the number of divisions of the intra-frame compression processed frame can be set as desired.

The present invention can provide a special playback with stabilized picture quality even when intra-frame compression data and inter-frame compression data are present, because intra-frame compression data can be recorded uniformly on a recording medium according to the present invention.

The present invention can also provide zero data with an error flag added in place of an error block such that playback efficiency is improved.

The present invention can also eliminate data which may become invalid by switching signals based on a synchronizing data unit, an encoded data length unit, an error detection signal and a switching signal or by delaying one portion of data from one head and connecting it to data of another head.

Thus, the present invention provides an extremely preferable digital signal recording/playback apparatus.

It has been illustrated and described what is presently considered to be the preferred exemplary embodiments of the present invention, it is understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An apparatus for recording digital data onto a tape, the digital data having variable length codes that are encoded from a block of intra-frame compression data and a plurality of blocks of inter-frame compression data, the block of intra-frame compression data including a macro block, the apparatus comprising:

data rearranging means for rearranging the macro block so that it is divided into at least two portions and so that the at least two portions are separated by a predetermined interval, which is created by positioning at least a portion of at least one of the blocks of inter-frame compression data between the at least two portions; and recording means for recording, onto the tape, the digital data that has been rearranged by the rearranging means.

2. An apparatus as claimed in claim 1, wherein the data rearranging means includes a means for rearranging the at least two portions of the macro block into sync block units of recorded code.

3. An apparatus according to claim 1 further comprising:

data length adding means for adding addresses and intra-frame compression data length information to an output from the data rearranging means.

4. An apparatus for recording digital data onto a tape, the digital data having variable length codes that are encoded from a plurality of blocks of intra-frame compression data and a plurality of blocks of inter-frame compression data, each block of intra-frame compression data including a macro block, the apparatus comprising:

data rearranging means for uniformly rearranging the digital data by combining a selected one of the blocks of intra-frame compression data with the blocks of inter-frame compression data, said rearranging means dividing the macro block of the selected one of the blocks of intra-frame compression data into at least two portions and varying the arrangement of the at least two portions within the digital data so that the at least two portions are separated by a predetermined interval, which is created by positioning at least a portion of at least one of the blocks of inter-frame compression data between the at least two portions; and recording means for recording onto the tape, the digital data that has been rearranged by the rearranging means.

5. An apparatus as claimed in claim 4, wherein the data rearranging means further comprises:

means for dividing the digital data into a predetermined number of data sections each data section having a corresponding one of the blocks of intra-frame compression data and a preselected number of the blocks of inter-frame compression data; and means for dividing, within each data section, the macro block of the corresponding block of intra-frame compression data into at least two portions and for uniformly arranging, within each data section, the at least two portions so that they are separated by at least a portion of at least one of the preselected number of blocks of inter-frame compression data.

6. An apparatus according to claim 4 further comprising:

means for adding intra-frame compression address information and data length information to the digital data.

7. An apparatus for recording data in a digital form onto a tape, the digital data having variable length codes encoded from intra-frame compression data and inter-frame compression data comprising a decoding means for decoding high efficiency encoded data, the decoding means comprising:

unusable data detecting means for detecting errors in high efficiency encoded data having address information multiplexed with an encoded unit block of data;

data generating means for generating superfluous data to be placed within the unit block together with an error flag, the superfluous data having a selected number of bits so that the digital data remains at a constant length;

switching means for selectively outputting the encoded data or the output from the data generating means;

control means for controlling the switching means, said control means signaling the switching means to switch and replace a transmission unusable data block with an output from the data generating means after the unusable data detecting means detects an unusable data block address; and invalid data inserting means for inserting invalid data between the encoded data and the superfluous data, said invalid data inserting means enabling the output data rate of the switching means to remain constant.

8. An apparatus according to claim 7 wherein the zero data generating means determines the superfluous data as a non-data state so that no data is transmitted and the following correct data are transmitted without intervals.

9. An apparatus for playing back digital data form from a tape, the digital data having variable length codes that are encoded from intra-frame compression data and inter-frame compression data, comprising:

an ordinary video head provided on a rotating drum for ordinary playback operation;

a special video head provided adjacent to the ordinary video head for use in special playback operation;

a first playback processing means for playing back compression encoded digital signals scanned by the ordinary video head;

a second playback processing means for playing back compression encoded digital signals scanned by the special video head;

a means for generating a control signal that indicates which of the first and second playback processing means has a minimal amount of invalid data, said control signal is produced by a calculation that is based on the compression encoded digital signals played back by the first and second playback processing means;

a means for selecting, based on the control signal, one of the compression encoded digital signals played back by the first playback processing means and the compression encoded digital signals played back by the second playback processing means; and a means for decoding the compression encoded digital signals selected by the selecting means.

10. An apparatus for playing back data in a digital form from a tape, the digital data having variable length codes encoded from intra-frame compression data and inter-frame compression data comprising a decoding means for decoding high efficiency encoded data, the decoding means comprising:

unusable data detecting means for detecting errors in high efficiency encoded data having address information multiplexed with an encoded unit block of data;

data generating means for generating superfluous data to be placed within the unit block together with an error flag, the superfluous data having a selected number of bits so that the digital data remains at a constant length;

switching means for selectively outputting the encoded data or the output from the data generating means;

control means for controlling the switching means, said control means signaling the switching means to switch and replace a transmission unusable data block with an output from the data generating means after the unusable data detecting means detects an unusable data block address; and invalid data inserting means for inserting invalid data between the encoded data and the superfluous data, said invalid data inserting means enabling the output data rate of the switching means to remain constant.

11. An apparatus according to claim 10 wherein the zero data generating means determines the superfluous data as a non-data state so that no data is transmitted and the following correct data are transmitted without intervals.

12. An apparatus for recording digital data onto a tape, the digital data having a first frame and a plurality of second frames, the first frame being encoded by an intra-frame compression process, each second frame being encoded by an inter-frame compression process, the apparatus comprising:

data rearranging means for splitting the first frame into at least two parts, and for rearranging the at least two parts of the first frame at regular intervals by positioning at least a part of at least one of the the second frames between the at least two parts; and recording means for recording, onto the tape, the digital data that has been rearranged by the rearranging means.

13. An apparatus for playing back digital data that is stored on a tape, the digital data having a first frame and a plurality of second frames, the first frame being encoded by an intra-frame compression process and being divided into at least two parts, the at least two parts being arranged at regular intervals by positioning at least a part of at least one of the second frames between the at least two parts, each second frame being encoded by an inter-frame compression process, the apparatus comprising:

reproducing means for reading the digital data from the tape; and data rearranging means for detecting the at least two parts of the first frame and for rearranging the at least two parts so that they are adjacent to one another in the digital data.

14. An apparatus for playing back digital data that is stored on a tape, the digital data having variable length codes that are encoded from a block of intra-frame compression data and a plurality of blocks of inter-frame compression data, the block of intra-frame compression data including a macro block that is arranged so that at least two portions of the macro block are separated by a predetermined interval, which is created by positioning at least a portion of at least one of the blocks of inter-frame compression data between the at least two portions, the apparatus comprising:

reproducing means for reading the digital data from the tape; and data rearranging means for detecting the at least two portions and for rearranging the at least two portions so that they are disposed in a continuous fashion within the digital data.

15. An apparatus for playing back digital data from a tape, the digital data having variable length codes that are encoded from a plurality of blocks of intra-frame compression data and a plurality of blocks of inter-frame compression data, each block of intra-frame compression data including a macro block, the macro block of at least one of the blocks of intra-frame compression data being arranged so that at least two portions of the macro block are separated by a predetermined interval, which is created by positioning at least a portion of at least one of the blocks of inter-frame compression data between the at least two portions, the apparatus comprising:

reproducing means for reading the digital data from the tape; and data rearranging means for detecting the at least two portions and for rearranging the detected at least two portions so that they are disposed in a continuous fashion within the digital data.

16. An apparatus for recording digital data onto a tape, the digital data having variable length codes that are encoded from a block of intra-frame compression data and a plurality of blocks of inter-frame compression data, the block of intra-frame compression data including at least two macro blocks, the apparatus comprising:

data rearranging means for rearranging the at least two macro blocks so that the at least two macro blocks are separated by a predetermined interval, which is created by positioning at least a portion of at least one of the blocks of inter-frame compression data between the at least two macro blocks; and recording means for recording, onto the tape, the digital data that has been rearranged by the rearranging means.

17. An apparatus as claimed in claim 16, wherein the data rearranging means includes a means for rearranging the at least two macro blocks into sync block units of recorded code.

18. An apparatus according to claim 16 further comprising:

data length adding means for adding addresses and intra-frame compression data length information to an output from the data rearranging means.

19. An apparatus for recording digital data onto a tape, the digital data having variable length codes that are encoded from a plurality of blocks of intra-frame compression data and a plurality of blocks of inter-frame compression data, each block of intra-frame compression data including at least two macro blocks, the apparatus comprising:

data rearranging means for uniformly rearranging the digital data by combining a selected one of the blocks of intra-frame compression data with the blocks of inter-frame compression data, said rearranging means varying the arrangement of the at least two macro blocks of the selected block of intra-frame compression data within the digital data so that the at least two macro blocks of the selected block of intra-frame compression data are separated by a predetermined interval, which is created by positioning at least a portion of at least one of the blocks of inter-frame compression data between the at least two macro blocks of the selected block of intra-frame compression data; and recording means for recording, onto the tape, the digital data that has been rearranged by the rearranging means.

20. An apparatus as claimed in claim 19, wherein the data rearranging means further comprises:

means for dividing the digital data into a predetermined number of data sections each data section having a corresponding one of the blocks of intra-frame compression data and a preselected number of the blocks of inter-frame compression data; and means for uniformly arranging, within each data section, the at least two macro blocks of the corresponding block of intra-frame compression data so that the corresponding blocks of intra-frame compression data are separated by at least a portion of at least one of the preselected number of blocks of inter-frame compression data.

21. An apparatus according to claim 19 further comprising:

means for adding intra-frame compression address information and data length information to the digital data.

22. An apparatus for playing back digital data that is stored on a tape, the digital data having variable length codes that are encoded from a block of intra-frame compression data and a plurality of blocks of inter-frame compression data, the block of intra-frame compression data including at least two macro blocks that are arranged so that the at least two macro blocks are separated by a predetermined interval, which is created by positioning at least a portion of at least one of the blocks of inter-frame compression data between the at least two macro blocks, the apparatus comprising:

reproducing means for reading the digital data from the tape; and data rearranging means for detecting the at least two macro blocks and for rearranging the at least two macro blocks so that they are disposed in a continuous fashion within the digital data.

23. An apparatus for playing back digital data from a tape, the digital data having variable length codes that are encoded from a plurality of blocks of intra-frame compression data and a plurality of blocks of inter-frame compression data, each block of intra-frame compression data including at least two macro blocks, the at least two macro blocks of at least one of the blocks of intra-frame compression data being separated by a predetermined interval, which is created by positioning at least a portion of at least one of the blocks of inter-frame compression data between the at least two macro blocks of the at least one of the blocks of intra-frame compression data, the apparatus comprising:

reproducing means for reading the digital data from the tape; and data rearranging means for detecting the at least two macro blocks of the at least one block of intra-frame compression data and for rearranging the detected at least two macro blocks so that they are disposed in a continuous fashion within the digital data.

* * * * *